United States Patent
Brackney

(10) Patent No.: US 7,725,199 B2
(45) Date of Patent: May 25, 2010

(54) FRAMEWORK FOR GENERATING MODEL-BASED SYSTEM CONTROL PARAMETERS

(75) Inventor: Larry J. Brackney, Columbus, IN (US)

(73) Assignee: Cummins Inc., Columbus, IN (US)

( * ) Notice: Subject to any disclaimer, the term of this patent is extended or adjusted under 35 U.S.C. 154(b) by 1386 days.

(21) Appl. No.: 11/070,146

(22) Filed: Mar. 2, 2005

(65) Prior Publication Data

US 2006/0212140 A1  Sep. 21, 2006

(51) Int. Cl.
*G05B 13/02* (2006.01)

(52) U.S. Cl. .................. 700/29; 123/568.21; 60/602
(58) Field of Classification Search .............. 700/29; 123/568.21; 60/602
See application file for complete search history.

(56) References Cited

U.S. PATENT DOCUMENTS

| | | | |
|---|---|---|---|
| 4,300,205 A | 11/1981 | Tansuwan | |
| 4,680,959 A | 7/1987 | Henry et al. | |
| 4,984,988 A | 1/1991 | Mizushina et al. | |
| 5,309,379 A | 5/1994 | Rawlings et al. | |
| 5,574,645 A | 11/1996 | Meeker et al. | |
| 5,583,989 A | 12/1996 | Matsui et al. | |
| 5,657,227 A | 8/1997 | Freitag | |
| 5,949,989 A | 9/1999 | Falkowski et al. | |
| 5,986,545 A | 11/1999 | Sanada et al. | |
| 6,145,302 A | 11/2000 | Zhang et al. | |
| 6,151,547 A | 11/2000 | Kumar et al. | |
| 6,270,350 B1 | 8/2001 | Christopher | |
| 6,304,835 B1 | 10/2001 | Hiramatsu et al. | |
| 6,336,084 B1 | 1/2002 | Omara et al. | |
| 6,408,834 B1 | 6/2002 | Brackney et al. | |
| 6,456,928 B1 | 9/2002 | Johnson | |
| 6,480,782 B2 | 11/2002 | Brackney et al. | |
| 6,508,242 B2 | 1/2003 | Jaliwala et al. | |
| 6,619,261 B1 * | 9/2003 | Wang et al. | 123/435 |
| 6,697,729 B2 | 2/2004 | Wright | |
| 6,782,737 B2 | 8/2004 | Wright | |
| 6,837,227 B2 | 1/2005 | Jaliwala et al. | |
| 2001/0023393 A1 | 9/2001 | Hagiwara et al. | |
| 2002/0029136 A1 | 3/2002 | Hagiwara et al. | |
| 2003/0046049 A1 | 3/2003 | Chatfield et al. | |
| 2003/0074171 A1 | 4/2003 | Desai et al. | |
| 2005/0005773 A1 | 1/2005 | Shutty et al. | |

* cited by examiner

*Primary Examiner*—Ramesh B Patel
*Assistant Examiner*—Tejal J Gami
(74) *Attorney, Agent, or Firm*—Barnes & Thornburg LLP; J. Bruce Schelkopf

(57) ABSTRACT

A control framework generates control parameters for controlling operation of a physical system, and includes one or more embedded models each producing a model output corresponding to a different operating parameter of the system as a function of one or more system operating conditions and/or a number of solution parameters, objective logic producing a scalar performance metric as a function of the number model outputs and of one or more system performance target values, objective optimization logic determining a number of unconstrained solution parameters in a manner that minimizes the scalar performance metric, and solution constraining logic determining the number of solution parameters from the number of unconstrained solution parameters in a manner that limits an operating range of at least one of the unconstrained solution parameters. The control parameters may correspond to one of the number of unconstrained solution parameters or to the number of solution parameters.

51 Claims, 22 Drawing Sheets

FRAMEWORK FOR GENERATING MODEL-BASED SYSTEM CONTROL PARAMETERS

FIELD OF THE INVENTION

The present invention relates generally to control techniques for controlling operation of a physical system, and more specifically to a control framework for generating model-based system control parameters.

BACKGROUND

It is desirable to minimize the calibration burden that often accompanies existing implementations of both open and closed loop control strategies. It is further desirable to configure model-based control strategies such that improved models, in terms of accuracy and/or performance, may be simply substituted for corresponding existing models in the control strategies to achieve immediate system performance improvements. It is still further desirable to provide for optimization of the performance of physical systems under off-nominal operating conditions, i.e., under operating conditions outside those for which existing control strategies are specifically designed. The model-based control framework concepts described herein are directed to achieving these and other control strategy goals.

SUMMARY

The present invention may comprise one or more of the features recited in the attached claims, and/or one or more of the following features and combinations thereof. A control framework generating control parameters for controlling operation of a physical system may comprise one or more embedded models each producing a model output corresponding to a different operating parameter of the physical system as a function of either of one or more operating values corresponding to operating conditions of the physical system and a number of solution parameters, objective logic producing a scalar performance metric as a function of the number model outputs and of one or more system performance target values, objective optimization logic producing a number of unconstrained solution parameters in a manner that minimizes the scalar performance metric, and solution constraining logic determining the number of solution parameters from the number of unconstrained solution parameters in a manner that limits an operating range of at least one of the unconstrained solution parameters. The control parameters may correspond to the number of unconstrained solution parameters or the number of solution parameters.

The number of embedded models may be configured to produce a corresponding model output further as a function of at least one of the one or more system performance target values.

The objective logic may further be configured to produce the scalar performance metric as a function of one or more weight values.

The objective optimization logic may further be configured to produce the number of unconstrained solution parameters as a function of at least one of the control parameters.

The solution constraining logic may further be configured to produce at least one of the number of solution parameters as a function of at least one of the one or more system performance target values.

Alternatively or additionally, the solution constraining logic may further be configured to produce at least one of the number of solution parameters as a function of at least one model limit provided by one or more of the number of embedded models.

The control framework may further include control parameter processing logic configured to process at least one of the control parameters and produce an output controlling at least one actuator associated with the physical system. The solution constraining logic may further be configured to produce at least one of the number of solution parameters as a function of at least one feedback value provided to the solution constraining logic by the control parameter processing logic.

The number of model output values may define a vector, Y, the one or more system performance target values may define a vector, $Y_T$, and the one or more weight values may define a vector, W, and the objective logic may be configured to determine a difference vector as a difference between the vectors Y and $Y_T$, and to determine the scalar performance metric as a vector inner product of the vector W and a function of the difference vector. For example the objective logic may be configured to determine the scalar performance metric according to the relationship $U = W \cdot (Y - Y_T)$, where U is the scalar performance metric. As another example, the objective logic may be configured to determine the scalar performance metric according to the relationship $U = W \cdot (Y - Y_T)^2$, where U is the scalar performance metric. As another example, the objective logic may be configured to determine the scalar performance metric according to the relationship $U = W \cdot |Y - Y_T|$, where U is the scalar performance metric. As still another example, the objective logic may be configured to determine the scalar performance metric according to the relationship $U = W \cdot |(Y - Y_T)/Y_T|$, where U is the scalar performance metric.

The number of solution parameters may define a vector, X, the number of unconstrained solution parameters may define a vector, X', and the scalar performance metric may be designated U, and the objective optimization logic may be configured to produce X' as a function of U and X and a specified step size according to a direct search optimization technique. For example, the objective optimization logic may be configured to produce X' as a function of U and X and a specified step size according to a random walk optimization algorithm. As another example, the objective optimization logic may be configured to produce X' as a function of U and X and a specified step size according to a random walk optimization algorithm with step length adjustment. As another example, the objective optimization logic may be configured to produce X' as a function of U and X and a specified step size according to a random walk optimization algorithm with direction exploitation. As another example, the objective optimization logic may be configured to produce X' as a function of U and X and a specified step size according to a random walk optimization algorithm with direction exploitation and step length adjustment. As another example, the objective optimization logic is configured to produce X' as a function of U and X and a specified step size according to a variant of the random walk optimization algorithm. As another example, the objective optimization logic may be configured to produce X' as a function of U and X and a specified step size according to a univariate optimization algorithm.

The physical system may be, for example, an internal combustion engine including an air handling system. In this embodiment, the control framework may be configured to produce a commanded fuel quantity value as one of the control parameters and to produce a commanded start-of-injection value as another one of the control parameters. A fuel system associated with the engine may be responsive to fueling commands to supply fuel to the engine, and the control computer may include fueling logic responsive to the commanded fuel quantity value and the commanded start-of-injection value to produce the fueling commands.

The control framework, in this embodiment, may further be configured to produce a commanded charge flow value as one of the control parameters and to produce a commanded exhaust gas recirculation (EGR) fraction value as another one of the control parameters. The air handling system may include an exhaust gas recirculation (EGR) conduit fluidly coupled at one end to an intake manifold of the engine and at an opposite end to an exhaust manifold of the engine, and an EGR valve responsive to an EGR control signal to control the flow of engine exhaust gas through the EGR conduit, and the control computer may include charge manager logic responsive to the commanded charge flow value and the commanded EGR fraction value to produce the EGR control signal. The air handling system may further include a turbocharger having a variable geometry turbine (VGT) fluidly coupled to an exhaust manifold of the engine, the VGT responsive to a VGT control signal to control the swallowing capacity of the turbine, and the control computer may include charge manager logic responsive to the commanded charge flow value and the commanded EGR fraction value to produce the VGT control signal. The air handling system may further include an exhaust throttle disposed in-line with an exhaust conduit fluidly coupling an exhaust manifold of the engine to ambient, the exhaust throttle responsive to an exhaust throttle control signal to control engine exhaust gas flow through the exhaust conduit, and the charge manager logic may be responsive to the commanded charge flow value and the commanded EGR fraction value to produce the VGT control signal.

In this embodiment, the number of embedded models may include an engine output torque model producing as a model output an estimate of engine output torque as a function of one or more engine operating parameters. Alternatively or additionally, the number of embedded models may include a peak cylinder pressure model producing as a model output an estimate of peak cylinder pressure as a function of one or more engine operating parameters. Alternatively or additionally, the number of embedded models may include an engine exhaust gas temperature model producing as a model output an estimate of engine exhaust gas temperature as a function of one or more engine operating parameters. Alternatively or additionally, the number of embedded models may include a NOx model producing as a model output an estimate of NOx produced by the engine as a function of one or more engine operating parameters. Alternatively or additionally, the number of embedded models may include a dry particulate matter model producing as a model output an estimate of dry particulate matter produced by the engine as a function of one or more engine operating parameters.

Alternatively or additionally, the number of embedded models may include a plurality of fuel limiting models each producing as an output a different fuel flow limit value for limiting engine fueling. The plurality of fuel limiting models may include a peak cylinder pressure (PCP) fuel limit model producing as a model output a PCP-limited fuel flow value as a function of a target PCP limit value included as one of the one or more system performance target values, and as a function of one or more engine operating parameters. Alternatively or additionally, the plurality of fuel limiting models may include an exhaust temperature fuel limit model producing as a model output an exhaust temperature-limited fuel flow value as a function of a target exhaust gas temperature limit value included as one of the one or more system performance target values, and as a function of one or more engine operating parameters. Alternatively or additionally, the plurality of fuel limiting models may include a dry particulate matter (DPM) fuel limit model producing as a model output a DPM-limited fuel flow value as a function of a target DPM limit value included as one of the one or more system performance target values, and as a function of one or more engine operating parameters.

In this embodiment, the solution constraining logic may include a number of constraint functions each producing specified ones of the number of solution parameters by limiting specified ones of the corresponding number of unconstrained solution parameters to definable operating ranges. For example, one of the solution parameters may be a commanded start-of-injection value, and the number of constraint functions may include start-of-injection (SOI) constraint logic determining maximum and minimum start-of-injection limits each as a function of engine speed and of a target engine output torque value forming one of the system performance target values, and limiting an operating range of the corresponding unconstrained commanded start-of-injection value between the maximum and minimum start-of-injection limits. As another example, one of the solution parameters may be a commanded fuel quantity value, and the number of constraint functions may include fuel quantity limiting logic limiting the corresponding unconstrained commanded fuel quantity value to a minimum of a maximum torque fueling value, the greater of a minimum torque fueling value and the unconstrained commanded fuel quantity value, a peak cylinder pressure fuel limit value produced by one of the embedded models, an engine exhaust gas temperature fuel limit value produced by another one of the embedded models and a dry particulate matter fuel limit value produced by yet another one of the embedded models. As another example, one of the solution parameters may be a commanded charge flow value and another one of the control parameters is a commanded EGR fraction value, and the control framework may further include charge management logic responsive to the commanded charge flow value and the commanded EGR fraction value to control one or more actuators associated with the air handling system of the engine, and the number of constraint functions may include charge limit accommodation logic limiting the corresponding unconstrained commanded charge flow and commanded EGR fraction values as a function of information fed back to the charge limit accommodation logic from the charge management logic.

The charge limit accommodation logic may be configured to produce the commanded charge flow value by limiting the corresponding unconstrained commanded charge flow value as a function of charge flow information fed back to the charge limit accommodation logic from the charge management logic. Alternatively or additionally, the charge limit accommodation logic may be configured to produce the commanded EGR fraction value by limiting the corresponding unconstrained commanded EGR fraction value as a function of EGR fraction information fed back to the charge limit accommodation logic from the charge management logic.

In this embodiment, the fuel quantity limiting logic may further be configured to determine an EGR disable value as a function of the unconstrained commanded fuel quantity value, the dry particulate matter fuel limit value and engine speed. The charge limit accommodation logic may be configured to produce a zero commanded EGR fraction value if the EGR disable value is true, and to otherwise produce the commanded EGR fraction value as long as the commanded EGR fraction value is greater than a minimum EGR fraction value.

A control system for controlling operation of a physical system may comprise a sensor producing sensory data indicative of an operating condition of the physical system, an actuator configured to control an operational feature of the physical system, a control computer including, an embedded model receiving either of a solution parameter and the sensory data, the embedded model producing a model output corresponding to an operating parameter of the physical system, objective logic producing a scalar performance metric as a function of the model output and of a system performance target value, objective optimization logic producing an unconstrained solution parameter in a manner that minimizes the scalar performance metric, and constraining logic determining the solution parameter from the unconstrained solution parameter by limiting an operating range of the unconstrained solution parameter, wherein the control parameter may be either the unconstrained solution parameter or the solution parameter, and means responsive to the control parameter for controlling operation of the actuator.

The means responsive to the control parameter for controlling operation of the actuator may include control parameter processing logic associated with the control computer and configured to process the control parameter and produce an actuator control signal, and an actuator driver circuit responsive to the actuator control signal to produce an actuator drive signal for controlling operation of the actuator.

Alternatively, the means responsive to the control parameter for controlling operation of the actuator may include an actuator driver circuit responsive to the control parameter to produce an actuator drive signal for controlling operation of the actuator.

The sensor may be a physical sensor configured to sense the operating condition of the physical system and produce a sensor signal indicative of the operating condition. Alternatively, the sensor may be an estimation algorithm included within the control computer, the estimation algorithm estimating the operating condition of the physical system as a function of one or more other operating conditions of the physical system and producing the sensory data indicative of the operating condition.

The physical system may be an internal combustion engine including an air handling system.

These and other features of the present invention will become more apparent from the following description of the illustrative embodiments.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
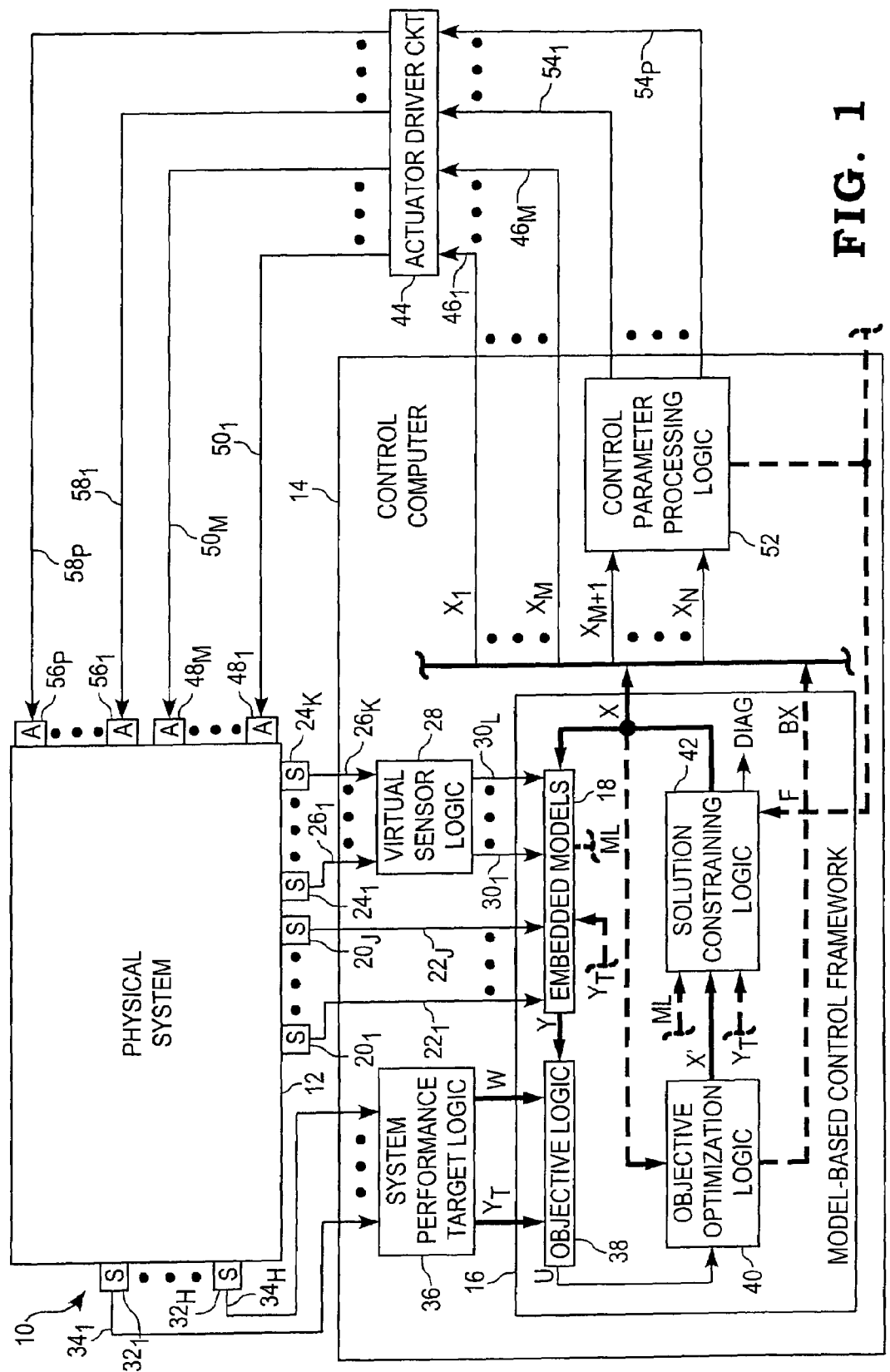
FIG. 1 is a block diagram of one illustrative embodiment of a control framework for generating model-based control parameters for controlling operation of a physical system.

Referring now to FIG. 1, a diagram of one illustrative embodiment of a control system 10 is shown including a physical system 12 and a control computer 14 implementing a control framework 16 for generating model-based control parameters for controlling operation of the physical system 12. The physical system 12 may be any known physical system which may have one or more sensors or sensing systems, e.g., $20_1$-$20_J$, $24_1$-$24_K$, $32_1$-$32_H$, producing sensory data corresponding to one or more operating conditions associated with the system 12, and which has one or more actuators, e.g., $48_1$-$48_M$, $56_1$-$56_P$, responsive to one or more corresponding actuator control signals to control one or more corresponding operational features of system 12, such that the physical system 12 may be controlled in open-loop or closed-loop fashion, based on one or more performance targets, via one or more control algorithms resident within control computer 14. Examples of the physical system 12 include, but are not limited to, an internal combustion engine, which may include one or more controllable subsystems; e.g., fuel system, air handling system, exhaust gas aftertreatment system, anti-lock braking system, automatic or automated manual transmission, and the like, residential or commercial appliances, large and small-scale entertainment systems including audio and video processing equipment, signal identification and other signal processing equipment, to name a few.

In the generalized control system 10 illustrated in FIG. 1, the control framework 16 resident within control computer 14 includes an embedded models block 18 receiving as inputs sensory data in the form of any number, J, of sensor signals produced by corresponding physical system sensors $20_1$-$20_J$ and received via corresponding signal paths $22_1$-$22_J$, wherein J may be any positive integer. The embedded models block 18 may alternatively or additionally receive as inputs sensory data in the form of any number, L, of sensor values produced by corresponding "virtual" sensors resident within a virtual sensor logic block 28 of control computer 14 and received via corresponding signal paths $30_1$-$30_L$, wherein L may be any positive integer. The virtual sensor logic block 28 is configured to receive sensory data in the form of any number, K, of sensor signals produced by corresponding physical system sensors $24_1$-$24_K$ and received via corresponding signal paths $26_1$-$26_K$, wherein K may be any positive integer. The virtual sensor logic block 28 includes one or more known software algorithms configured to estimate the "L" physical system operating conditions based on any one or combination of the "K" sensor signals. It will be understood that while sensors $20_1$-$20_J$ are illustrated in FIG. 1 as providing the "J" sensor signals only to the embedded models block 18 and sensors $24_1$-$24_K$ are illustrated as providing the "K" sensor signals only to the virtual sensor logic block 28, the embedded models block 18 and the virtual sensor logic block 28 may alternatively share any one or more of the available sensor signals provided by sensors $20_1$-$20_J$ and $24_1$-$24_K$.

Control computer 14 further includes a system performance target logic block 36 receiving as inputs sensory data in the form of any number, H, of sensor signals produced by corresponding physical system sensors $32_1$-$32_H$ and received via corresponding signal paths $34_1$-$34_H$. The system performance logic block 36 includes one or more software algorithms that may be responsive to sensory data produced by one or more of the sensors $32_1$-$32_H$ to produce a system performance target vector, $Y_T$, containing one or more system performance target values each corresponding to a specified performance goal associated with the physical system 12. The system performance logic block 36 may further include one or more additional software algorithms that may be responsive to sensory data produced by one or more of the sensors $32_1$-$32_H$ to produce a weight vector, W, containing one or more weight values each assignable to a specified one of the system performance target values. Either of the system performance target vector, $Y_T$, and the weight vector, W, may be time-varying or time invariant, and/or responsive to one or more operating conditions associated with the physical system 12 including, for example, duty cycle, ambient operating conditions, total system capability, and the like. It will be understood that each system performance target value and each weight value may be based on sensory data and/or on calibritible data values. It will further be understood that while sensors $20_1$-$20_J$ are illustrated in FIG. 1 as providing the "J" sensor signals only to the embedded models block 18, sensors $24_1$-$24_K$ are illustrated as providing the "K" sensor signals only to the virtual sensor logic block 28 and sensors $32_1$-$32_H$ are illustrated as providing the "H" sensor signals only to the system performance target logic block 36, the embedded models block 18, the virtual sensor logic block 28 and the system performance logic block 36 may alternatively share any one or more of the available sensor signals provided by sensors $20_1$-$20_J$, $24_1$-$24_K$ and $32_1$-$32_H$. In any case, for purposes of this document, the term "sensory data" will be understood to encompass sensor signals produced by any one or more of the physical sensors $20_1$-$20_J$, $24_1$-$24_K$ and $32_1$-$32_H$, as well as sensor values produced by any one or more of the "virtual" sensors resident within the virtual sensor logic block 28.

The embedded models block 18 illustrated in FIG. 1 may include any number of mathematical system models producing a model output vector, Y, containing one or more model output values as a function of one or more model inputs. The model inputs may include any one or combination of a control framework output vector, X, containing one or more control parameters produced by the model-based control framework 16, sensory data produced by any one or combination of the described sensory data sources, and the system performance target vector, $Y_T$, as shown in phantom in FIG. 1. Each of the number of mathematical system models may be an empirical or fundamental mathematical model that describes the relationship between one or more of the control parameters forming the control framework output vector, X, and/or one or more operating condition of the physical system 12 determined via the sensory data, and a model output defining a different operating parameter of the physical system 12. Any of the number of models may be as simple or complex as model knowledge and processor throughput allow, and it will be appreciated that the accuracy of the data included in the control framework output vector, X, will generally improve as model accuracy is improved.

The model-based control framework 16 further includes an objective logic block 38 producing a scalar performance metric, U, as a function of at least the model output vector, Y, containing the one or more model output values and the system performance target vector, $Y_T$, containing the one or more system performance target values. In embodiments of system 10 in which the system performance target logic block 36 is further configured to produce the weight vector, W, the object logic block 38 is configured to produce the scalar performance metric, U, further as a function of the weight vector, W, containing the one or more weight values. The objective logic block 38 is configured to convert the one or more model output values contained in the model output vector, Y, and the one or more system performance target values contained in the system performance target vector, $Y_T$, to the scalar performance metric, U, using any of a number of mathematical objective expressions. One illustrative class of mathematical expressions that may be used to produce the scalar performance metric, U, includes, but is not limited to, any of a number of different vector inner product expressions. Examples of such vector inner product expressions include, but are not limited to, $U=W\cdot(Y-Y_T)$, $U=W\cdot(Y-Y_T)^2$, $U=W\cdot|Y-Y_T|$ and $U=W\cdot|100*(Y_T-Y)/Y_T$.

The model-based control framework 16 further includes an objective optimization logic block 40 producing a solution vector, X', which contains one or more unconstrained control parameter values, in a manner that minimizes the scalar performance metric, U. In the illustrated embodiment, for example, the objective optimization block 40 is configured to implement one or more "direct search" optimization techniques, because such optimization techniques generally do not require knowledge of the actual models used. Conventional gradient-based optimization techniques, in contrast, typically require knowledge of the actual models being used, and it is accordingly desirable to use one or more direct search optimization techniques within the objective optimization logic block 40 of FIG. 1 to thereby allow the objective optimization function to be separate from the models function as illustrated in FIG. 1. An example of one illustrative software structure for producing BX will be described hereinafter with respect to FIG. 28. In any case, design goals for the objective optimization logic block 40 may typically include stability, convergence speed, ability to seek global minimae, and available throughput. Those skilled in the art will recognize that an initial solution vector may be retained in memory from one run to the next, or a family of initial solutions may be applied during operation to speed convergence to a solution when the system transitions between different operating modes.

In the illustrated embodiment, the objective optimization logic block 40 may be configured to produce the solution vector, X', as a function of the scalar performance metric, U, and the control framework output vector, X, as shown in phantom in FIG. 1. Optionally, as shown in phantom, the objective optimization logic block 40 may be configured to produce a "Best X", BX, which corresponds to a minimum one of a number of most recent scalar performance metric values, U. By choosing the control framework output vector, X, that corresponds to the minimum one of a number of most recent scalar performance metric values, U, "hunting" of the solution vector, X, can be minimized. In any case, examples of known optimization algorithms with specified step size that may be used in the objective optimization logic block include, but are not limited to, a random walk optimization algorithm, a random walk optimization algorithm with step length adjustment, a random walk optimization algorithm with direction exploitation, a random walk optimization algorithm with direction exploitation and step length adjustment, a univariate optimization algorithm, one or more variants of these example optimization algorithms, and one or more custom optimization algorithms.

The model-based control framework 16 further includes a solution constraining logic block 42 producing the control framework output vector, X, containing one or more system control parameters, as function of the solution vector, X', in a manner that limits an operating range of at least one of the unconstrained control parameter values contained in the solution vector, X'. In one embodiment, as illustrated in phantom in FIG. 1, the solution constraining logic block 42 may receive as another input the system performance target vector, $Y_T$, and in this embodiment the solution constraining logic block 42 may be configured to limit the operating range of one or more of the unconstrained control parameter values as a function of one or more of the system performance target values contained within the system performance target vector, $Y_T$. Additionally or alternatively, the solution constraining logic block 42 may receive as another input a feedback vector, F, from one or more other software algorithms resident within and executed by control computer 14 and/or from one or more other systems or subsystems external to control computer 14, as shown in phantom in FIG. 1. In this embodiment, the solution constraining logic block 42 may be configured to limit the operating range of one or more of the unconstrained control parameter values as a function of one or more feedback values contained within the feedback vector, F. Additionally or alternatively, the embedded models block 18 may include one or more parameter limiting models, and in this embodiment the solution constraining logic 42 may receive as another input a model limit vector, ML, from the embedded models block 18, as shown in phantom in FIG. 1. In this embodiment, the solution constraining logic block 42 may be configured to limit the operating range of one or more of the unconstrained control parameter values as a function of one or more model limit values contained within the model limit vector, ML. Alternatively or additionally, the solution constraining logic block 42 may be configured to produce a "Best X" value, BX, rather than incorporating this function into the objective optimization logic block 40 as described hereinabove. In any case, the solution constraining logic block 42 is configured to limit the range of one or more of the optimized solution values contained within the solution vector, X', based on one or more corresponding limit values. In general, those skilled in the art will recognize that limits may be imposed for desirable transient performance, although steady state limits may be alternatively or additionally imposed. Those skilled in the art will further recognize that persistent action by the solution constraining logic block 42 may be indicative of system degradation, and the solution constraining logic block 42 may accordingly be configured to produce diagnostic information, DIAG, as shown in FIG. 1 to report diagnostic information to diagnostic processing logic (not shown) resident within control computer 14 or resident within other diagnostic processing circuitry external to control computer 14.

In one embodiment, the control framework output vector, X. produced by the solution constraining logic block 42 defines one or more control parameters, $X_1$-$X_M$, that may be fed directly to corresponding inputs of an actuator driver circuit 44 via a number of signal paths $46_1$-$46_M$, wherein M may be any positive integer. Corresponding outputs of the actuator driver circuit 44 are electrically connected to actuators $48_1$-$48_M$ via signal paths $50_1$-$50_M$, wherein the one or more control parameters, $X_1$-$X_M$ produced by the control framework 16 directly control operation of the number of actuators, $48_1$-$48_M$, via the actuator driver control circuit 44 to control corresponding operational features of the physical system 12. Alternatively or additionally, the control framework output vector, X. produced by the solution constraining logic block 42 may define one or more control parameters, $X_{M+1}$-$X_N$, that are fed to a control parameter processing logic block 52, wherein N may be any positive integer greater than M. The control parameter processing logic block 52 may include any number of software algorithms configured to process the one or more control parameters, $X_{M+1}$-$X_N$, and produce a number, P, of output signals that are supplied to corresponding inputs of the actuator driver circuit 44 via corresponding signal paths $54_1$-$54_P$, wherein P may be any positive integer. Corresponding outputs of the actuator driver circuit 44 are electrically connected to actuators $56_1$-$56_P$ via signal paths $58_1$-$58_P$, such that the one or more control parameters, $X_{M+1}$-$X_N$ produced by the control framework 16 are processed to form "P" control signals for controlling the operation of corresponding actuators, $56_1$-$56_P$, via the actuator driver control circuit 44 to, in turn, control corresponding operational features of the physical system 12. In an alternative embodiment, the control framework output vector, X, may be provided only as a feedback vector to the embedded models block 18, and in this case the "best X" vector, BX, optionally produced by the objective optimization block 40, as shown in phantom in FIG. 1, or optionally produced by the solution constraining logic block 42, as described hereinabove, may be used to provide the one or more control parameters, $X_1$-$X_N$, to the actuator drive circuit 44 and/or control parameter processing logic block 52.

It will be understood that the model-based control framework 16 may be responsive to sensory data produced by any of the sensors $20_1$-$20_J$, and/or to sensory data produced by one or more "virtual" sensors resident within the virtual sensor logic block 28, and/or to one or more system performance target values produced by the system performance target logic block 36, to determine the control framework output vector, X, containing the one or more control parameters for controlling operation of any one or more of the actuators $48_1$-$48_M$ and/or $56_1$-$56_P$ in closed-loop fashion. Alternatively or additionally, the control framework 16 may be responsive strictly to calibratible data values to determine the control framework output vector, X, containing the one or more control parameters for controlling operation of any one or more of the actuators $48_1$-$48_M$ and/or $56_1$-$56_P$ in open-loop fashion.

Figure 2:
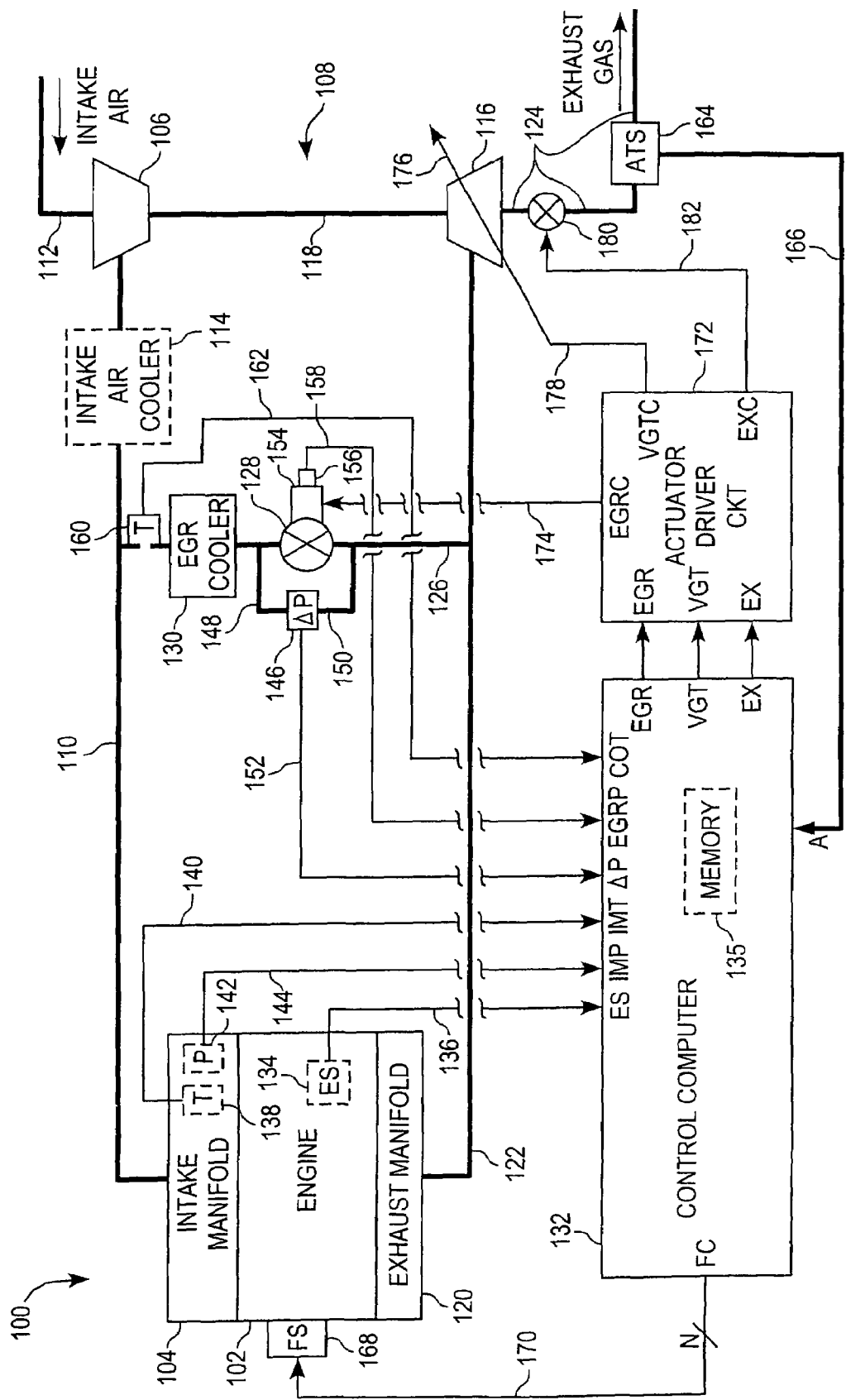
FIG. 2 is a diagram of one illustrative implementation of the control framework of FIG. 1 shown in the context of a control system for an internal combustion engine having an air handling system.

Referring now to FIG. 2, a diagram of one illustrative implementation of the control framework of FIG. 1 is shown in the context of a control system 100 for an internal combustion engine 102 having an air handling system including an EGR valve 128 and a turbocharger 108 with one or more actuators 176, 180 for controlling the swallowing capacity of the turbocharger turbine 116. It will be understood that the embodiment of system 100 illustrated and described hereinafter with respect to FIGS. 2-33 is provided only by way of example for the purpose of setting forth one illustrative implementation of the control framework shown and described with respect to FIG. 1, and is not intended to limit in any way the scope of the claims appended hereto. As described briefly hereinabove, other physical systems employing the control framework concepts shown and described herein, some examples of which were described, are likewise intended to fall within the scope of the appended claims.

In any case, system 100 includes an internal combustion engine 102 having an intake manifold 104 fluidly coupled to a compressor 106 of a turbocharger 108 via intake conduit 110. Turbocharger compressor 106 includes a compressor inlet coupled to an intake conduit 112 receiving fresh ambient air, and a compressor outlet fluidly coupled to intake conduit 110. Optionally, as shown in phantom in FIG. 2, system 100 may include an intake air cooler 114 of known construction disposed in-line with intake conduit 110 between the turbocharger compressor 106 and the intake manifold 104. The turbocharger compressor 106 is mechanically coupled to a turbocharger turbine 116 via a drive shaft 118, wherein turbine 116 includes a turbine inlet fluidly coupled to an exhaust manifold of the engine 120 via an exhaust conduit 122. A turbine outlet of turbine 116 is fluidly coupled to ambient via an exhaust conduit 124.

An exhaust gas recirculation system comprising part of system 100 includes an EGR valve 128 disposed in-line with an EGR conduit 126 fluidly connected between exhaust conduit 122 and intake conduit 110. An EGR outlet of the EGR valve 128 is fluidly coupled via EGR conduit 126 to an inlet of an EGR cooler 130 having an outlet fluidly coupled to the intake conduit 110. The EGR cooler 130 is configured in a known manner to cool recirculated exhaust gas flowing through the EGR conduit 126. The EGR valve 128 is of known construction and is electronically controllable, as will be described in greater detail hereinafter, to selectively control the flow of recirculated exhaust gas from the exhaust manifold 120 to the intake manifold 104.

System 100 includes a control computer 132 that is generally operable to control and manage the overall operation of engine 102. Control computer 132 includes a memory unit 135 as well as a number of inputs and outputs for interfacing with various sensors and systems coupled to engine 102. Control computer 132 is, in one embodiment, microprocessor-based and may be a known control unit sometimes referred to as an electronic or engine control module (ECM), electronic or engine control unit (ECU) or the like, or may alternatively be a general purpose control circuit capable of operation as will be described hereinafter. In any case, control computer 132 includes one or more software algorithms, as will be described in greater detail hereinafter, that are stored in memory 135 and configured to implement the control framework concepts described hereinabove with respect to FIG. 1.

Control computer 132 includes a number of inputs for receiving signals from various sensors or sensing systems associated with system 100. For example, system 100 includes an engine speed sensor 134 electrically connected to an engine speed input, ES, of control computer 132 via signal path 136. Engine speed sensor 134 is operable to sense rotational speed of the engine 102 and produce an engine speed signal on signal path 136 indicative of engine rotational speed. In one embodiment, sensor 134 is a Hall effect sensor operable to determine engine speed by sensing passage thereby of a number of equi-angularly spaced teeth formed on a gear or tone wheel. Alternatively, engine speed sensor 134 may be any other known sensor operable as just described including, but not limited to, a variable reluctance sensor or the like.

System 100 further includes an intake manifold temperature sensor 138 disposed in fluid communication with the intake manifold 104 of engine 102, and electrically connected to an intake manifold temperature input, IMT, of control computer 132 via signal path 140. Intake manifold temperature sensor 138 may be of known construction, and is operable to produce a temperature signal on signal path 140 indicative of the temperature of air charge entering the intake manifold 104, wherein the air charge flowing into the intake manifold 104 is generally made up of fresh air supplied by the turbocharger compressor 106 combined with recirculated exhaust gas that is controllably routed through EGR valve 128.

System 100 further includes an intake manifold pressure sensor 142 disposed in fluid communication with intake manifold 104 and electrically connected to an intake manifold pressure input, IMP, of control computer 132 via signal path 144. Alternatively, pressure sensor 142 may be disposed in fluid communication with intake conduit 102. In any case, pressure sensor 142 may be of known construction, and is operable to produce a pressure signal on signal path 144 indicative of the pressure within intake conduit 102 and intake manifold 104.

System 100 further includes a differential pressure sensor, or ΔP sensor, 146 having one inlet fluidly coupled to EGR conduit 126 downstream of the EGR valve 128 via conduit 148, and an opposite inlet fluidly connected to EGR conduit 126 upstream of EGR valve 128 via conduit 150. Alternatively, the ΔP sensor 146 may be coupled across another flow restriction mechanism disposed in-line with EGR conduit 126. In any case, the ΔP sensor 146 may be of known construction and is electrically connected to a ΔP input of control computer 132 via signal path 152. The ΔP sensor 146 is operable to provide a differential pressure signal on signal path 152 indicative of the pressure differential across EGR valve 128 or other flow restriction mechanism as just described.

System 100 further includes a known EGR actuator 154 that is electronically controllable to selectively position the EGR valve 128 relative to a reference position to thereby control the flow of recirculated exhaust gas through the EGR valve 128. Also included is an EGR valve position sensor 156 electrically connected to an EGR valve position input, EGRP, of control computer 132 via signal path 158. Sensor 156 may be of known construction and is operable to determine a position of the EGR valve 128 by determining a position of EGR valve actuator 154 relative to a reference actuator position, and producing a position signal on signal path 158 indicative of the position of EGR valve 128 relative to its reference position.

System 100 further includes an EGR cooler outlet temperature sensor 160 disposed in fluid communication with EGR conduit 126 adjacent to the EGR cooler outlet orifice and electrically connected to an EGR cooler outlet temperature input, COT, of control computer 132 via signal path 162. EGR cooler outlet temperature sensor 160 may be of known construction, and is operable to produce a temperature signal on signal path 162 indicative of the temperature of exhaust gas exiting the exhaust gas outlet orifice of the EGR cooler 130. Alternatively, the temperature sensor 160 may be located elsewhere along EGR conduit 126 at a location suitable for detecting the temperature of exhaust gas exiting the exhaust gas outlet orifice of the EGR cooler 130.

System 100 further includes an after-treatment system (ATS) 164 disposed in-line with exhaust conduit 124. ATS 164 may be a known exhaust gas after-treatment system configured to perform any number of exhaust gas emission reduction functions including, for example, but not limited to, exhaust gas particulate reduction, NOx (oxides of nitrogen) reduction, SOx (oxides of sulfur) reduction, unburned hydrocarbon (UHC) reduction, and/or the like. ATS 164 may include any number of sensors, including, for example, but not limited to, one or more temperature, pressure, flow rate, reductant level and/or other sensors, operable to provide information relating to one or more properties of exhaust gas entering and/or exiting ATS 164 and/or relating to the operation of the ATS itself. ATS 164 may further include a dedicated signal processing circuit (not shown) configured to process signals provided by one or more of the sensors associated with ATS 164 and provide corresponding ATS operating information, ATS commands and/or ATS limit information to the control computer 132 in the form of an after-treatment information vector, A, via signal path or paths 166. One embodiment of an after-treatment system including a number of sensors and signal processing circuitry as just described is disclosed in U.S. Patent Application Pub. No. US 2005/0005773 A1, entitled ARRANGEMENT FOR MOUNTING ELECTRICAL COMPONENTS TO AN AFTERTREATMENT FILTER, and the disclosure of which is incorporated herein by reference. In the embodiment illustrated in FIG. 2, ATS 164 is configured to provide as part of the after-treatment information vector, A, at least an exhaust gas temperature command value, an exhaust gas temperature limit value, a reductant remaining value, a NOx efficiency value, a dry particulate matter (DPM) efficiency value and an unburned hydrocarbon (UHC) efficiency value. Those skilled in the art will recognize that ATS 164 may alternatively be configured to provide more or less information as part of the aftertreatment information vector, A, and that the particular information needed will generally be dictated by the application.

Control computer 132 also includes a number of outputs for controlling one or more engine functions associated with system 100. For example, system 100 includes a fuel system 168 electrically connected to a fuel command output, FC, of control computer 132 via a number, N, of signal paths 170 wherein N may be any positive integer. Fuel system 168 is responsive to the fueling commands, FC, produced by control computer 132 to supply fuel to engine 102 in a known manner.

Control computer 132 is operable to supply an EGR valve control signal, EGR, to an actuator driver circuit 172, and the actuator driver circuit 172 is, in turn, operable to provide an EGR actuator control signal, EGRC, to the EGR actuator 154 via signal path 174. The EGR actuator 154 is responsive to the EGR actuator control signal, EGRC, to control the position of EGR valve 128 relative to its reference position in a known manner.

In the illustrated embodiment, the turbocharger turbine 116 is a variable geometry turbine (VGT) having an actuator, generally designated as 176, responsive to a VGT actuator control signal, VGTC, to control the swallowing capacity of the turbine 116 in a known manner. In this embodiment, the control computer 132 is operable to supply a VGT control signal, VGT, to the actuator driver circuit 172, and the actuator driver circuit 172 is, in turn, operable to supply the VGT actuator control signal, VGTC, to the VGT actuator 176 via signal path 178.

System 100 further includes an exhaust throttle or valve 180 disposed in-line with exhaust conduit 124. While the exhaust throttle is illustrated in FIG. 2 as being located upstream of the after-treatment system 164, those skilled in the art will recognize that throttle 180 may alternatively be positioned downstream of ATS 164. Alternatively still, the exhaust throttle 180 may be positioned in-line with the exhaust conduit 122 upstream of the turbocharger turbine 116. In any case, the exhaust throttle 180 is responsive to an exhaust throttle actuator control signal, EXC, to control the flow of exhaust gas therethrough, thereby controlling the operating efficiency of the turbocharger turbine 116. In this embodiment, the control computer 132 is operable to supply an exhaust throttle control signal, EX, to the actuator driver circuit 172, and the actuator driver circuit 172 is, in turn, operable to supply the exhaust throttle actuator control signal, EXC, to the exhaust throttle 180 via signal path 182.

Figure 3:
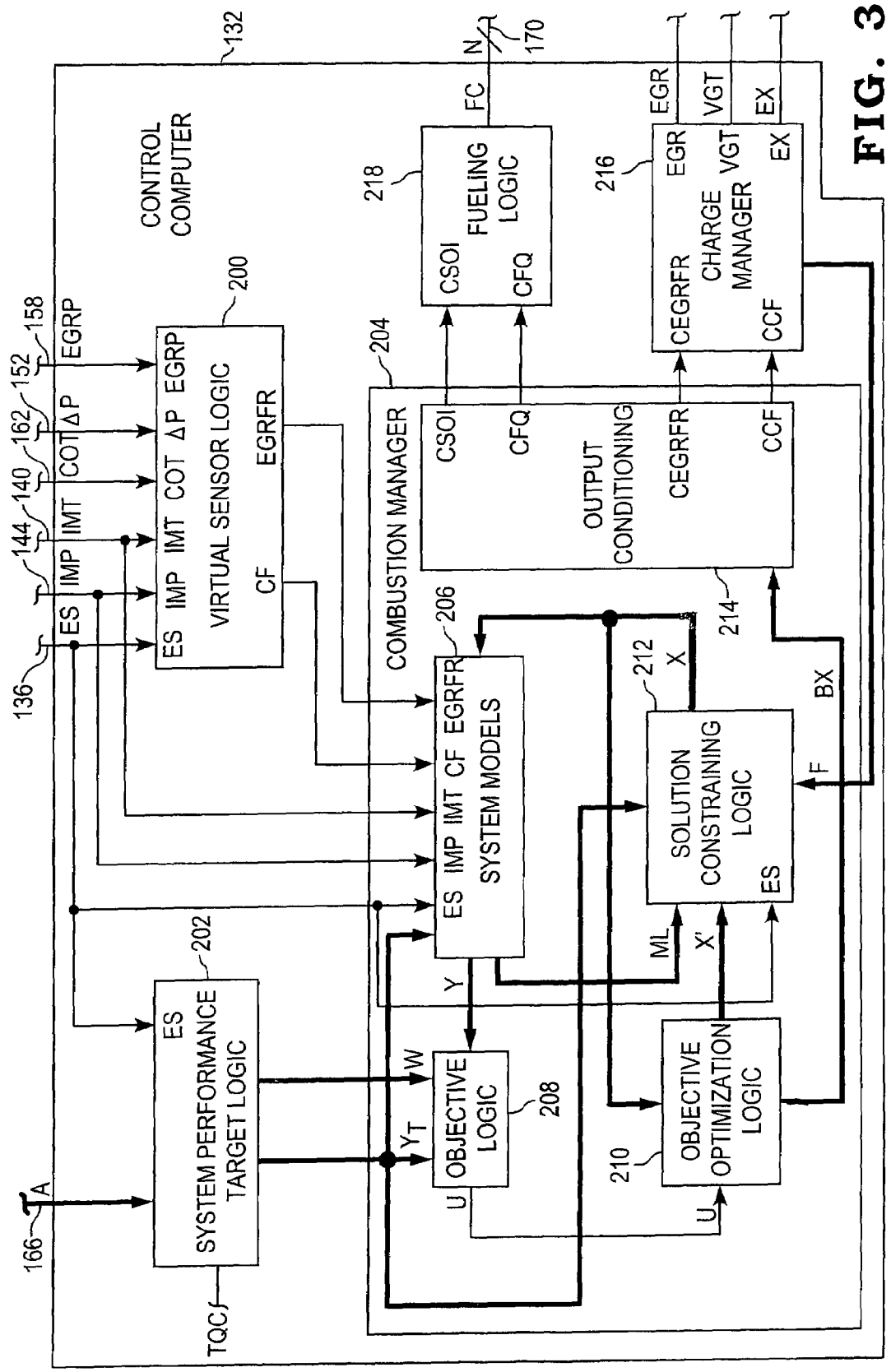
FIG. 3 is a block diagram illustrating some of the internal features of the control computer illustrated in FIG. 2, including the control framework of FIG. 1 implemented in the context of a combustion manager block.

Referring now to FIG. 3, a block diagram of one illustrative configuration of some of the internal features of the control computer 132 of FIG. 2 is shown, including one example implementation of the control framework of FIG. 1 implemented in the context of a combustion manager block 204. Control computer 132 includes a virtual sensor logic block 200, which corresponds to the virtual sensor logic block 28 illustrated in the generalized system 10 of FIG. 1, and which receives as inputs the engine speed signal, ES, on signal path 136, the intake manifold pressure signal, IMP, on signal path 144, the intake manifold temperature signal, IMT, on signal path 140, the EGR cooler outlet temperature, COT, on signal path 162, the pressure differential signal, ΔP, on signal path 152 and the EGR valve position signal, EGRP, on signal path 158. The virtual sensor logic block 200 is operable to estimate values of the charge flow rate, CF, corresponding to the flow rate of charge (combination of fresh air and recirculated exhaust gas) entering the engine 102 via the intake manifold 104, and the EGR fraction, EGRFR, corresponding to the fraction of total charge entering the engine 102 via the intake manifold 104 that is composed of recirculated exhaust gas.

In the illustrated embodiment, the virtual sensor logic block 200 is configured to first estimate values of charge flow rate, CF, and EGR flow rate, EGRF, and then compute the EGR fraction value, $EGR_F$, as a function of the estimated CF and EGRF values. In one embodiment, block 200 is configured to estimate the charge flow value, CF, by first estimating the volumetric efficiency ($\eta_v$) of the charge intake system, and then computing CF as a function of $\eta_v$ using a conventional speed/density equation. Any known technique for estimating $\eta_v$ may be used, and in one embodiment of block 200, $\eta_v$ is computed according to a known Taylor mach number-based volumetric efficiency equation given as:

$$\eta_v = A_1 * \{(Bore/D)^2 * (stroke*ES)^B / sqrt(\gamma * R * IMT) * [(1 + EP/IMP) + A_2]\} + A_3 \quad (1),$$

where, $A_1, A_2, A_3$ and B are all calibratable parameters fit to the volumetric efficiency equation based on mapped engine data, Bore is the intake valve bore length, D is the intake valve diameter, stroke is the piston stroke length, wherein Bore, D and stroke are dependent upon engine geometry, γ and R are known constants (e.g., γ*R=387.414 J/kg/deg K), ES is engine speed, IMP is the intake manifold pressure, EP is the exhaust pressure, where EP=IMP+ΔP, and IMT=intake manifold temperature.

With the volumetric efficiency value $\eta_v$ estimated according to the foregoing equation, block 200 is configured to compute the charge flow value, CF, according to the equation:

$$CF = \eta_v * V_{DIS} * ES * IMP / (2 * R * IMT) \quad (2),$$

where, $\eta_v$ is the estimated volumetric efficiency, $V_{DIS}$ is engine displacement and is generally dependent upon engine geometry, ES is engine speed, IMP is the intake manifold pressure, R is a known gas constant (e.g., R=53.3 ft-lbf/lbm ° R or R=287 J/Kg ° K), and IMT is the intake manifold temperature.

Those skilled in the art will recognize that the charge flow value, CF, may alternatively be computed or otherwise determined according to other known techniques. For example, system 100 may optionally include a mass flow sensor (not shown) disposed in-line with intake conduit 110 downstream of the junction of conduit 110 with EGR conduit 126, or alternatively suitably disposed in fluid communication with the intake manifold 104, and control computer 132 may be configured in a known manner to determine charge flow values directly from information provided by such a sensor. As another example, control computer 132 may be configured to estimate the charge flow value, CF, according to one or more known charge flow estimation techniques other than that just described. Any such alternate mechanisms and/or techniques for determining the charge flow value, CF, are intended to fall within the scope of the claims appended hereto.

In one embodiment, block 200 is configured to estimate the EGR flow rate, EGRF, as a function of the pressure differential value, ΔP, the intake manifold pressure, IMP, the EGR cooler outlet temperature, COT, and an effective flow area, EFA, corresponding to the cross-sectional flow area defined through EGR conduit 126. Block 126 is configured, in one specific embodiment, to compute the effective flow area value, EFA, as a function of the EGR valve position signal, EGRP. In this embodiment, block 200 may include one or more equations, graphs and/or tables relating EGR position values, EGRP, to effective flow area values, EFA. Alternatively, block 200 may be configured to determine the effective flow are value, EFA, according to other known techniques. In any case, block 200 is operable to estimate the EGR flow value, EGRF according to the equation:

$$EGRF = EFA * sqrt[|(2 * \Delta P * IMP)/(R * COT)|] \quad (3),$$

where,

EFA is the effective flow area through EGR conduit 38,

ΔP is the pressure differential across EGR valve 36,

IMP is the intake manifold pressure,

R is a known gas constant (e.g., R=53.3 ft-lbf/lbm ° R or R=287 J/Kg ° K), and

COT is the EGR cooler outlet temperature.

Alternatively, block 200 may be additionally configured to determine an exhaust gas temperature value, corresponding to the temperature of exhaust gas produced by engine 102, and to substitute the exhaust gas temperature value for the EGR cooler outlet temperature value in equation (3). In one embodiment, for example, block 200 may be configured to estimate the exhaust gas temperature as a function of a number of engine operating conditions, and details relating to one such configuration of block 200 are described in U.S. Pat. No. 6,508,242 B2, entitled SYSTEM FOR ESTIMATING ENGINE EXHAUST TEMPERATURE, which is assigned to the assignee of the present invention, and the disclosure of which is incorporated herein by reference. Those skilled in the art will recognize that the exhaust gas temperature value may alternatively be computed according to other known exhaust gas temperature estimation techniques. Alternatively, system 100 may include an exhaust gas temperature sensor (not shown) and control computer 132 may be configured in a known manner to determine exhaust gas temperature information directly from information provided by such a sensor. Any such alternate mechanisms and/or techniques for determining the exhaust gas temperature value are intended to fall within the scope of the claims appended hereto.

In any case, further details relating to the foregoing EGR flow rate estimation technique, as well as other suitable EGR flow rate estimation techniques, are described in co-pending U.S. Pat. No. 6,837,227 B2, entitled SYSTEM AND METHOD FOR ESTIMATING EGR MASS FLOW AND EGR FRACTION, which is assigned to the assignee of the present invention, and the disclosure of which is incorporated herein by reference. Those skilled in the art will recognize that other known techniques may be used to estimate or otherwise determine the EGR flow rate value, EGRF. For example, system 100 may include a CO or $CO_2$ sensor of known construction and fluidly coupled to intake manifold 104 or intake conduit 110 downstream of the junction of intake conduit 20 with the EGR conduit 126. Such a CO or $CO_2$ sensor will be operable to produce a signal indicative of CO or $CO_2$ level of air charge entering the intake manifold 104, and such information may be used to determine the EGR flow rate value, EGRF, using known equations. As another example, system 100 may include mass flow rate sensor disposed in-line with EGR conduit 126 (not shown), and control computer 132 may be configured in such an embodiment to receive the EGR mass flow rate information directly from such as sensor, in which case the EGR flow rate estimation technique just described may be omitted from block 200. As yet another example, the control computer 132 may include other EGR flow rate estimation algorithms, such as one or more the algorithms described in the above-referenced document, wherein control computer 132 may be operable to estimate the EGR flow rate according to one or more such alternative EGR flow rate estimation strategies. Any and all such alternative EGR flow rate determination techniques and strategies are intended to fall within the scope of the claims appended hereto.

In any case, with the EGR flow rate, EGRF, and charge flow rate, CF, determined according to any of the foregoing techniques, block 200 is configured to compute the EGR fraction value, EGRFR, as a ratio of CF and EGRF; i.e., EGRFR=CF/EGRF. It is to be understood that the computation of the EGR fraction value, EGRFR, just described represents a simplified approximation of this parameter based on assumptions of constant exhaust gas temperature through the EGR valve 128 and steady state flow of exhaust gas through EGR valve 128, and neglecting effects resulting from variable time delays between the passage of recirculated exhaust gas through EGR valve 128 and arrival of the corresponding EGR fraction in the engine cylinders. Further details relating to strategies for addressing such assumptions are described in co-pending U.S. Pat. No. 6,837,227 B2, entitled SYSTEM AND METHOD FOR ESTIMATING EGR MASS FLOW AND EGR FRACTION, which is assigned to the assignee of the present invention, and the disclosure of which has been incorporated herein by reference. In any case, the virtual sensor block 200 provides as outputs the charge flow value, CF, and the EGR fraction value, EGRFR.

The control computer 132 illustrated in FIG. 3 further includes a system performance target logic block 202 receiving as inputs the aftertreatment information vector, A, on signal path 166, the engine speed signal on signal path 136, and an internally generated torque control signal or value, TQC. The torque control signal, TQC, corresponds to a desired or target engine output torque value, and may be generated by one or more known control algorithms resident within memory 135 operable to produce TQC as a function of one or more engine operating conditions; e.g., torque request signal produced by an accelerator pedal (not shown) associated with the vehicle carrying engine 102, torque request signal produced by a known cruise control algorithm, and/or one or more torque limiting values produced by one or more corresponding engine output torque limiting algorithms. In any case, the system performance target logic block 202 illustrated in FIG. 3 corresponds to the system performance target logic block 36 illustrated and described with respect to FIG. 1. In the embodiment illustrated in FIG. 3, block 202 is operable to produce as outputs the system performance target vector, $Y_T$, and the weight vector, W. One illustrative embodiment of the system performance target logic block 202 will be illustrated and described more fully hereinafter with respect to FIGS. 4-10.

The control computer 132 further includes a combustion manager block 204 that corresponds to the model-based control framework 16 illustrated and described with respect to FIG. 1. The combustion manager block 204 includes a system models block 206 that corresponds to the embedded models block 18 illustrated and described with respect to FIG. 1. In the illustrated embodiment, the system models block 206 receives as inputs an output vector, X, produced by the solution constraining logic block 212, the charge flow and EGR fraction values, CF and EGRFR respectively, produced by the virtual sensor logic block 200, as well as the intake manifold temperature, IMT, on signal path 140, the intake manifold pressure value, IMP, on signal path 144, the engine speed signal, ES, on signal path 136, and one or more system performance target values forming part of the system performance target vector, $Y_T$. In one embodiment, as will be described in greater detail hereinafter with respect to FIGS. 11-24, the system models block 206 includes a number of mathematical models each producing as an output a different operating parameter of system 100, and information provided by such models is produced by block 206 in the form of a number of model output values forming the model output vector, Y. The system models block 206 illustrated in FIG. 3 further includes a number of fuel limit models each producing as an output a different modeled fuel limit value, and information provided by such models is produced by block 206 in the form of a number of model limit values forming a model limit vector, ML. In an alternative embodiment, the system models block 206 may include the charge flow and EGR fraction models described hereinabove with respect to the virtual sensor logic block 200, in which case block 200 may be omitted and the various inputs signals required to estimate charge flow, CF, and EGR fraction, EGRFR, may be provided directly to the system models block 206.

The combustion manager block 204 further includes an objective logic block 208 that corresponds to the objective logic block 38 illustrated and described with respect to FIG. 1. The objective logic block 208 receives as inputs the model output vector, Y, the system performance target vector, $Y_T$, and the weight vector, W, and produces as an output the scalar performance metric, U, as a function thereof. One illustrative embodiment of the objective logic block 208 will be illustrated and described more fully hereinafter with respect to FIG. 25.

The scalar performance metric, U, and the output vector, X, are each provided as inputs to an objective optimization logic block 210 that corresponds to the objective optimization logic block 40 that was illustrated and described with respect to FIG. 1. The objective optimization logic block 210 is operable to produce an unconstrained solution vector, X', in a manner that minimizes the scalar performance metric, U. In the illustrated embodiment, the objective optimization block 210 is further operable to produce a "Best X" vector, BX, corresponding to an optimum one of a number of most recent scalar performance metric value, U. One illustrative embodiment of the objective optimization logic block 210 will be illustrated and described more fully hereinafter with respect to FIGS. 26-28.

The combustion manager block 204 further includes a solution constraining logic block 212 that corresponds to the solution constraining logic block 42 illustrated and described hereinabove with respect to FIG. 1. The solution constraining logic block 212 receives as inputs the unconstrained solution vector, X', produced by the objective optimization logic block 210, the model limit vector, ML, produced by the system models block 206, the engine speed signal, ES, on signal path 136, a number of system performance target values forming part of the system performance target logic vector, $Y_T$, and a feedback vector, F, produced by a charge manager block 216 that will be described more fully hereinafter. The solution constraining logic block 212 is operable to produce the output vector, X, corresponding to the vector X' constrained according to the solution constraining logic block 212. In the illustrated embodiment, the output vector, X, includes, as does the "Best X" vector, BX, a commanded start-of-injection value, a commanded fuel quantity value, a commanded EGR fraction value, and a commanded charge flow value. One illustrative embodiment of the solution constraining logic block 212 will be illustrated and described hereinafter with respect to FIGS. 29-32.

In the illustrated embodiment, the combustion manager block 204 further includes an output conditioning block 214 receiving the "Best X" vector, BX, and producing as outputs a commanded start-of-injection value, CSOI, a commanded fuel quantity value, CFQ, a commanded EGR fraction value, CEGRFR, and a commanded charge flow value, CCF. One illustrative embodiment of the command override logic block 214 will be illustrated and described hereinafter with respect to FIG. 33.

Control computer 132 further includes a fueling logic block 218 receiving as inputs the commanded start-of-injection value, CSOI, and the commanded fuel quantity value, CFQ, from the combustion manager block 204, and producing as an output the fueling command values, FC, on signal path 170. In one embodiment, block 218 includes one or more known control algorithms responsive to at least CSOI and CFQ, to determine the fueling command values, FC, in a manner well known in the art. The fueling system 168 is responsive to the fueling command values, FC, to supply fuel to engine 102 as described hereinabove.

Control computer 132 further includes a charge manager block 216 receiving as inputs the commanded EGR fraction value, CEGRFR, and the commanded charge flow value, CCF, produced by the combustion manager block 204, and producing the EGR control signal, EGR, the VGT control signal, VGT, and the exhaust throttle control signal, EX, as will as the feedback vector, F, supplied to the combustion manager block 204. The charge manager block 216 is responsive to at least the CCF and CEGRFR signals to determine and supply the air handling system control signals, EGR, VGT and EX, as well as the feedback vector, F, in a known manner. For example, the charge manager block 216 may be implemented in one embodiment as a combination of the charge limit manager and transform manager blocks illustrated and described in U.S. Pat. Nos. 6,480,782 B2 and 6,408,834 B1 respectively, each of which is assigned to the assignee of the subject invention, and the disclosures of which are each incorporated herein by reference. In any case, control computer 132 is operable, under the direction of the various logic blocks illustrated in FIG. 3, to control the fueling system 168 of the engine 102, as well as the air handling system of the engine 102, as a function of various engine operating conditions, aftertreatment system operating conditions and target operating conditions, as will be described in greater detail hereinafter.

Figure 4:
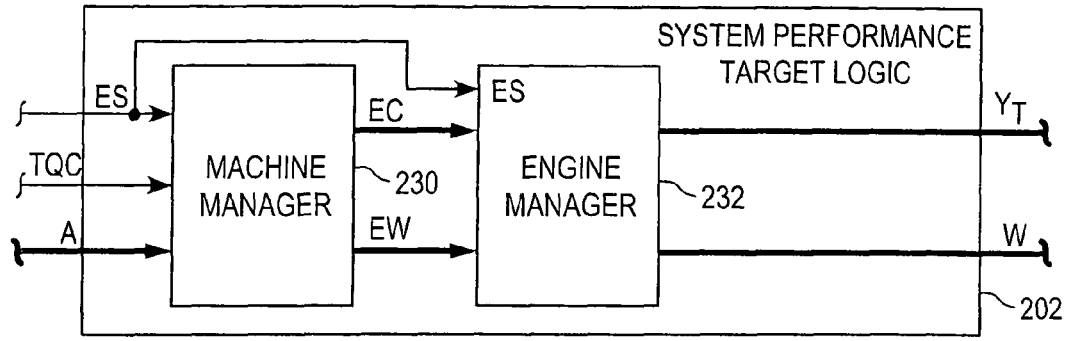
FIG. 4 is a block diagram of one illustrative embodiment of the system performance target logic block of FIG. 3.

Referring now to FIG. 4, one illustrative embodiment of the system performance target logic block 202 of FIG. 3 is shown. In the illustrated embodiment, block 202 includes a machine manager block 230 receiving as inputs the engine speed signal, ES, the torque command signal, TQC, and the aftertreatment vector A. The machine manager block 230 is responsive to the foregoing input signals and values to produce a number of engine control values in the form of an engine control vector, EC, as well as a number of engine weight values in the form of an engine weight vector, EW. Details relating to one illustrative embodiment of the machine manager block 230 illustrated in FIG. 4 will be described hereinafter with respect to FIGS. 5-8.

The system performance target logic block 202 further includes an engine manager block 232 receiving as inputs the engine speed signal, ES, and the engine control vector, EC, and engine weight vector, EW, produced by the machine manager block 230. The engine manager block 232 is responsive to the foregoing input signals and values to produce the system performance target vector, $Y_T$, and the weight vector, W, provided as an output of the system performance target logic block 202. Details relating to one illustrative embodiment of the engine manager block 232 will be described hereinafter with respect to FIGS. 9-10.

Figure 5:
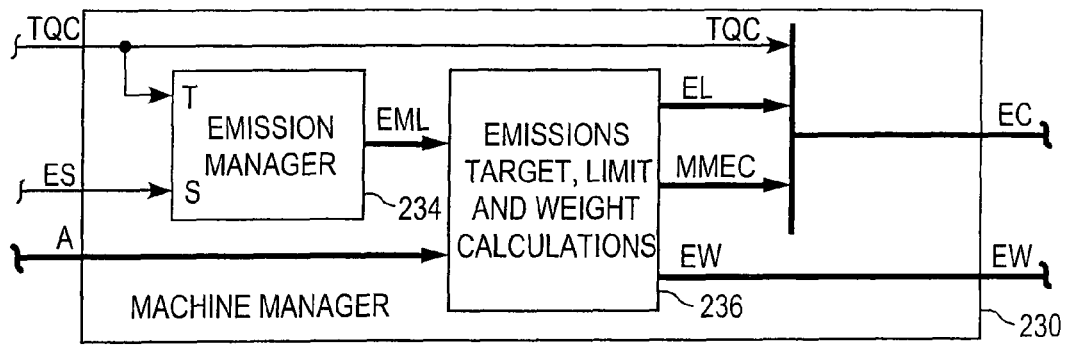
FIG. 5 is a block diagram of one illustrative embodiment of the machine manager logic block forming part of the system performance target logic block of FIG. 4.

Referring now to FIG. 5, one illustrative embodiment of the machine manager block 230 forming part of the system performance target logic block 202 of FIG. 4 is shown. Machine manager block 230 includes an emission manager block 234 having a torque input, T, receiving the torque command value, TQC, and a speed input, S, receiving the engine speed signal, ES. The emission manager block 234 is responsive to the torque and speed inputs to produce a number of emission manager limit values in the form of an emission manager limit vector, EML. The emission manager limit vector, EML, and the aftertreatment vector, A, are each supplied as inputs to an emission target, limit and weight calculation block 236 as illustrated in FIG. 5. The emissions target, limit and weight calculation block 236 is responsive to the emission manager limit vector, EML, and the aftertreatment vector, A, to produce a number of engine limit values in the form of an engine limit vector, EL, a number of machine manager engine command values in the form of a machine manager engine command vector, MMEC, and the engine weight vector, EW, described hereinabove with respect to FIG. 4. The torque command value, TQC, the engine limit vector, EL, and the machine manager engine command vector, MMEC, are combined as illustrated in FIG. 5 to form the engine command vector, EC, produced by the machine manager block 230.

Figure 6:
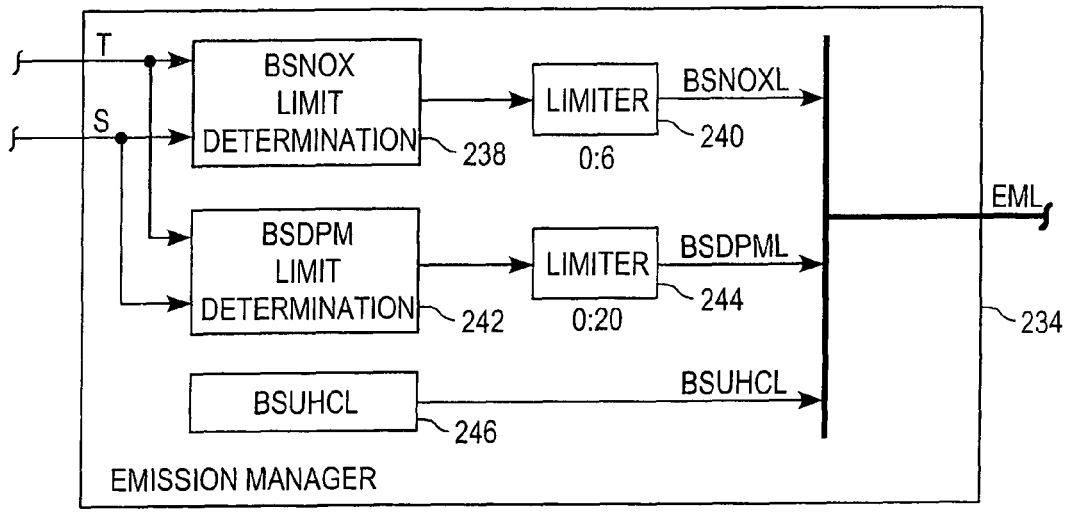
FIG. 6 is a block diagram of one illustrative embodiment of the emission manager logic block forming part of the machine manager logic block of FIG. 5.

Referring now to FIG. 6, one illustrative embodiment of the emission manager block 234 forming part of the machine manager block 230 of FIG. 5 is shown. Block 234 includes a BS NOX limit determination block 238 receiving as inputs the torque command value, TQC, and the engine speed value, ES. Block 238 is operable to determine BS NOx limit values as a function of commanded engine torque, TQC, and engine speed, ES, using a known relationship therebetween. In one embodiment, block 238 is implemented as a table mapping torque and speed values to BS NOx limit values, although block 238 may alternatively be implemented in the form of one or more mathematical equations, one or more charts or graphs, or the like, stored in memory 135 of control computer 132. The output of the BS NOX limit determination block 238 is supplied to a limiter 240 having specified lower and upper limit values; e.g., 0 and 6, respectively. The output of limiter block 240 is a BS NOx limit value, BSNOXL, which forms part of the emission manager limit vector, EML. Block 234 further includes a BS DPM (dry particulate matter) limit determination block 242 also receiving as inputs the commanded engine torque value, TQC, and the engine speed value, ES. The BS DPM limit determination block 242 is responsive to the torque and speed values to determine BS DPM limit values as a function thereof. In one embodiment, block 232 is implemented in the form of a table mapping torque and speed values to BS DPM limit values, although block 242 may alternatively be implemented in the form of one or more mathematical equations, charts or graphs, or the like. The output of BS DPM determination block 242 is supplied as an input to a limiter block 244 having lower and upper limit values; e.g., 1 and 20, respectively. The output of limiter block 244 is a BS DPM limit value, BSDPML, which forms part of the emission manager limit vector, EML. Block 244 further includes a memory location 246 having stored therein a BS UHC (unburned hydrocarbon) limit value, BSUHCL, which forms part of the emission manager limit value EML.

Figure 7:
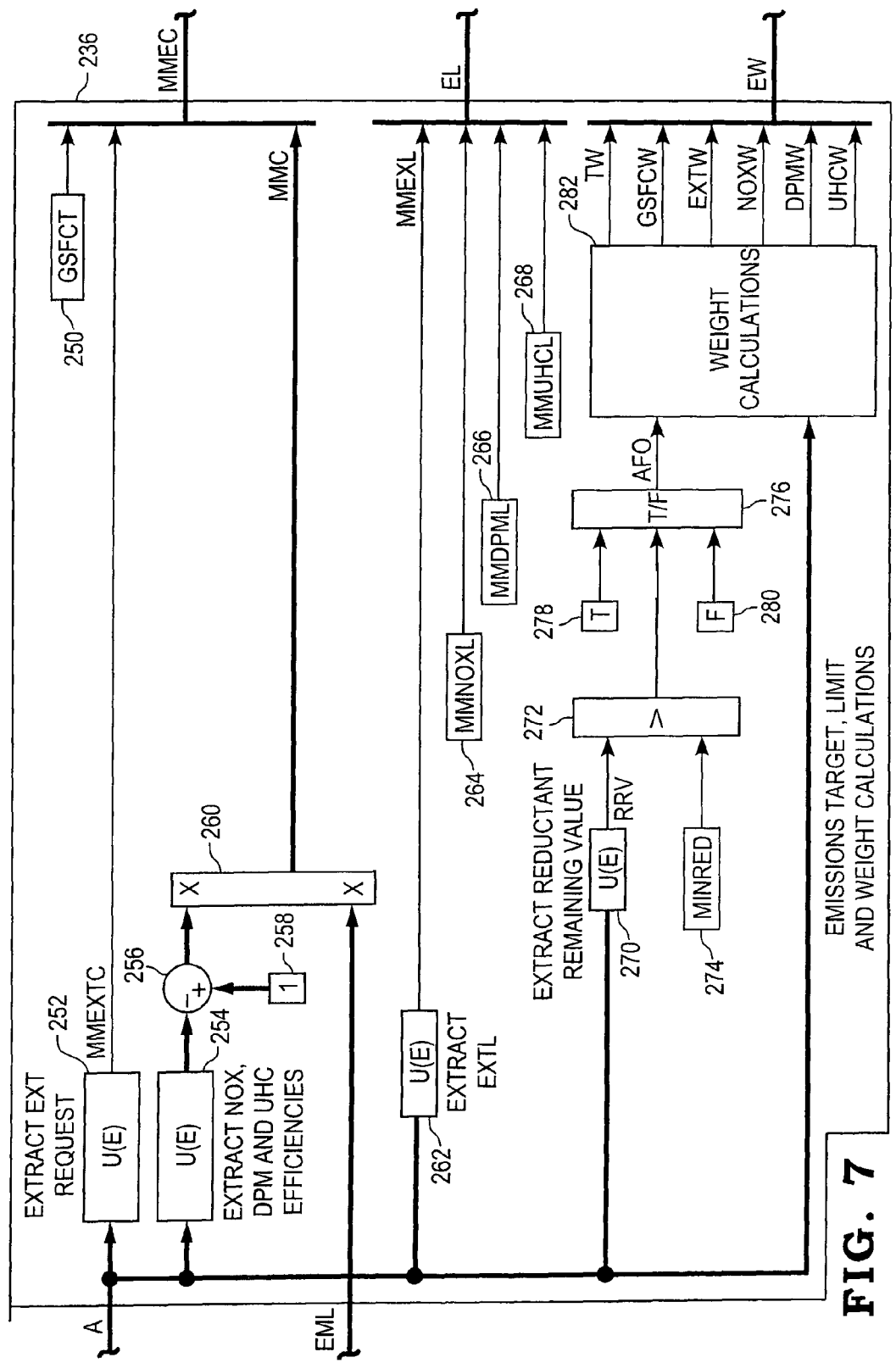
FIG. 7 is a block diagram of one illustrative embodiment of the emissions target, limit and weight calculations block forming part of the machine manager logic block of FIG. 5.

Referring now to FIG. 7, one illustrative embodiment of the emission target, limit and weight calculation block 236 forming part of the machine manager block 230 illustrated in FIG. 5 is shown. Block 236 includes a memory location 250 having stored therein a gross fuel command target value, GSFCT, which forms part of the machine manager engine command vector, MMEC. Block 236 further includes a data extraction block 252 receiving as an input the aftertreatment vector, A, and operable to extract an exhaust temperature request value forming part of the aftertreatment vector, A. The output of block 252 is a machine manager exhaust temperature command value, MMEXTC, corresponding to the exhaust temperature request value extracted from the aftertreatment vector, A, wherein MMEXTC forms part of the machine manager engine command vector MMEC.

Another data extraction block 254 receives as an input the aftertreatment vector, A, and is operable to extract NOx, DPM and UHC efficiency values forming part of the aftertreatment vector, A. These efficiency values are supplied to a subtraction input of a summation node 256 having an addition input receiving a vector of 1's from memory block 258. The output of summation node is supplied to a first input of a multiplication block 260 having a second input receiving the emission manager limit vector, EML, produced by the emission manager block 234 of FIG. 5. The multiplication block 260 is operable to multiply the output values of summation block 256 by the corresponding limit values forming the emission manager limit vector EML, and produced corresponding output value; e.g., (1−NOx efficiency)×BSNOXL, etc. The three values produced by multiplication block 260 form part of a machine manager command vector, MMC, which itself forms part of the machine manager engine command vector, MMEC, as illustrated in FIG. 7.

The aftertreatment vector, A, is further supplied to another data extraction block 262 configured to extract an exhaust temperature limit value, EXTL, from the aftertreatment vector, A. The exhaust temperature limit value, EXTL, extracted from the aftertreatment vector, A, is supplied as a machine manager exhaust temperature limit value, MMEXTL, by block 262 which forms part of the engine limit vector, EL, as illustrated in FIG. 7. Memory blocks 264, 266 and 268 have stored therein a machine manager NOx limit, MMNOXL, a machine manager DPM limit, MMDPML, and a machine manager UHC limit, MMUHCL, respectively. MMNOXL, MMDPML, and MMUHCL, each form part of the engine limit vector, EL, as illustrated in FIG. 7.

The aftertreatment vector, A, is provided to a further data extraction block 270 operable to extract a reductant remaining value, RRV, which corresponds to a quantity of emissions reductant fluid remaining in the aftertreatment system 164 (See FIG. 2). The reductant remaining value, RRV, is provided to a first input of a "greater than" block 272 having a second input receiving a minimum reductant value, MINRED, stored within memory block 274. The output of block 272 is "true" if the reductant remaining value, RRV, corresponding to an amount or quantity of reductant remaining in the aftertreatment system 164, is greater than a calibratible minimum reductant value, MINRED, and is otherwise "false." The output of block 272 is provided to a control input of a true/false block 276 having second and third data inputs receiving "true" and "false" values stored in memory blocks 278 and 280, respectively. The output of true/false block 276 corresponds to an "allow fuel optimization" value, AFO, and is provided as an input to a weight calculation block 282. As long as the reductant remaining value, RRV, is greater than the minimum reductant value, MINRED, AFO is "true" and is otherwise "false." The weight calculation block 282 receives at a second input the aftertreatment vector, A, as illustrated in FIG. 7. The weight calculation block 282 is operable to process the AFO value, as well as the aftertreatment values forming the aftertreatment vector, A, and produce a number of weight values forming the engine weight vector, EW. In the illustrated example, the weight calculation block 282 is configured to produce a torque weight value, TW, a gross fuel command weight value, GFSCW, an exhaust temperature weight value, EXTW, a NOx weight value NOXW, a dry particulate matter weight value, DPMW, and an unburned hydrocarbon weight value, UHCW. The combination of the foregoing weight values define the engine weight vector, EW, as illustrated in FIG. 7.

Figure 8:
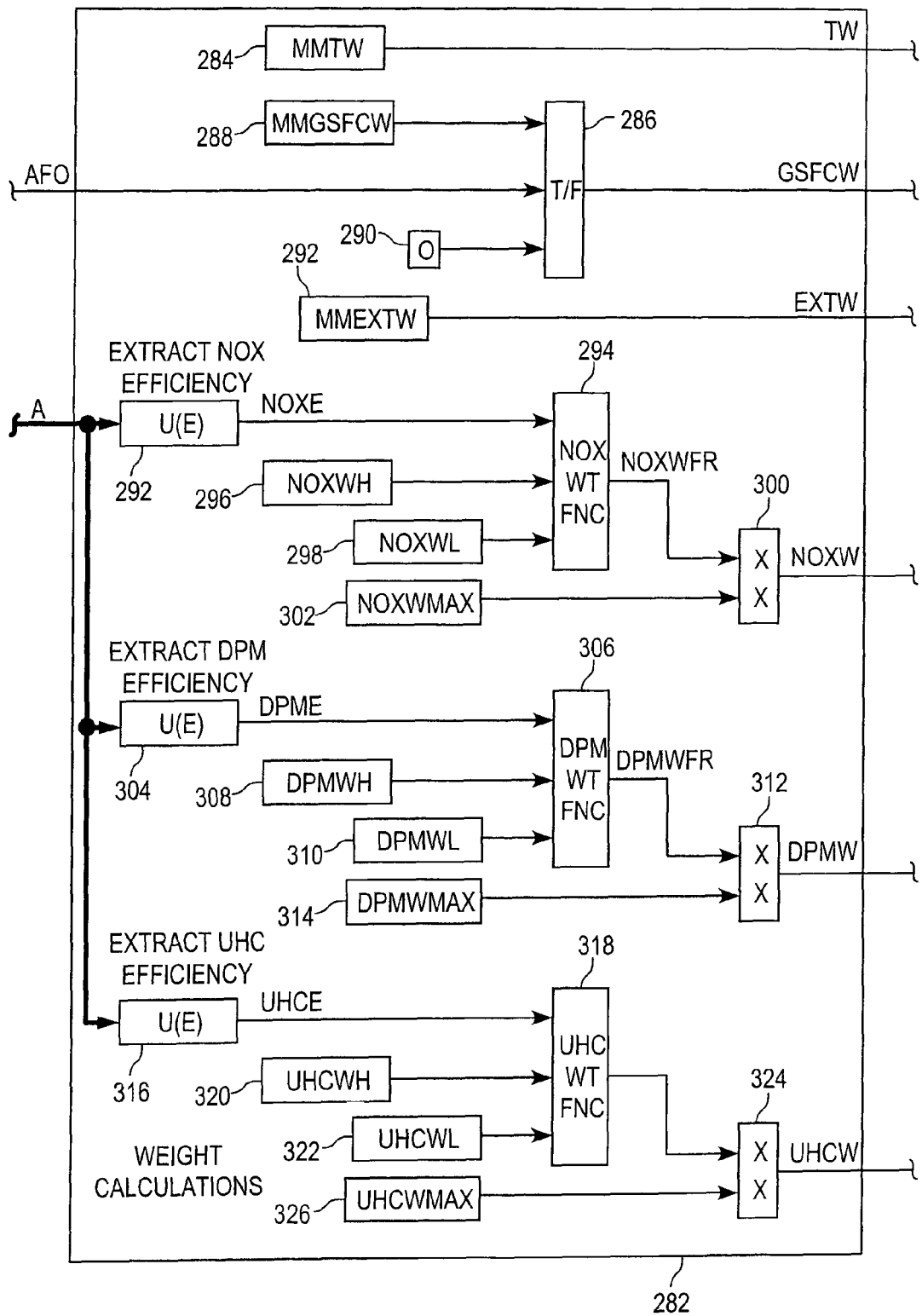
FIG. 8 is a block diagram of one illustrative embodiment of the weight calculations block forming part of the emissions target, limit and weight calculations block of FIG. 7.

Referring now to FIG. 8, one illustrative embodiment of the weight calculation block 282 forming part of the emissions target and weight calculation block 236 of FIG. 7 is shown. Block 282 includes a memory block 284 having stored therein a machine manager torque weight value, MMTW, which corresponds to the torque weight value, TW, produced by block 282. A machine manager gross fuel command weight value, MMGSFCW, is stored in memory block 288 and is provided as a "true" input to a true/false block 286. A "false" input of true/false block 286 receives a constant value; e.g., 0, stored in memory block 290, and a control input of true/false block 286 receives the "allow fuel optimization" value, AFO, produced by true/false block 276 of FIG. 7. The output of true/false block 286 is the gross fuel command weight value, GSFCW, produced by block 282, and in the illustrated embodiment is equal to the machine manager gross fuel command weight value, MMGSFCW, as long as AFO is "true," and is otherwise zero. A machine manager exhaust temperature weight value, MMEXTW, is stored in memory block 292, and corresponds to the exhaust temperature weight value, EXTW, produced by block 282.

The aftertreatment vector, A, is provided to a first data extraction block 292 operable to extract the NOx efficiency value, NOXE, from the aftertreatment vector, A, and provide NOXE as a first input to a NOX weight function block 294. Block 294 receives as a second input a high NOx weight value, NOXWH, stored in memory block 296, and a third input receiving a low NOx weight value, NOXWL, stored in memory block 298. The NOX weight function block 294 may be any known function operable to convert the NOx efficiency value, NOXE, to a NOx weight fraction value, NOXWFR, that is bounded by the NOXWH and NOXWL values respectively. The NOx weight fraction value, NOXWFR, produced by function block 294 is provided to a first input of a multiplication block 300 having a second input receiving a maximum NOx weight value, NOXWMAX, stored in memory block 302. The output of multiplication block 300 is the NOx weight value, NOXW, produced by block 282, and is the maximum allowable NOx weight value stored in block 302 multiplied by the fractional NOx weight value computed by function block 294 as a function of the NOx efficiency value, NOXE, extracted by block 292 from the aftertreatment vector, A.

The aftertreatment vector, A, is also provided to a second data extraction block 304 operable to extract the dry particulate matter (DPM) efficiency value, DPME, from the aftertreatment vector, A, and provide DPME as a first input to a DPM weight function block 306. Block 306 receives as a second input a high DPM weight value, DPMWH, stored in memory block 308, and a third input receiving a low DPM weight value, DPMWL, stored in memory block 310. The DPM weight function block 306 may be any known function operable to convert the DPM efficiency value, DPME, to a DPM weight fraction value, DPMWFR, that is bounded by the DPMWH and DPMWL values respectively. The DPM weight fraction value, DPMWFR, produced by function block 306 is provided to a first input of a multiplication block 312 having a second input receiving a maximum DPM weight value, DPMWMAX, stored in memory block 314. The output of multiplication block 312 is the DPM weight value, DPMW, produced by block 282, and is the maximum allowable DPM weight value stored in block 314 multiplied by the fractional DPM weight value computed by function block 306 as a function of the DPM efficiency value, DPME, extracted by block 304 from the aftertreatment vector, A.

The aftertreatment vector, A, is further provided to a third data extraction block 316 operable to extract the unburned hydrocarbon (UHC) efficiency value, UHCE, from the aftertreatment vector, A, and provide UHCE as a first input to a UHC weight function block 318. Block 318 receives as a second input a high UHC weight value, UHCWH, stored in memory block 320, and a third input receiving a low UHC weight value, UHCWL, stored in memory block 322. The UHC weight function block 318 may be any known function operable to convert the UHC efficiency value, UHCE, to a UHC weight fraction value, UHCWFR, that is bounded by the UHCWH and UHCWL values respectively. The UHC weight fraction value, UHCWFR, produced by function block 318 is provided to a first input of a multiplication block 324 having a second input receiving a maximum UHC weight value, UHCWMAX, stored in memory block 326. The output of multiplication block 324 is the UHC weight value, UHCW, produced by block 282, and is the maximum allowable UHC weight value stored in block 326 multiplied by the fractional UHC weight value computed by function block 318 as a function of the UHC efficiency value, UHCE, extracted by block 316 from the aftertreatment vector, A.

It will be noted that the target engine command values forming the engine command vector, EC, and the target engine weight values forming the engine weight vector, EW, both produced by the machine manager block 230 of FIG. 4, follow the information provided by the aftertreatment vector, A, and therefore follow capability (e.g., efficiency) of the aftertreatment system 164. This causality is based on the inherently slow response of the aftertreatment system 164 as compared with the typically faster response time of the remaining components of system 100 of FIG. 2.

Figure 9:
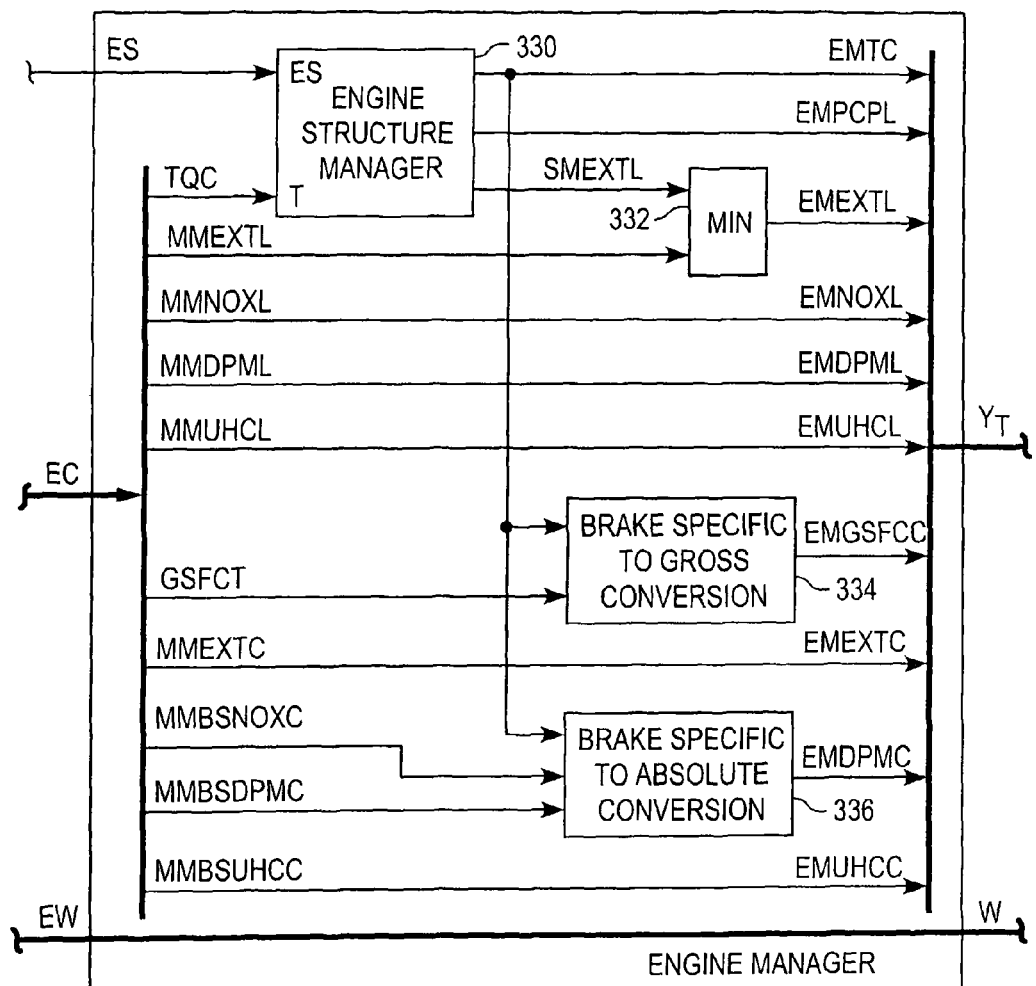
FIG. 9 is a block diagram of one illustrative embodiment of the engine manager block forming part of the system performance target logic block of FIG. 4.

Referring now to FIG. 9, one illustrative embodiment of the engine manager block 232 forming part of the system performance target logic block 202 of FIG. 4 is shown. Block 232 includes an engine structure manager block 330 having an engine speed input, ES, receiving the engine speed signal, ES, and a torque input, T, receiving the torque command value, TQC, forming part of the engine command vector, EC. The engine structure manager block 330 is operable to process the engine speed and torque input signals, and produce an engine manager torque command value, EMTC, an engine manager peak cylinder pressure limit, EMPCPL, and a structure manager exhaust temperature limit value, SMEXTL. EMTC and EMPCPL each form part of the system performance target logic vector, $Y_T$, and SMEXTL is provided to a first input of a minimum block 332 having a second input receiving the machine manager exhaust temperature limit value, MMEXTL, forming part of the engine command vector, EC. The output of minimum block 332, representing the minimum value of SMEXTL and MMEXTL, defines an engine manager exhaust temperature limit value, EMEXTL, and forms part of the system performance target logic vector, $Y_T$. The machine manager NOx limit, MMNOXL, machine manager dry particulate matter limit, MMDPML, machine manager unburned hydrocarbon limit, MMUHCL, machine manager exhaust temperature command, MMEXTC, and machine manager BS UHC command value MMBSUHCC, are each provided as pass-through values, EMNOXL, EMDPML, EMUHCL, EMEXTC and EMUHCC, respectively, each forming part of the system performance target logic vector, $Y_T$. Although not specifically shown in the drawings, the engine manager block 232 may further be configured to impose a lower unburned hydrocarbon limit, e.g., EMUHCL, for the purpose of preventing, or at least minimizing, lacquering of the EGR valve 128 and/or EGR cooler 130.

The engine manager block 232 further includes a brake specific-to-gross conversion block 334 receiving as inputs the engine manager torque command value, EMTC, produced by the engine structure manager block 330, and the gross fuel command torque value, GSFCT, forming part of the engine command vector, EC. Block 334 is responsive to the EMTC and GSFCT inputs to convert brake specific torque values to an engine manager gross fuel commands, EMGSFCC, which form part of the system performance target logic vector, $Y_T$. Another conversion block 336 receives as inputs the engine manager torque command value, EMTC, produced by the engine structure manager block 330, the machine manager BS NOX command, MMBSNOXC, and the machine manager BS DPM command, MMBSDPMC. Block 336 is operable to convert the brake specific input values to absolute engine manager dry particulate matter command values, EMDPMC, which form part of the system performance target logic vector, $Y_T$. The engine weight vector, EW, passes directly through the engine manager block 232 to form the weight vector, W, produced by the system performance target logic block 202.

Figure 10:
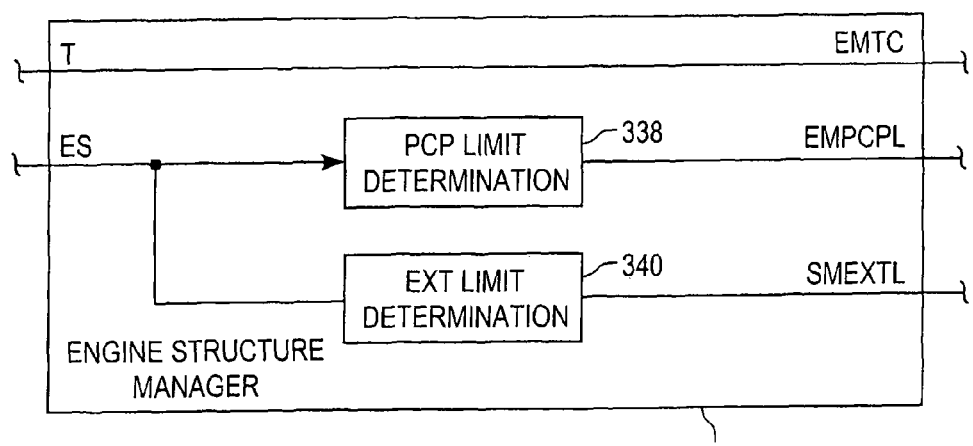
FIG. 10 is a block diagram of one illustrative embodiment of the engine structure manager block forming part of the engine manager block of FIG. 9.

Referring now to FIG. 10, one illustrative embodiment of the engine structure manager 330 forming part of the engine manager block 232 of FIG. 9 is shown. In the illustrated embodiment, the torque command value, TQC, received at the torque input, T, passes directly through block 330 to form the engine manager torque command value, EMTC. A peak cylinder pressure limit determination block 338 receives as an input the engine speed signal, ES, and processes this speed signal in known manner to produce the engine manager peak cylinder pressure limit value, EMPCPL. Likewise, an exhaust temperature limit determination block 340 receives as an input the engine speed signal, ES, and processes this speed signal in a known manner to produce the structure manager exhaust temperature limit value, SMEXTL.

In the illustrated embodiment, the system performance target logic block 202 is thus operable to process information provided by the aftertreatment system 164, in the form of an aftertreatment vector, A, as well and engine torque command and engine speed information, to determine system target and weight values, in the form of vectors $Y_T$ and W, respectively. The combustion manager block 204 is configured, as will be described in greater detail hereinafter, to control one or more system actuators in a manner that drives the operating conditions of system 100 to corresponding system target values. It will be understood that the system performance target logic block 202 may be alternately configured to produce the system performance target vector, $Y_T$, and/or weight vector, W, as a function of more or fewer input target and operating conditions, and any such alternate configuration of block 202 is intended to fall within the scope of the claims appended hereto.

It will be understood that the machine manager block 230 may be or include any one or more strategies for determining emissions targets and weights, and that the details of the machine manager block 230 illustrated and described herein are provided only by way of example. Similarly, the engine manager block 232 may include more, less or different parameters for protecting engine structure, and that the details of the engine manager block 232 illustrated and described herein are provided only by way of example.

Figure 11:
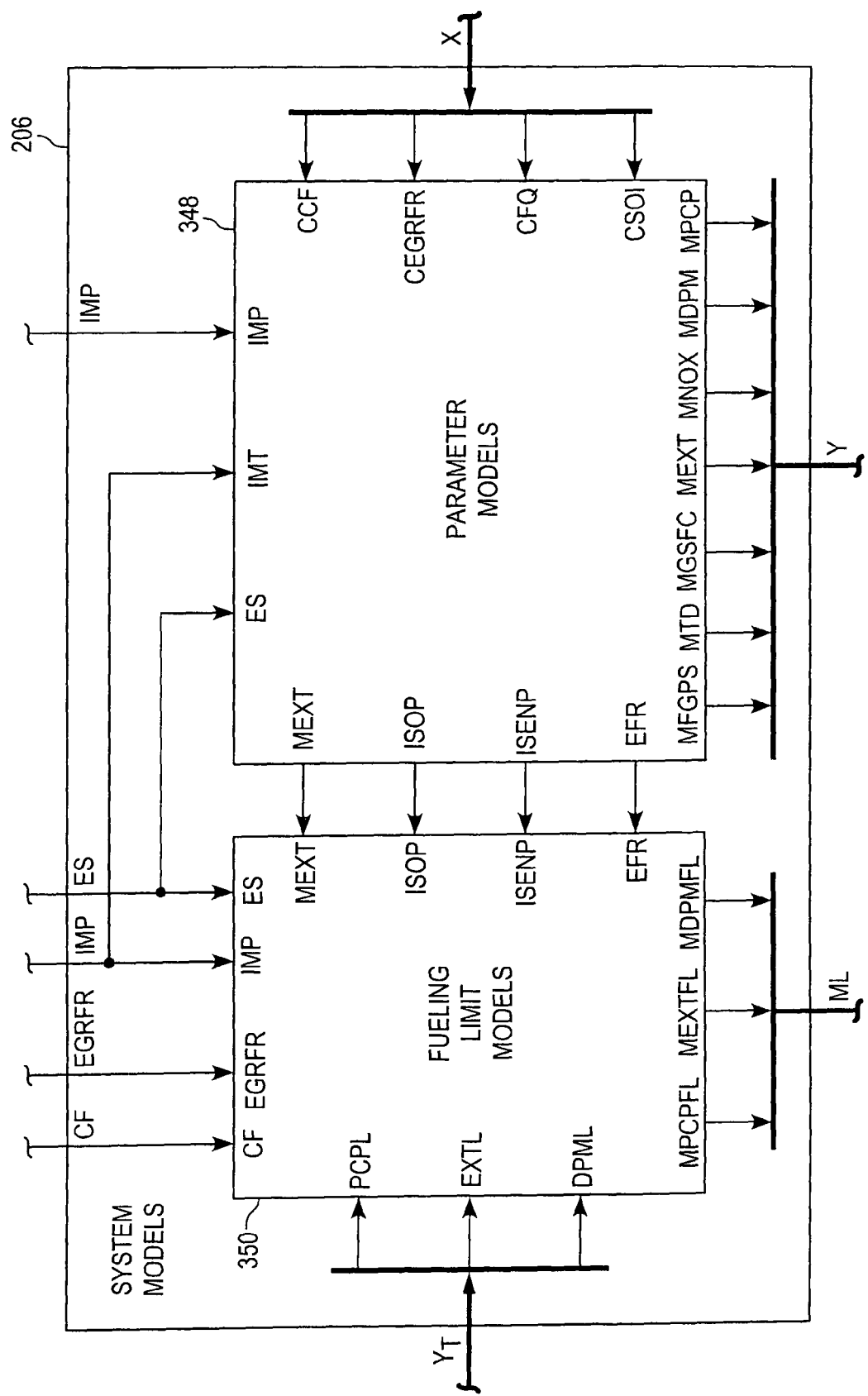
FIG. 11 is a block diagram of one illustrative embodiment of the system models block forming part of the combustion manager block of FIG. 3.

Referring now to FIG. 11, one illustrative embodiment of the system models block 206 forming part of the combustion manager block 204 of FIG. 3 is shown. In the illustrated embodiment, the system models block 206 includes a parameter models block 348 having an engine speed input, ES, an intake manifold temperature input, IMT, and an intake manifold pressure input, IMP, receiving the engine speed, intake manifold temperature and intake manifold pressure signals respectively. Parameter models block 348 further includes a commanded charge flow input, CCF, a commanded EGR fraction input, CEGRFR, a commanded fuel quantity input, CFQ, and a commanded start-of-injection input, CSOI, receiving the commanded charge flow, commanded EGR fraction, commanded fuel quantity and commanded start-of-injection values forming part of the output vector, X. The parameter models block 348 is operable, as will be described in greater detail hereinafter, to process the foregoing input signals and produce as part of the model output vector, Y, a modeled fueling, in gallons per second, value, MFGPS, a modeled engine output torque value, MTQ, a modeled gross fueling command value, MGSFC, a modeled exhaust temperature value, MEXT, a modeled NOx output value, MNOX, a modeled dry particulate matter value, MDPM, and a modeled peak cylinder pressure value, MPCP. The parameter models block 348 is further operable to provide to a fueling limit models block 350 the modeled exhaust temperature value, MEXT, an isochoric pressure value, ISOP, an isentropic pressure value, ISENP, and an energy fraction value, EFR.

In addition to the foregoing inputs, the fueling limit models block 350 receives as inputs the charge flow value, CF, and EGR fraction value, EGRFR, produced by the virtual sensor logic block 200 of FIG. 3, as well as the intake manifold temperature, IMT, and engine speed, ES, values. As additional inputs, the fueling limit models block receives the peak cylinder pressure limit value, PCPL, the exhaust temperature limit value, EXTL, and dry particulate matter limit value, DPML, each forming part of the system performance target logic vector, $Y_T$. The fueling limit models block 350 is operable, as will be described in greater detail hereinafter, to process the foregoing input signals and to produce as output values a modeled peak cylinder pressure fuel limit value, MPCPFL, a modeled exhaust temperature fuel limit value, MEXTFL, and a modeled dry particulate matter fuel limit value, MDPMFL, each forming part of the model limit vector, ML as illustrated in FIG. 11.

Figure 12:
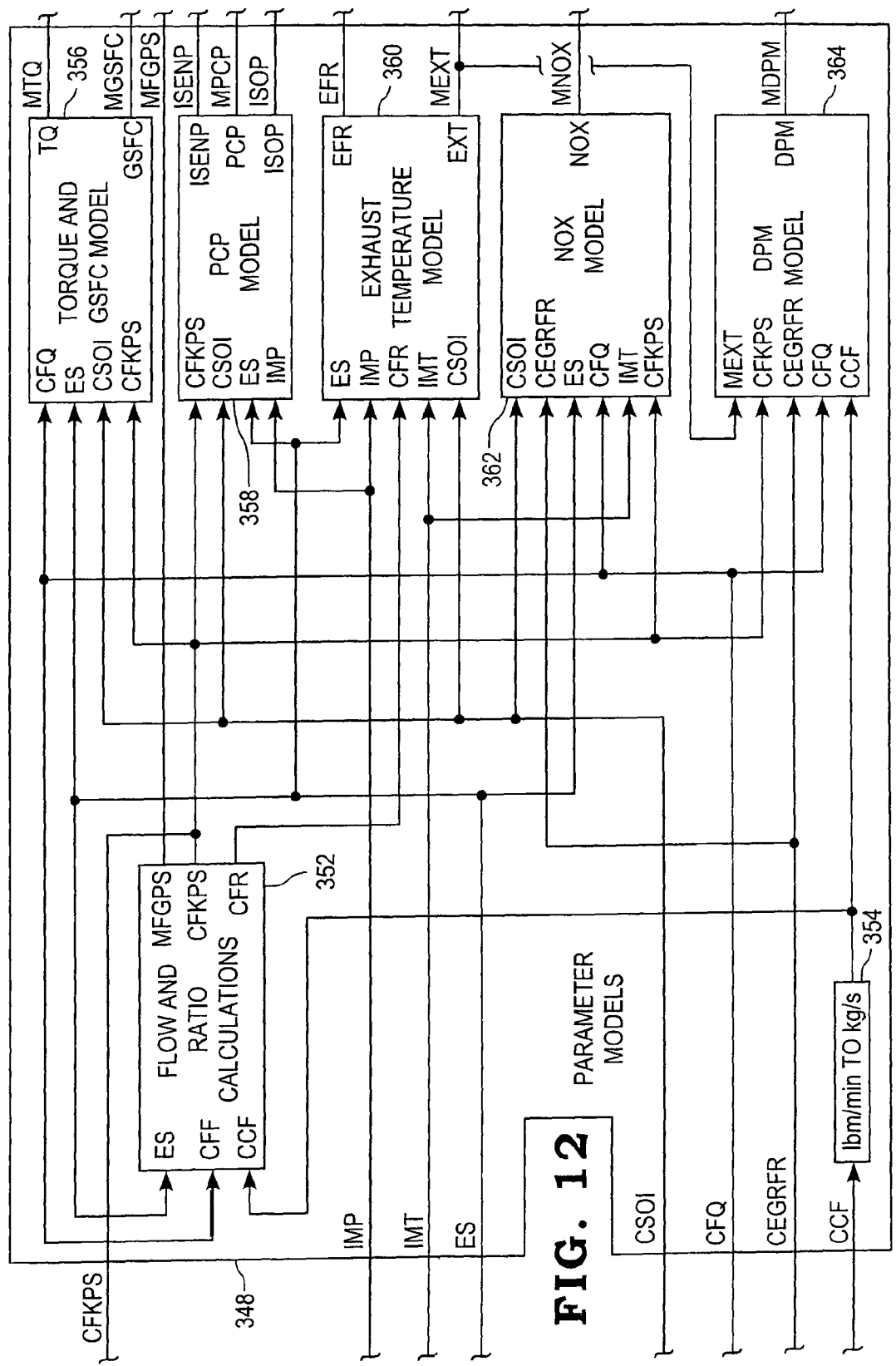
FIG. 12 is a bock diagram of one illustrative embodiment of the parameter models block forming part of the system models block of FIG. 11.

Referring now to FIG. 12, one illustrative embodiment of the parameter models block 348 forming part of the system models block 206 of FIG. 11 is shown. Block 348 includes a flow and ratio calculations block 352 receiving as inputs the engine speed signal, ES, the commanded fuel quantity value, CFQ, and the commanded charge flow value, CCF. Block 352 is operable, as will be described hereinafter with respect to FIG. 13, to process the foregoing input signals and values and produce a modeled fueling value, in gallons per second, MFGPS, a charge flow value, in kilograms per second, CFKPS, and a charge fuel ratio value, CFR. Block 348 further includes a unit conversion block 354 receiving as an input the commanded charge flow value, CCF, and operable to convert the commanded charge flow value, CCF, from units of pound mass per minute, lbm/min to kilograms per second, kg/s.

Block 348 further includes a torque and gross fueling command model block 356 receiving as inputs the commanded fuel quantity value, CFQ, the engine speed signal, ES, the commanded start-of-injection value, CSOI, and the commanded fuel value, in kilograms per second, CFKPS, produced by the flow and ratio calculations block 352. The torque and gross fuel command model block 356 is operable, as will be described in greater detail hereinafter with respect to FIG. 14, to process the foregoing input signals and values and produce as outputs the modeled torque value, MTQ, and the modeled gross fueling command value, MGSFC.

Block 348 further includes a peak cylinder pressure (PCP) model block 358 receiving as inputs the commanded fuel value, in kilograms per second, CFKPS, produced by the flow and ratio calculations block 352, the commanded start-of-injection value, CSOI, the engine speed signal, ES, and the intake manifold pressure signal, IMP. The PCP model block 358 is operable, as will be described in greater detail hereinafter with respect to FIG. 15, to process the foregoing input signals and values and produce as outputs the modeled peak cylinder pressure value, MPCP, the isentropic pressure value, ISENP, and the isochoric pressure value, ISOP.

The parameter models block 348 further includes an exhaust temperature model block 360 receiving as inputs the engine speed signal, ES, the intake manifold pressure signal, IMP, the charge fuel ratio value, CFR, produced by the flow and ratio block 352, the intake manifold temperature signal, IMT, and the commanded start-of-injection value, CSOI. The exhaust temperature model block 360 is operable, as will be described in greater detail with respect to FIGS. 16-17 to process the foregoing signals and values and produce as outputs the energy fraction value, EFR, and the modeled exhaust temperature value, MEXT.

The parameter models block 348 further includes a NOx model block 362 receiving as inputs the commanded start-of-injection value, CSOI, the commanded EGR fraction value, CEGRFR, the engine speed signal, ES, the commanded fuel quantity value, CFQ, the intake manifold temperature signal, IMT, and the commanded fueling value, in kilograms per second, CFKPS, produced by the flow and ratio calculations block 352. The NOX model block 362 is operable, as will be described hereinafter with respect to FIG. 18, to process the foregoing input signals and produce as an output the modeled NOX value, MNOX.

The parameter models block 348 further includes a dry particulate matter (DPM) model block 364 receiving as inputs the modeled exhaust temperature value, MEXT, produced by the exhaust temperature model block 360, the commanded fuel value, in kilograms per second, CFKPS, produced by the flow and ratio calculations block 352, the commanded EGR fraction value, CEGRFR, the commanded fuel quantity value, CFQ, and the commanded charge flow value, CCF, produced by the unit conversion block 354. The DPM model block 364 is operable, as will be described in greater detail hereinafter with respect to FIG. 19, to process the foregoing input signals and produce as an output the modeled dry particulate matter value, MDPM.

It will be understood that while the parameter models block 348 is illustrated in FIG. 12 as including torque and GSFC, PCP, exhaust temperature, NOx and DPM models, block 348 may alternatively be configured to include more or fewer models. Examples of additional models that may be incorporated within block 348 include, but are not limited to, an unburned hydrocarbon (UHC) model, a sulfur oxide (SOX) model, and other emissions and/or non-emissions related models. Any such alternative configuration of the parameter models block 348 is intended to fall within the scope of the claims appended hereto.

Figure 13:
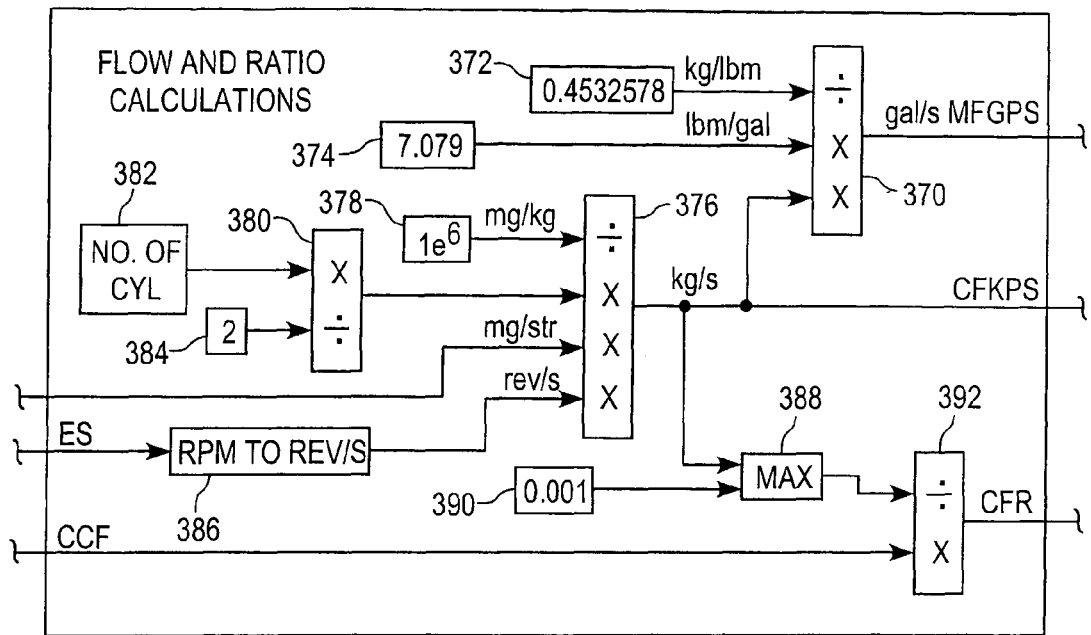
FIG. 13 is a block diagram of one illustrative embodiment of the flow and ratio calculations block forming part of the parameter models block of FIG. 12.

Referring now to FIG. 13, one illustrative embodiment of the flow and ratio calculations block 352 forming part of the parameter models block 348 of FIG. 12 is shown. In the illustrated embodiment, block 352 includes an arithmetic operator block 370 having a division input receiving a conversion value, e.g., 0.4532578, stored in memory block 372, wherein the conversion value represents a ratio of kilograms (kg) and pound-mass (lbm). A first multiplication input of block 370 receives another conversion value, e.g., 7.079, stored in memory block 374, and represents a ratio of pound-mass (lbm) and gallons (gal.). A third multiplication input of arithmetic block 370 is connected to an output of a second arithmetic block 376 having a division input receiving a conversion value, e.g., $1*e^6$, stored in memory block 378, wherein this conversion value represents a ratio of milligrams (mg) and kilograms (kg). A first multiplication input of block 376 is connected to an output of a third arithmetic block 380 having a multiplication input receiving an integer value stored in memory block 382, wherein the integer value corresponds to the number of cylinders of the engine 102. A division input of block 380 receives another integer value, e.g., 2, stored in block 384. The value produced by arithmetic block 380 is accordingly the number of cylinders in engine 102 divided by 2. A second multiplication input of arithmetic block 376 receives the commanded fuel quantity value, CFQ, (in units of mg/str), and a third multiplication input of arithmetic block 376 receives the engine speed signal, ES, converted from revolutions per minute to revolutions per second by conversion block 386. The output of arithmetic block 376 is the commanded fuel value, in kilograms per second, CFKPS, and is provided as an output of block 352 as well as to the second multiplication input of arithmetic block 370. The output of arithmetic block 370 is the modeled fuel value, in gallons per second, MFGPS, produced by block 352.

The commanded fuel value in kilograms per second, CFKPS, is further provided to a first input of a MAX block 388 having a second input receiving a constant, e.g., 0.001, stored in memory block 390. The output of MAX block 388 is supplied to a division input of a fourth arithmetic block 392 having a multiplication input receiving a commanded charge value, CCF. Blocks 388 and 390 provide divide-by-zero protection for block 392, and the output of arithmetic block 392 is the charge fuel ratio value, CFR, produced as an output of block 352 as the ratio of commanded charge flow, CCF, and the commanded fuel value, in kilograms per second, CFKPS.

Figure 14:
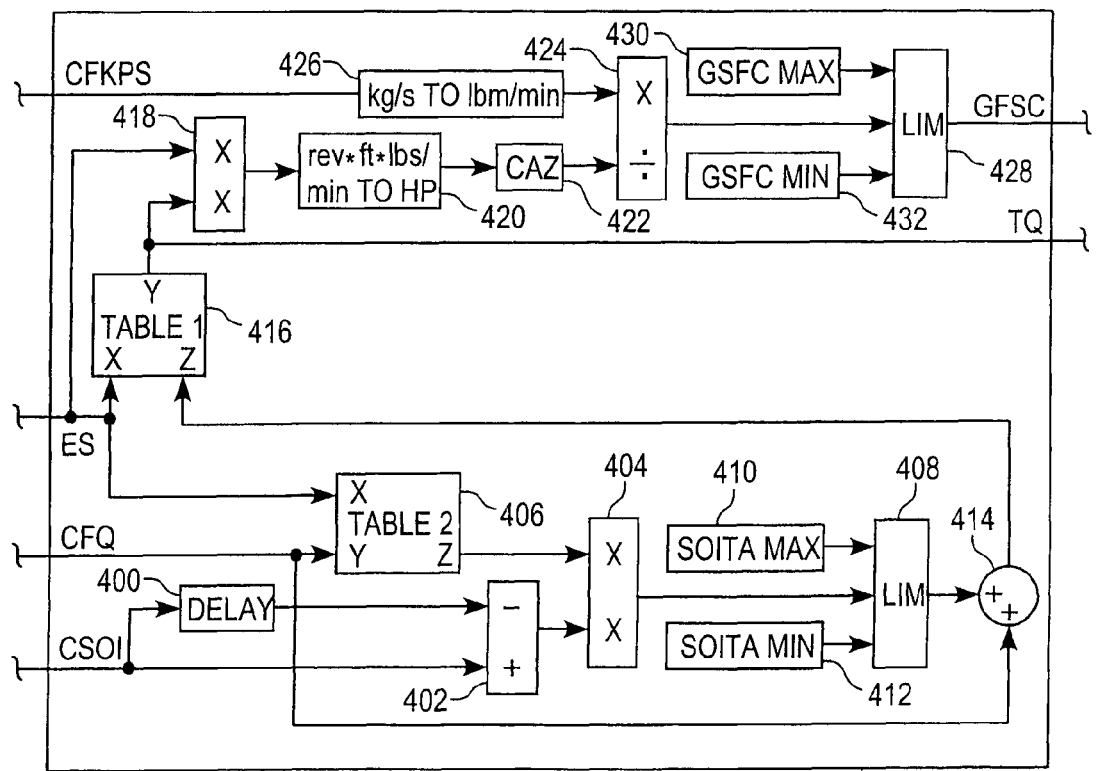
FIG. 14 is a block diagram of one illustrative embodiment of the torque and GSFC model block forming part of the parameter models block of FIG. 12.

Referring now to FIG. 14, one illustrative embodiment of the torque and gross fueling command value, GSFC, model block 356 forming part of the parameter models block 348 of FIG. 12 is shown. In the illustrated embodiment, block 356 includes a delay block 400 receiving the commanded start-of-injection value, CSOI, and the output of delay block 400 is provided to a subtraction input of an arithmetic block 402 having an addition input receiving the commanded start-of-injection value, CSOI. The output of block 402 is provided to a first multiplication input of a multiplication block 404 having a second multiplication input receiving the output of a table 406 having as inputs the engine speed signal, ES, and the commanded fuel value, CFQ. Table 406 is populated with SOI torque-adjusted gain values as functions of the engine speed signal, ES and the commanded fuel quantity values, CFQ. The output of multiplication block 404 is supplied to a limiter block 408 receiving as an upper limit value a maximum SOI torque adjust value, SOITA MAX, stored in memory block 410, and receiving as a lower limit value a minimum SOI torque adjust value, SOITA MIN, stored in memory block 412. The output of limiter block 408 is thus the product of the change in the commanded start-of-injection, CSOI, over the delay period and the SOI torque-adjusted gain value produced by table 406, having lower and upper limits of SOITA MIN and SOITA MAX respectively.

The output of limiter block 408 is supplied to a first addition input of a summation block 414 having a second addition input receiving the commanded fuel quantity value, CFQ. The output of summation block 414 is supplied to a first input of another table 416 having a second input receiving the engine speed signal, ES. Table 416 is populated with engine output torque values as functions of the engine speed signal, ES, and the output of summation block 414, and the output of table 416 is produced by block 356 at a torque output, TQ, thereof, and corresponds to the modeled torque value, MTQ, produced by the parameter models block 348.

The output of table 416 is further supplied to a first multiplication input of a multiplication block 418 having a second multiplication input receiving the engine speed signal, ES. The output of block 418 is supplied to a conversion block 420 operable to convert units of rev*ft*lbs/min to horsepower, HP. The horsepower output of block 420 is provided as an input to a clamp-above-zero block 422 having an output provided to a division input of an arithmetic block 424. Block 422 accordingly provides divide-by-zero protection for arithmetic block 424. A multiplication input of block 424 receives the commanded fueling value, in kilograms per second, CFKPS, converted from kg/s units to lbm/min units by conversion block 426. The output of arithmetic block 424 is supplied to a limiter block 428 receiving as an upper limit a maximum gross fuel command value, GFSC MAX, stored in memory block 430, and receiving as a lower limit a minimum gross fuel command value, GSFC MIN, stored in memory block 432. The output of limiter block 428 defines a gross fuel command output, GSFC, of block 356, and corresponds to the modeled gross fuel command, MGSFC, produced by the parameters model block 348.

Those skilled in the art will recognize that the torque and gross fuel models illustrated and described herein with respect to FIGS. 13 and 14 represents only one example of each such model, and that other torque and gross fuel models, defined as a function of one or more engine operating parameters, may alternatively or additionally used. Any such alternative or additional torque and gross fuel models are intended to fall within the scope of the claims appended hereto.

Figure 15:
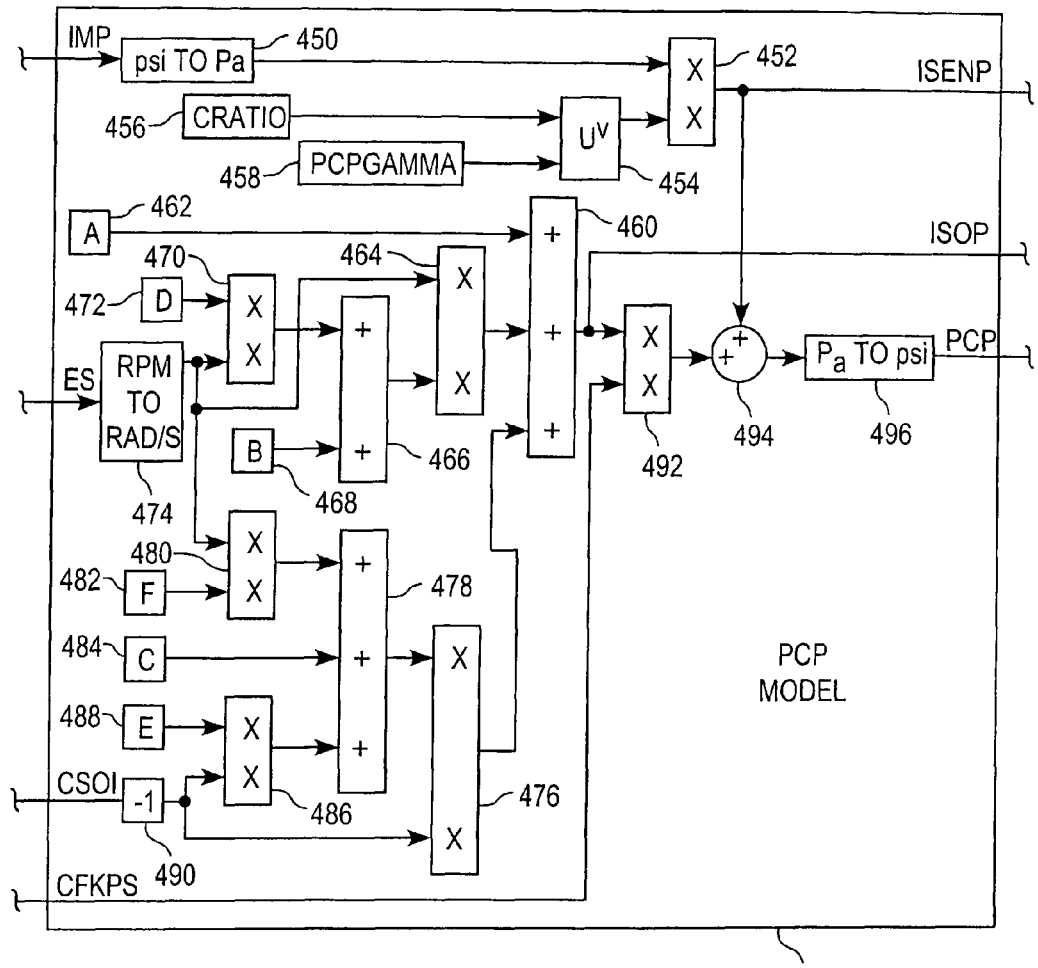
FIG. 15 is a block diagram of one illustrative embodiment of the PCP model block forming part of the parameter models block of FIG. 12.

Referring now to FIG. 15, one illustrative embodiment of the PCP model block 358 forming part of the parameter models block 348 of FIG. 12 is shown. In the illustrated embodiment, block 358 includes a conversion block 450 receiving as an input the intake manifold pressure signal, IMP, and converting this signal from units of psi to Pa. The output of conversion block 450 is provided to a first multiplication input of a multiplication block 452 having a second multiplication input receiving the output of a mathematical function block 454. Mathematical function block 454 has a first input receiving a PCPGAMMA value stored in memory block 458, and a second input receiving a ratio value, CRATIO, stored in memory block 456. The mathematical function block 454 is operable to compute an output value as a function of the CRATIO value raised to the PCPGAMMA power. The output of multiplication block 452 is provided at an ISENP output of block 358, and corresponds to the isentropic pressure value produced by the parameter models block 348 according to the function $ISENP=IMP*CRATIO^{PCPGAMMA}$.

Block 358 further includes a summation block 460 having a first addition input receiving a model constant value, "A," stored in memory block 462. A second addition input of summation block 460 receives the output of a multiplication block 464 having a first multiplication input receiving the engine speed signal, ES, converted from revolutions per minute to radians per second by conversion block 474. A second multiplication input of block 464 receives the output of a summation block 466 having a first addition input receiving an output of another multiplication block 470 having a first input receiving a model constant value, "D," stored in memory block 472 and a second multiplication input receiving the converted engine speed signal, ES. A second input of summation block 466 receives another model constant value, "B," stored in memory block 468.

A third addition input of summation block 460 receives the output of a multiplication block 476 having a first multiplication input receiving the output of another summation block 478. A first addition input of block 478 receives the output of multiplication block 480 having a first input receiving the converted engine speed signal, ES, and a second multiplication input receiving another model constant value, "F," stored in memory block 482. A second addition input of block 478 receives another model constant value, "C," stored in memory block 484, and a third addition input of block 478 receives the output of a multiplication block 486. Block 486 has a first multiplication input receiving another model constant value "E," stored in memory block 488, and a second multiplication input receiving the commanded start-of-injection value, CSOI, multiplied by the value of −1 stored in memory block 490. The output of memory block 490 is further provided to a second multiplication input of block 476.

The output of summation block 460 is provided to an ISOP output of block 358, and represents the isochoric pressure value produced by the parameter models block 348 according to the function $ISOP=A+B*ES+C*CSOI+D*ES^2+E*SOI^2+F*ES*SOI$. The output of summation block 460 is further supplied to a first multiplication input of a multiplication block 492 having a second multiplication input receiving the commanded fueling value, in kilograms per second, CFKPS. The output of block 492 is supplied to a first addition input of a summation node 494 having a second addition input receiving the isentropic pressure value, ISENP, produced by block 452. The output of summation node 494 is supplied as an input to a conversion block 496 operable to convert pressure units of Pa to psi. The output of conversion block 496 is the PCP model estimate, and is provided to a PCP output of block 358, which corresponds to the modeled peak cylinder pressure value, MPCP, produced by the parameter models block 348 according to the function $MPCP=ISENP+ISOP*CFKPS$.

Those skilled in the art will recognize that the PCP model illustrated and described herein with respect to FIG. 15 represents only one example PCP model, and that other PCP models, defining PCP as a function of one or more other engine operating conditions, may alternatively or additionally used. For example, one alternative or additional PCP model that may be incorporated into the parameter models block 348 is described in U.S. Pat. No. 6,782,737 B2, entitled SYSTEM FOR ESTIMATING PEAK CYLINDER PRESSURE IN AN INTERNAL COMBUSTION ENGINE, which is assigned to the assignee of the present invention, and the disclosure of which is incorporated herein by reference. Other PCP models will occur to those skilled in the art, and any such alternative or additional PCP models are intended to fall within the scope of the claims appended hereto.

Figure 16:
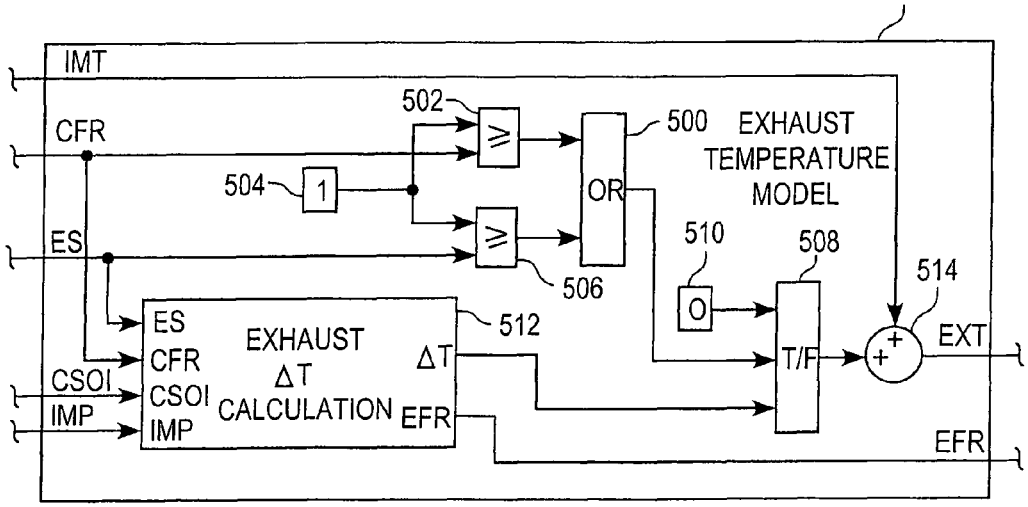
FIG. 16 is a block diagram of one illustrative embodiment of the exhaust temperature model block forming part of the parameter models block of FIG. 12.

Referring now to FIG. 16, one illustrative embodiment of the exhaust temperature model block 360 forming part of the parameter models block 348 of FIG. 12 is shown. In the illustrated embodiment, block 360 includes an OR block 500 having a first input receiving the output of an arithmetic block 502 having a first input receiving the value of "1" stored in memory block 504 and a second input receiving a charge fuel ratio, CFR, produced by the flow and ratio calculations block 352. If "1" is greater than or equal to the charge fuel ratio, CFR, block 502 produces a "1," and otherwise produces a "0." A second input of OR block 500 receives the output of another arithmetic operator block 506 having a first input receiving the value of "1" stored in block 504 and a second input receiving the engine speed signal, ES. If the "1" stored in block 504 is greater than or equal to the engine speed signal, ES, the arithmetic operator block 506 produces a "1," and otherwise produces a "0." The output of OR block 500 is provided to a control input to a true/false block 508 receiving at its "true" input the value of zero stored in memory block 510, and receiving at its "false" input a ΔT output of an Exhaust ΔT calculation block 512.

Block 512 receives as inputs the engine speed signal, ES, the charge fuel ratio value, CFR, the commanded start-of-injection value, CSOI, and the intake manifold pressure signal, IMP. The Exhaust ΔT block 512 is operable, as will be described in greater detail with respect to FIG. 17, to process the foregoing inputs and produce as a first output a differential temperature value, ΔT, which is provided to true/false block 508, and to produce as a second output the energy fraction value, EFR produced at the energy fraction output, EFR, of block 360.

Figure 17:
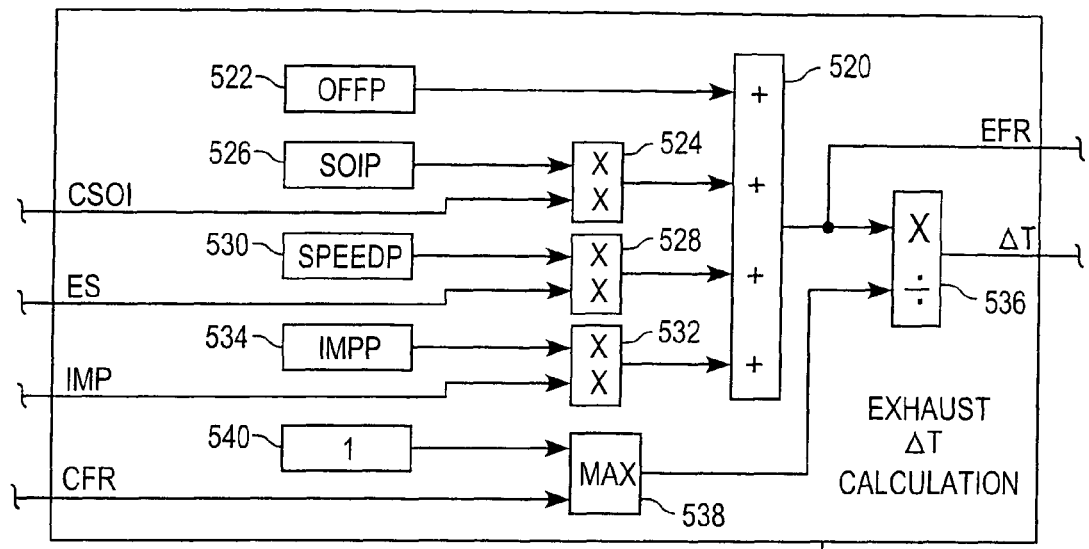
FIG. 17 is a block diagram of one illustrative embodiment of the exhaust differential temperature calculation block forming part of the exhaust temperature model block of FIG. 16.

Referring now to FIG. 17, one illustrative embodiment of the Exhaust ΔT calculation block 512 forming part of the exhaust temperature model block 360 of FIG. 16 is shown. In the illustrated embodiment, block 512 includes a summation block 520 having a first addition input receiving an offset parameter value, OFFP, stored in memory block 522. A second addition input of block 520 receives the output of a multiplication block 524 having a first multiplication input receiving a start-of-injection parameter value, SOIP, stored in memory block 526, and a second multiplication input receiving the commanded start-of-injection value, CSOI. A third addition input of block 520 receives the output of the multiplication block 528 having a first multiplication input receiving a speed parameter value, SPEEDP, stored in memory block 530, and a second multiplication input receiving the engine speed signal, ES. A fourth addition input of block 520 receives the output of a multiplication block 532 having a first multiplication input receiving an intake manifold pressure parameter, IMPP, stored in memory block 534, and a second multiplication input receiving the intake manifold pressure signal, IMP. The output of summation block 520 is the energy fraction value, EFR, produced by block 512 according to the equation EFR=OFFP+SOIP*CSOI+SPEEDP*ES+IMMP*IMP.

The EFR output of summation block 520 is further supplied to a multiplication input of an arithmetic block 536 having a division input receiving the output of a MAX block 538. A first input of MAX block 538 receives the constant value of "1" stored in memory block 540, and a second input receives the charge fuel ratio value, CFR, produced by the flow and ratio calculations block 352. Blocks 538 and 540 thus provide divide-by-zero protection for block 536. The output of arithmetic block 536 is supplied to the ΔT output of block 512, and produces the ΔT value according to the equation ΔT=EFR/CFR.

Referring again to FIG. 16, the output of true/false block 508 is supplied to a first addition input of a summation node 514 having a second addition input receiving the intake manifold temperature signal, IMT. The output of summation node 514 is the exhaust temperature output, EXT, of block 360, which supplies the exhaust temperature model value, MEXT, produced by the parameter models block 348. As long as the engine speed signal, ES, is less than or equal 1, or the charge fuel ratio value, CFR, is less than or equal to 1, the output of OR block 500 is "1" or "true," and the output of true/false block 508 is thus zero. In this case, the exhaust temperature estimate, EXT, produced by block 360 is the intake manifold temperature value, IMT. If, on the other hand, the engine speed signal, ES, is greater than 1, and the charge fuel ratio value, CFR, is greater than 1, the output of OR block 500 is "0" or "false", and the output of true/false block 508 is thus the ΔT value produced by the exhaust ΔT value calculation block 512. In this case, the exhaust temperature estimate, EXT, produced by block 360 is calculated according to the equation EXT=IMT+ΔT.

Those skilled in the art will recognize that the exhaust temperature model illustrated and described herein with respect to FIGS. 16 and 17 represents only one example exhaust temperature model, and that other exhaust temperature models, defining EXT as a function of one or more other engine operating parameters, may alternatively or additionally used. Any such alternative or additional exhaust temperature models are intended to fall within the scope of the claims appended hereto.

Figure 18:
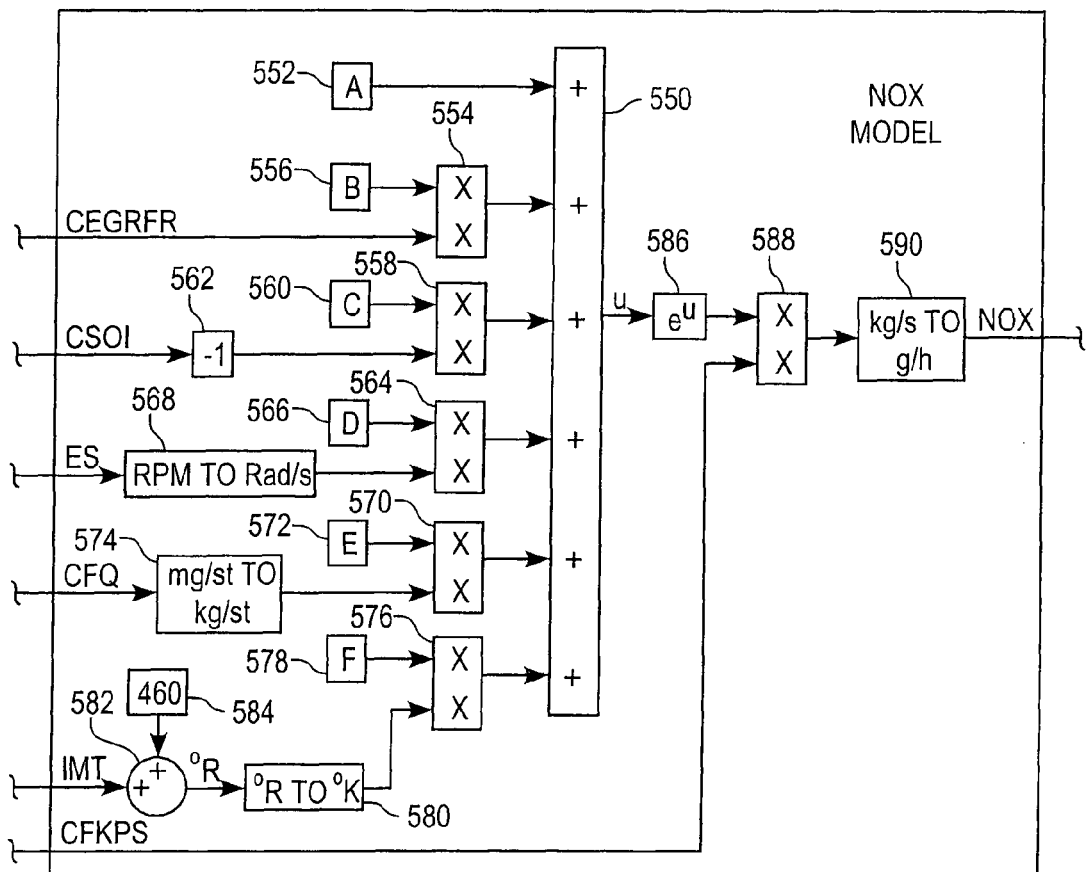
FIG. 18 is a block diagram of one illustrative embodiment of the NOx model block forming part of the parameter models block of FIG. 12.

Referring now to FIG. 18, one illustrative embodiment of the NOx model block 362 forming part of the parameter models block 348 of FIG. 12 is shown. In the illustrated embodiment, block 362 includes a summation block 550 having a first addition input receiving a model constant, "A", stored in memory block 552. A second addition input of block 550 receives the output of a multiplication block 554 having a first input receiving a model constant, "B", stored in memory block 556 and a second multiplication input receiving the commanded EGR fraction value, CEGRFR. A third addition input of block 550 receives the output of the multiplication block 558 having a first multiplication input receiving another model constant, "C", stored in memory block 560, and a second multiplication input receiving the commanded start-of-injection value, CSOI, multiplied by "−1" stored in memory block 562. A fourth addition input of block 550 receives the output of multiplication block 564 having a first multiplication input receiving another model constant "D", stored in memory block 566, and a second multiplication input receiving the engine speed signal, ES, converted from revolutions per minute to radians per second by conversion block 568. A fifth addition input of block 550 receives the output of the multiplication block 570 having a first multiplication input receiving another model constant "E", stored in memory block 572, and a second multiplication input receiving the commanded fuel quantity value, CFQ, converted from mg/st to kg/st by conversion block 574. A sixth addition input of block 550 receives the output of a multiplication block 576 having a first multiplication input receiving a model constant "F", stored in memory block 578 and a second multiplication block receiving the output of a conversion block 580. The input of conversion block 580 receives the output of a summation node 582 having a first addition input receiving the intake manifold temperature signal, IMT, and the second addition input receiving a constant value; e.g., 460, stored in memory block 584. The intake manifold temperature signal, IMT, is provided in units of ° C. and the addition of 460 thereto by block 584 converts the temperature units to ° R. Conversion block 580 then converts the temperature units from ° R to ° K using a known relationship. The output of summation block 550 produces a parameter, u, according to the equation u=A+B*CEGRFR−C*CSOI+D*ES+E*CFQ+F*IMT.

The output of summation block 550 is supplied as an input to an arithmetic operator block 586 operable to raise "e" to the power of "u", where "u" is the output of summation block 550 as just described. The output of arithmetic operator block 586 is provided as a first multiplication input of a multiplication block 588 having a second multiplication input receiving the commanded fuel value, in kilograms per second value, CFKPS, produced by the flow and ratio calculations block 352. The output of multiplication block 588 is provided as an input to conversion block 590 operable to convert kg/s to g/h. The output of conversion block 590 defines the NOx output of block 362, corresponding to the modeled MNOX output of the parameter models block 348. The NOx model value, MNOX, produced by block 362 follows the equation MNOX=CFKPS*$e^u$, where u=A+B*CEGRFR−C*CSOI+D*ES+E*CFQ+F*IMT.

Those skilled in the art will recognize that the NOx model illustrated and described herein with respect to FIG. 18 represents only one example NOx model, and that other NOx models, defined as a function of one or more other engine operating parameters, may alternatively or additionally used. For example, one alternative or additional NOx model that may be incorporated into the parameter models block 348 is described in U.S. Pat. No. 6,697,729 B2, entitled SYSTEM FOR ESTIMATING NOX CONTENT OF EXHAUST GAS PRODUCED BY AN INTERNAL COMBUSTION ENGINE, which is assigned to the assignee of the present invention, and the disclosure of which is incorporated herein by reference. Other NOx models will occur to those skilled in the art, and any such alternative or additional NOx model are intended to fall within the scope of the claims appended hereto.

Figure 19:
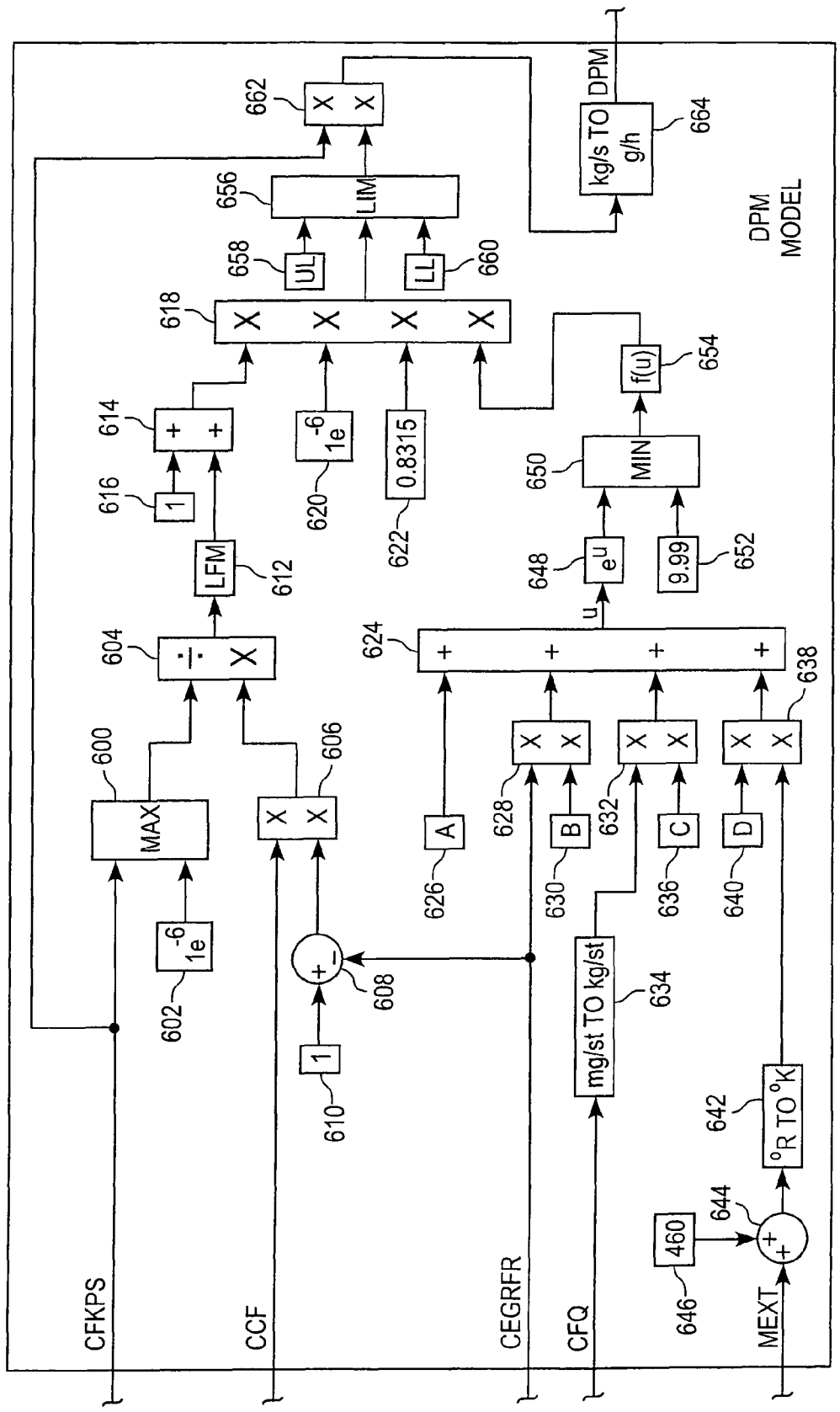
FIG. 19 is a block diagram of one illustrative embodiment of the DPM model block forming part of the parameter models block of FIG. 12.

Referring now to FIG. 19, one illustrative embodiment of the DPM model block 364 forming part of the parameter models block 348 of FIG. 12 is shown. In the illustrated embodiment, block 364 includes a MAX block 600 having a first input receiving the commanded fueling value, in kilograms per second, CFKPS, produced by the flow and ratio block 352, and a second input receiving a constant value, e.g., 1*$e^{-6}$, stored in memory block 602. The output of MAX block 600 is provided to a division input of an arithmetic block 604, and blocks 600 and 602 thus provide divide-by-zero protection for block 604. A multiplication input of block 604 receives the output of the multiplication block 606 having a first multiplication input receiving the commanded charge flow value CCF, and a second multiplication input receiving the output of a summation node 608 having an addition input receiving a constant value, e.g., "1", stored in memory block 610, and a subtraction input receiving the commanded EGR fraction value, CEGRFR. The output of arithmetic block 604 represents an air-to-fuel ratio value, and is provided as an input to a low fuel multiplier block 612 having an output provided to a first addition input of a summation block 614. A second addition input of block 614 receives a constant value, e.g., "1", stored in memory block 616. The output of the summation block 614 is provided to a first multiplication input of a multiplication block 618. A second multiplication input of multiplication block 618 receives a constant value, e.g., $1*e^{-6}$, stored in memory block 620, and a third multiplication input of block 618 receives another constant, e.g., 0.8315, stored in memory block 622. Block 620 provides for the conversion kg/mg, and block 622 provides for the conversion std $m^3/kg$.

The DPM model block 364 further includes another summation block 624 having a first addition input receiving a model constant, "A", stored in memory block 626. A second addition input of block 624 receives the output of a multiplication block 628 having a first multiplication in put receiving the commanded EGR fraction value, CERFR, and a second multiplication input receiving another model constant, "B.". A third addition input of block 624 receives the output of a multiplication block 632 having a first multiplication input receiving the commanded fuel quantity value, CFQ, converted from mg/st to kg/st by conversion block 634, and a second multiplication input receiving another model constant, "C", stored in memory block 636. A fourth addition input of block 624 receives the output of multiplication block 638 having a first multiplication input receiving another model constant, "D", stored in memory block 640, and a second multiplication input receiving the output of a temperature conversion block 642 configured to convert ° R to ° K. The input of conversion block 642 receives the output of a summation node 644 having a first addition input receiving a constant value, e.g., 460, stored in memory block 646, and a second addition input receiving the modeled exhaust temperature value, MEXT, produced by the exhaust temperature model block 360. As described hereinabove with respect to FIG. 18, blocks 642, 644, and 646 are operable to convert the modeled exhaust temperature value, MEXT, from units of ° C. to ° K.

The output of summation block 624 is provided as an input to a mathematical function block 648 configured to produce an output according to the equation $e^u$, wherein "u" is the output of summation block 624 and is defined by the equation u=A+B*CEGRFR+C*CFQ+D*MEXT. The output of mathematical function block 648 is provided as a first input to a MIN block 650 having a second input receiving a constant value, e.g., 9.99, stored in memory block 652. The output of MIN block 650 represents an estimated NOx value having an upper limit established by block 652. The output of MIN block 650 is provided as an input to a conversion block 654 having a function f(u) operable to convert the estimated NOx value produced by MIN block 650 units of dry particulate matter (DPM). The output of block 654 is provided to a fourth multiplication input of multiplication block 618.

The output of multiplication block 618 is provided as an input to a limiter block 656 having as an upper limit the value UL; e.g., 0.005, stored in memory block 658, and having as a lower limit the value LL; e.g., 0, stored in memory block 660. The output of limiter block 656 is provided to a first multiplication input of a multiplication block 662 having a second multiplication input receiving the commanded fueling value, in kilograms per second, CFKPS, provided by the flow and ratio calculations block 352. The output of multiplication block 662 is the estimated dry particulate matter value, DPM, and is converted from kg/s to g/h via conversion block 664. The output of conversion block 664 is the DPM output of the DPM model block 364, and corresponds to the modeled DPM value, MDPM, produced by the parameter models block 348.

Those skilled in the art will recognize that the DPM model illustrated and described herein with respect to FIG. 19 is represents only one example DPM model, and that other DPM models, defined as a function of one or more other engine operating parameters, may alternatively or additionally used. Any such alternative or additional DPM models are intended to fall within the scope of the claims appended hereto.

Figure 20:
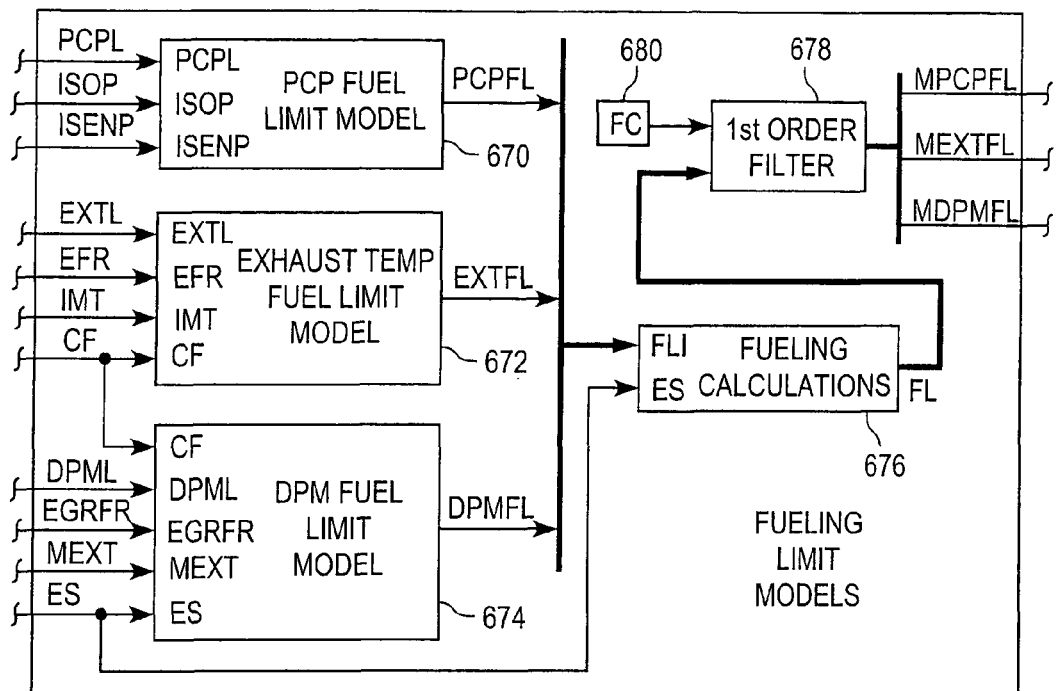
FIG. 20 is a block diagram of one illustrative embodiment of the fueling limit models block forming part of the system models block of FIG. 11.

Referring now to FIG. 20, one illustrative embodiment of the fueling limit models block 350 forming part of the system models block 206 of FIG. 11 is shown. In the illustrated embodiment, block 350 includes a peak cylinder pressure (PCP) fuel limit model block 670 receiving as inputs a peak cylinder pressure limit value, PCPL, forming part of the system performance target vector, $Y_T$, the isochoric pressure value, ISOP, produced by the PCP model block 358, and the isentropic pressure value, ISENP, also produced by the PCP model block 358. The PCP fuel limit model block 670 is operable, as will be described in greater detail hereinafter with respect to FIG. 21, to process the foregoing inputs and produce as an output a peak cylinder pressure fuel limit value, PCPFL.

The fueling limit models block 350 further includes an exhaust temperature fuel limit model block 672 receiving as inputs an exhaust temperature limit value, EXTL, forming part of the system performance target vector, $Y_T$, the energy fraction ratio, EFR, produced by the exhaust temperature model block 360, the intake manifold intake temperature signal, IMT, and the charge flow value, CF. The exhaust temperature fuel limit model block 672 is operable, as will be described in greater detail hereinafter with respect to FIG. 22, to process the foregoing input signals as produce as an output an exhaust temperature fuel limit value, EXTFL.

The fueling limit models block 350 further includes a DPM fuel limit model block 674 receiving as inputs the charge flow value, CF, a dry particulate matter limit value, DPML, forming part of the system performance target vector, $Y_T$, the EGR fraction value, EGRFR, the modeled exhaust temperature value, MEXT, produced by the exhaust temperature model block 360, and the engine speed signal, ES. The DPM fuel limit model block 674 is operable as will be described in greater detail hereinafter with respect to FIG. 23, to process the foregoing input signals and produce as an output a dry particulate matter fuel limit value, DPMFL.

The PCPFL, EXTFL, and DPMFL values produced by model block 670, 672 and 674 respectively, form a data vector provided to a fuel limit input, FLI, of a fueling calculations block 676, also receiving as an input the engine speed signal, ES. The fueling calculations block 676 is operable, as will be described hereinafter with respect to FIG. 24, to process the foregoing input signals and produce as an output a fuel limit vector, FL, which is provided as an input to a first order filter block 678 also receiving a filter constant value, FC, stored in memory block 680. The output of the first order filter block 678 corresponds to the model limit vector, ML, produced by the fueling limit models block 350, and carries the modeled peak cylinder pressure fuel limit value, MPCPFL, the modeled exhaust temperature limit value, MEXTFL, and the modeled dry particulate matter fuel limit value, MDPMFL.

It will be understood that while the fueling limit models block 350 is illustrated in FIG. 20 as including PCP, exhaust temperature and DPM fuel limit models, block 350 may alternatively be configured to include more or fewer models. Examples of additional models that may be incorporated within block 350 include, but are not limited to, an unburned hydrocarbon (UHC) fuel limit model, a sulfur oxide (SOX) fuel limit model, a turbocharger speed fuel limit model, and other emissions and/or non-emissions related models. Any such alternative configuration of the fueling limit models block 350 is intended to fall within the scope of the claims appended hereto.

Figure 21:
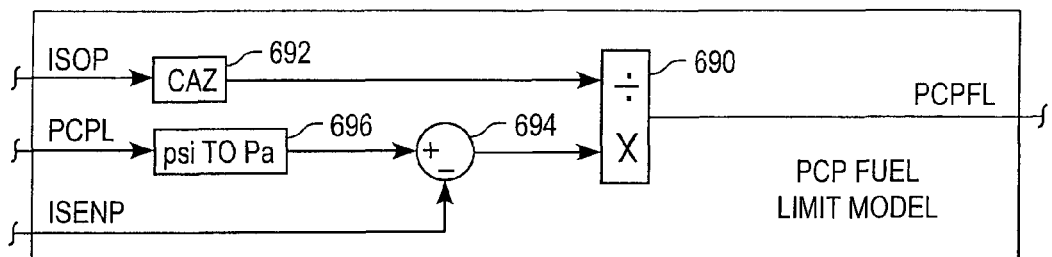
FIG. 21 is a block diagram of one illustrative embodiment of the PCP fuel limit model forming part of the fueling limit models block of FIG. 20.

Referring now to FIG. 21, one illustrative embodiment of the PCP fuel limit model 670 forming part of the fueling limit models block 350 of FIG. 20 is shown. In the illustrated embodiment, block 670 includes an arithmetic block having a division input receiving the output of a clamp-above-zero block 692 receiving as an input the isochoric pressure value, ISOP. The clamp-above-zero block 692 is provided for divide-by-zero protection for block 690. Arithmetic block 690 further includes a multiplication input receiving the output of a summation node 694 having an addition input receiving the peak cylinder pressure limit value, PCPL, converted from units of psi to Pa by conversion block 696. A subtraction input of summation node 694 receives the isentropic pressure value ISENP. The output of arithmetic block 690 defines the PCPFL output of the PCP fuel limit model block 670, and produces the corresponding peak cylinder fuel limit value, PCPFL.

Figure 22:
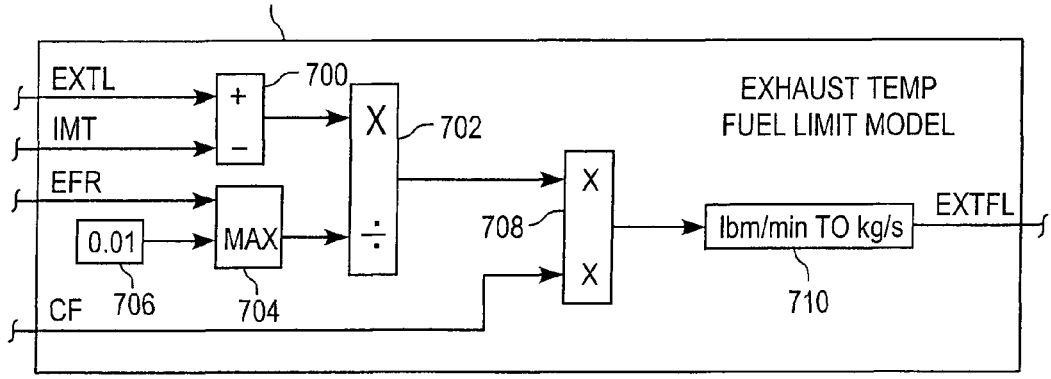
FIG. 22 is a block diagram of one illustrative embodiment of the exhaust temperature fuel limit model forming part of the fueling limit models block of FIG. 20.

Referring now to FIG. 22, one illustrative embodiment of the exhaust temperature fuel limit model block 672 forming part of the fueling limit models block 350 of FIG. 20 as shown. In the illustrated embodiment, block 672 includes an arithmetic block 700 having an addition input receiving the exhaust temperature limit value, EXTL, and a subtraction input receiving the intake manifold temperature value, IMT. The output of summation block 700 is supplied to a multiplication input of an arithmetic block 702 having a division input receiving the output of a MAX block 704. The energy fraction value, EFR, is supplied to a first input of MAX block 704 and a second input of MAX block 704 receives a constant value, e.g., 0.01, stored in memory block 706. Blocks 704 and 706 thus provide divide-by-zero protection for block 702. The output of block 702 is provided to a first multiplication input of a multiplication block 708 having a second multiplication in put receiving the charge flow value, CF, produced by the virtual sensor logic block 200 (FIG. 3). The output of multiplication block 708 is provided as an input to a conversion block 710 configured to convert units of lbm/min to kg/s. The output of conversion block 710 defines the EXTL output of the exhaust temperature fuel limit model block 672, and produces the corresponding exhaust temperature fuel limit value, EXTFL.

Figure 23:
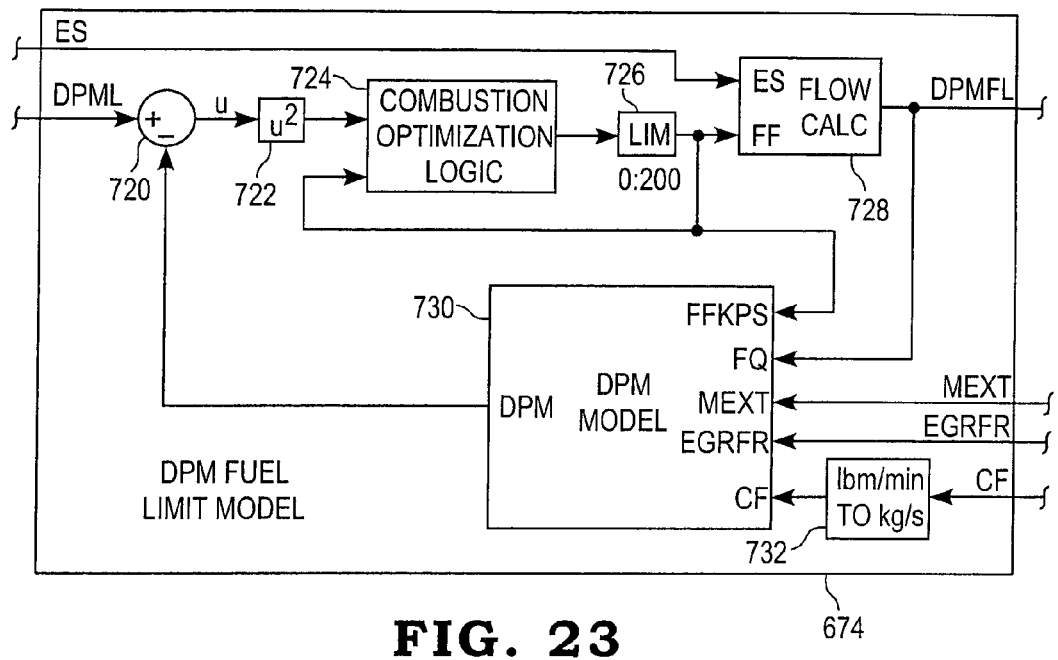
FIG. 23 is a block diagram of one illustrative embodiment of the DPM fuel limit model forming part of the fueling limit models block of FIG. 20.

Referring now to FIG. 23, one illustrative embodiment of the DPM fuel limit model block 674 forming part of the fueling limit models block 350 of FIG. 20 as shown. In the illustrated embodiment, FIG. 74 includes a summation node 720 having an addition input receiving the dry particulate matter limit value, DPML, and a subtraction input receiving an estimated dry particulate matter value, DPM, produced by DPM model block 730. The output of summation node 720 represents a dry particulate matter error value, and is squared by mathematical function block 722 and then provided as a first input to a combustion optimization logic block 724. Block 724 is operable to process the DPM error value and produce as a output a corresponding fuel value that is provided as an input to a limiter block 726 having a lower and upper limit values; e.g., 0 and 200 respectively, and the fuel flow output of limiter block 726 is provided to a fuel flow input of a flow calculation block 728 and also to a second input to the combustion optimization logic block 724. The flow calculation block 728 also receives as an input the engine speed signal, ES, and is operable to process the engine speed and fuel flow input values and produce a corresponding dry particulate matter of fuel limit value, DPMFL, defining the output of the DPM fuel limit model block 674. The DPMFL value produced by the flow calculation block 728 is provided a to a fuel quantity input, FQ, of DPM model block 730, and the fuel flow value produced by the limiter block 726 is provided to a fuel flow input, in kilograms per second, FFKPS, of DPM model block 730. A modeled exhaust temperature input, MEXT, receives the modeled exhaust temperature value, MEXT, produced by the exhaust temperature model block 360, and EGR fraction input, EGRFR, receives the EGR fraction value, EGRFR, produced by the virtual sensor logic block 200. A charge flow input, CF, of DPM model block 730 receives the charge flow value, CF, produced by the virtual sensor logic block 200, converted from lbm/min to kg/s by conversion block 732. The DPM model block 730 may be identical to the DPM model block 364 illustrated in FIG. 19, using the input, signals and values illustrated in FIG. 23.

It will be noted that the PCP fuel limit model block 670 and the exhaust temperature fuel limit model block 672 are each inverted representations of the corresponding PCP model block 358 and the corresponding exhaust temperature model block 360, illustrated in FIGS. 15 and 16 respectively. The DPM fuel limit model block 674, in contrast, represents an iteratively solved fuel limit model that incorporates the complete the DPM model 364 illustrated in FIG. 19, and that is configured to minimize the error between the estimated dry particulate matter value, DPM, and the dry particulate matter limit value, DPML, forming part of the system performance target vector, $Y_T$.

Figure 24:
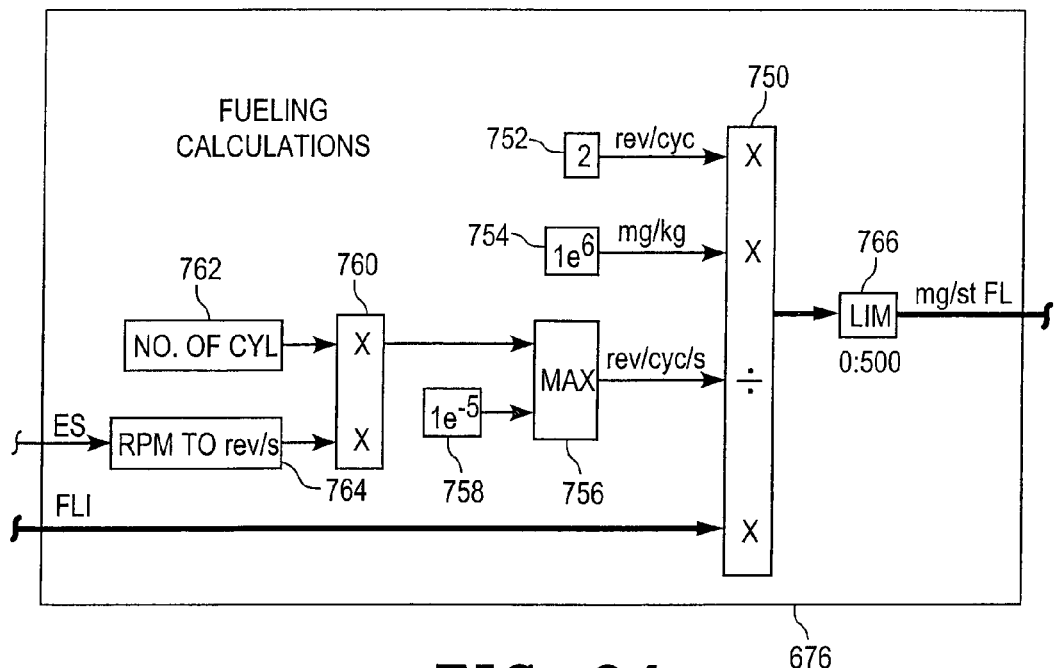
FIG. 24 is a block diagram of one illustrative embodiment of the fueling calculations block forming part of the fueling limit models block of FIG. 20.

Referring now to FIG. 24, one illustrative embodiment of the fueling calculations block 676 forming part of the fueling limit models block 350 of FIG. 20 is shown. In the illustrated embodiment, block 676 includes an arithmetic block 750 having a first multiplication input receiving a constant value, e.g., 2, stored in memory block 752. A second multiplication input of block 750 receives another constant, e.g., $1*e^6$, stored in memory block 754. A division input of block 750 receives the output of a MAX block 756 having a first input receiving a constant, e.g., $1*e^{-5}$, stored in memory block 758, and a second input receiving the output of a multiplication block 760. A first input of multiplication block 760 receives a constant value, corresponding to a number of cylinders of engine 102, which is stored in memory block 762. A second multiplication input of block 760 receives the engine speed signal, ES, converted from revolutions per minute to revolutions per second by conversion block 764. Another multiplication input of arithmetic block 750 receives the fuel limit input vector, FLI, carrying the fuel limit values, PCPFL, EXTFL, and DPMFL, as illustrated in FIG. 20. The output of arithmetic block 750 is a data vector supplied to a limiter block having lower and upper limit values, e.g., 0 and 500 respectively, and the output of limiter block 766 defines the fuel limit vector, FL, produced by block 676.

Figure 25:
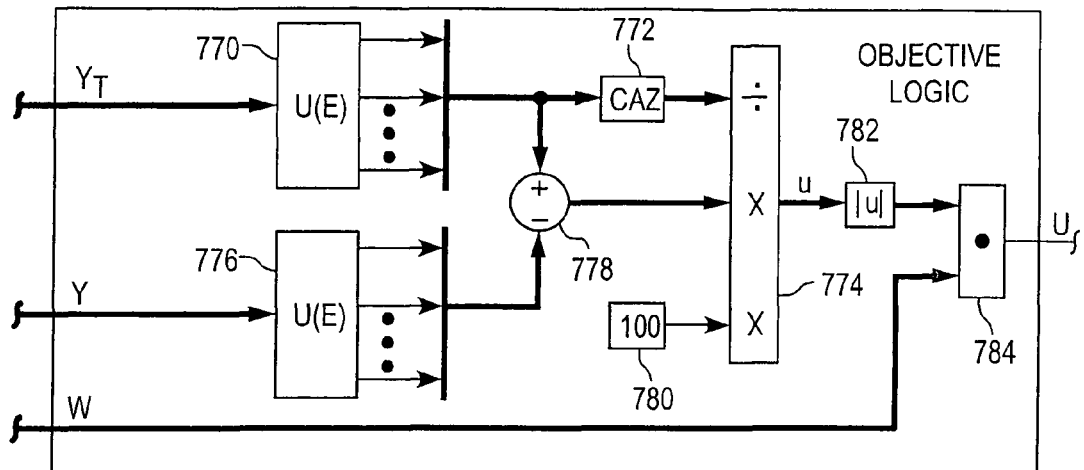
FIG. 25 is a block diagram of one illustrative embodiment of the objective logic block forming part of the combustion manager block of FIG. 3.

Referring now to FIG. 25, one illustrative embodiment of the objective logic block 208 forming part of the combustion manager block 204 of FIG. 3 as shown. In the illustrated embodiment, block 208 includes a data extraction block 770 receiving as an input the system performance target vector $Y_T$. Block 770 is configured to extract the various data values forming vector $Y_T$, and to provide such values to a clamp-above-zero block 772 operable to provide lower limits to each of the extracted data values before providing such data values to a division input of an arithmetic block 774. The model output vector, Y, is provided as an input to another data extraction block 776 operable to extract each of the model output values produced by the system models block 206, and to provide such extracted values to a subtraction input of summation node 778 having an addition input receiving the corresponding target data values extracted from the system performance target vector, $Y_T$, by data extraction block 770. The output of summation node 778 is a data vector carrying values corresponding to differences between the various data values comprising the system performance target value, $Y_T$, and the corresponding model output values carried by the model output vector, Y. A second multiplication input of block 774 receives a constant value, e.g., 100, stored in memory block 780. The output of block 774 is provided as an input to an absolute value block 782 having an output supplied to a first input of a scalar or "dot" product block 784 having a second input receiving the weight vector, W, produced by the system performance target logic block 202. The output of block 784 defines the scalar performance metric, U, produced by the objective logic block 208. As described hereinabove, the objective logic block 208 may be configured to compute the scalar performance metric, U, according to any of the number of difference objective functions, and in the embodiment illustrated in FIG. 25, the scalar performance metric, U, is computed according to the equation $U=W\cdot|100*(Y_T-Y)/Y_T|$.

Figure 26:
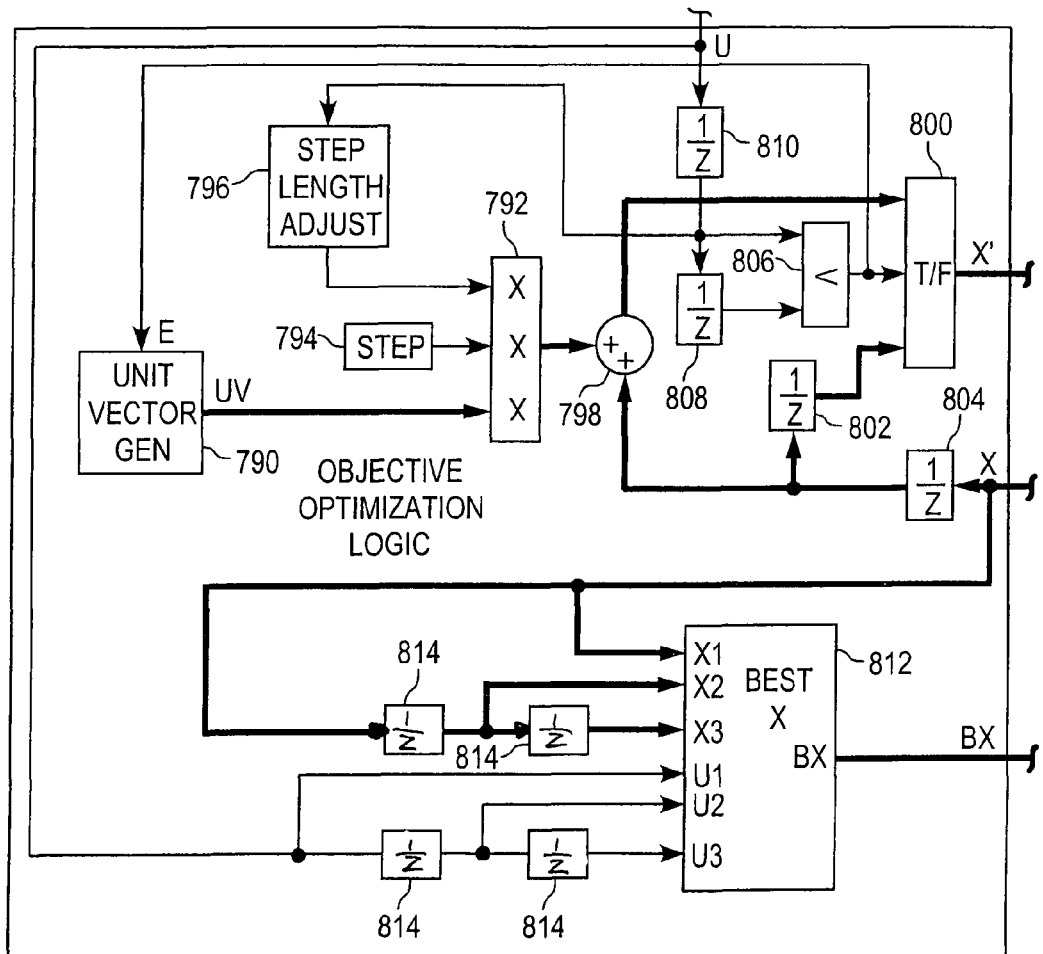
FIG. 26 is a block diagram of one illustrative embodiment of the objective optimization logic block forming part of the combustion manager block of FIG. 3.

Referring now to FIG. 26, one illustrative embodiment of the objective optimization logic block 210 forming part of the combustion manager block 204 of FIG. 2 is shown. In the illustrated embodiment, block 210 includes a unit vector generator 790 receiving an enable value, E, from the output of an arithmetic output block 806, and producing a unit data vector, UV, when enabled by the enable value, E. The unit data vector, UV, generated by block 790 is provided to a first multiplication input of a multiplication block 792 having a second multiplication input receiving a step value, STEP, stored in memory block 794. The STEP value corresponds to a calculation step length or time for the optimization algorithm. A third multiplication input of block 792 receives a step length adjust value stored in memory block 796, wherein the step length adjust value is continually computed by the objective optimization logic illustrated in FIG. 26, and is multiplied by the STEP value stored in block 794 to thereby adjust to the calculation step length of the objective optimization algorithm. The output of multiplication block 792 is a data vector supplied to a first addition input of a summation node 798 having a second addition input receiving the output vector, X, delayed one calculation cycle by a delay block 804. The output of summation node 798 is a data vector supplied to a "true" input of true/false block 800 having a "false" input receiving a second delayed representation of the output vector, X, delayed by delay blocks 804 and 802 respectively. A control input of true/false block 800 receives the output of an arithmetic operator block 806, which also provides the enable value, E, to the unit vector generator block 790, wherein the arithmetic operator block 806 has a first input receiving the output of another delay block 808 having an input sharing the second input of block 806 and receiving the output of another delay block 810. The input of delay block 810 is the scalar performance metric, U, so that one input of the arithmetic block 806 receives a single delayed representation of the scalar performance metric, U, and the second input receives a double delayed representation of the scalar performance metric, U. In the illustrated embodiment, the arithmetic operator block 806 is a "less than" operator, such that the output of block 806 is "true" when the single delayed representation of the scalar performance metric, U, produced by block 810, is less than the double delayed representation of the scalar performance metric, U, produced by block 808, and is otherwise "false." The output of true/false block 800 is the unconstrained solution vector, X'.

The output vector, X, is also supplied to an "X1" input of a "Best X" logic block 812, and also to a first delay block 814. The output of the first delay block 814 is supplied to an "X2" input of block 812, and also to a second delay block 814, the output of which is supplied to an "X3" input of block 812. Likewise, the scalar performance metric, U, is supplied to a "U1" input of logic block 812 and also to a third delay block 814. The output of the third delay block 814 is supplied to a "U2" input of block 812, and also to a fourth delay block 814, the output of which is supplied to a "U3" input of block 812. The scalar performance metric values, U1-U3, thus correspond to the three most recent scalar performance metric values resulting from the three most recent iterations of the combustion manager block 204, and the output vectors, X1-X3, likewise correspond to the three most recent output vectors resulting from the three most recent iterations of the combustion manager block 204. The "Best X" logic block 812 is operable, as will be described more fully hereinafter with respect to FIG. 28, to choose one of the output vectors, X1-X3, as the "best" output vector, BX.

As described hereinabove, the objective optimization logic block 210 may be configured in accordance with any of a number of known direct search optimization algorithms. In the embodiment of FIG. 26, the illustrated optimization algorithm is a known random walk with direction exploitation and step length adjust optimization algorithm, although it will be understood at any known optimization algorithm, such as any one or more of the optimization algorithms described hereinabove, may alternatively be used.

Figure 27:
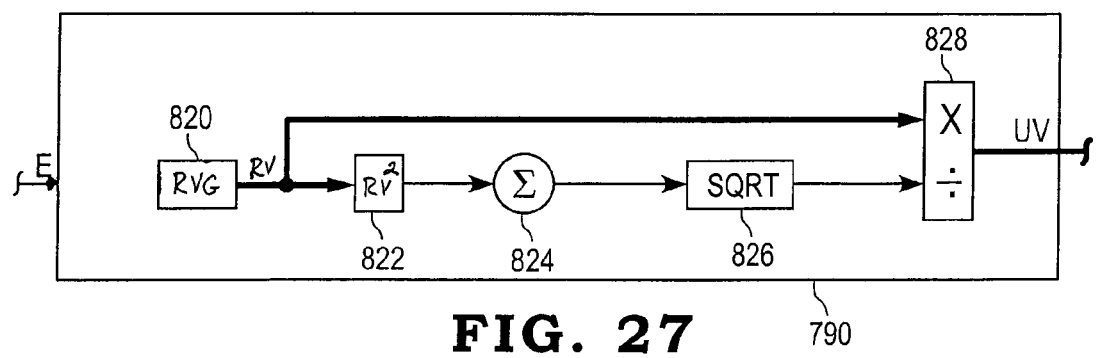
FIG. 27 is a block diagram of one illustrative embodiment of the unit vector generator block forming part of the objective optimization logic block of FIG. 26.

Referring now to FIG. 27, one illustrative embodiment of the unit vector generator block 790 forming part of the objective optimization logic block 210 of FIG. 26 is shown. In the illustrated embodiment, block 790 includes a random vector generator 820 configured to randomly generate a vector, RV. The output of the random vector generator 820 is a data vector supplied to an input of a square function block 822 and to a multiplication input of an arithmetic block 828. Square function block 822 is operable to square each value in the random number data vector produced by block 820, and to supply a corresponding vector of squared data values to a summation block 824 configured to sum all of the squared data values forming the squared data vector produced by block 822. The output of summation node 824 is a scalar value supplied to a square root function block 826 operable to compute the square root of the summed data values produced by summation node 824, and to supply the corresponding square root value to a division input of arithmetic block 828. Arithmetic block 828 is configured to compute a ratio of each data value in the data vector produced by a random number generator 820 and the square root value produced by block 826, and to produce as an output corresponding data values forming the unit vector, UV, produced by block 790. The enable value, E, produced by the objective optimization logic block 210, enables the unit vector generator block 790 to generate and latch the unit vector, UV, when the enable value changes from a non-enabling state to an enabling state.

Figure 28:
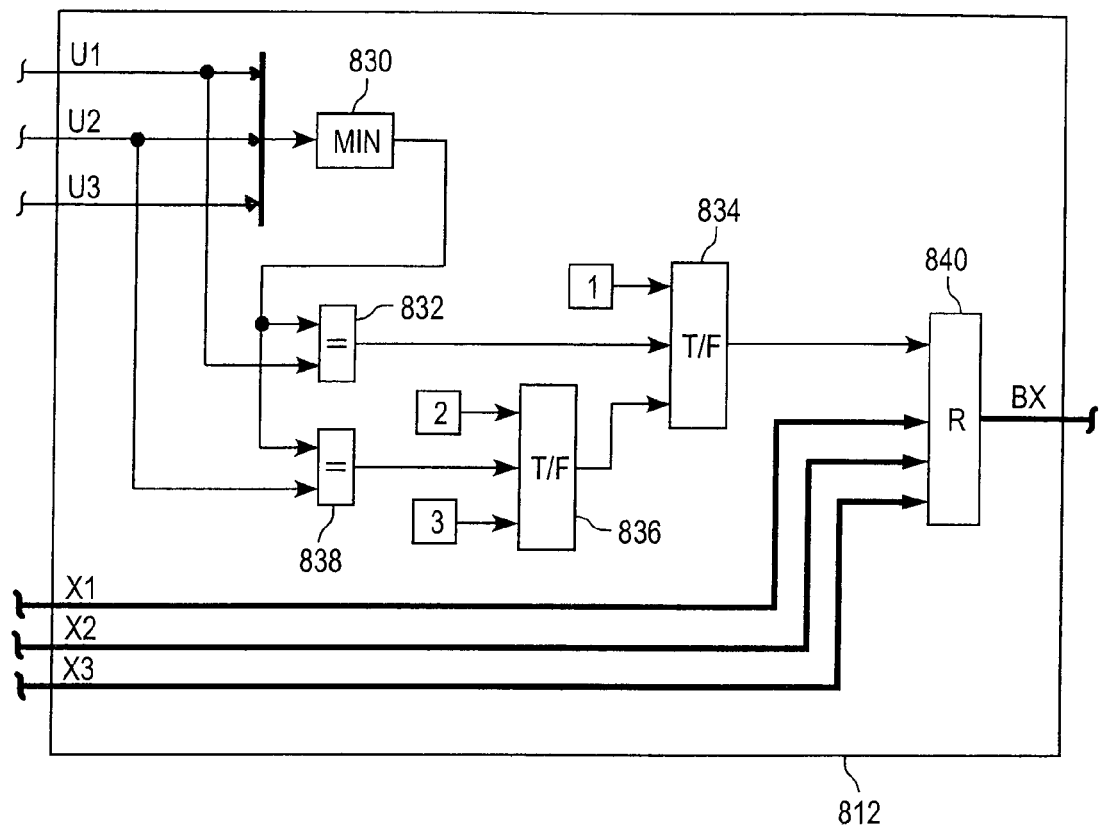
FIG. 28 is a block diagram of one illustrative embodiment of the "Best X" block of FIG. 26.

Referring now to FIG. 28, one illustrative embodiment of the Best X logic block 812 forming part of the objective optimization logic block 210 of FIG. 26 is shown. In the illustrated embodiment, a MIN block 830 is configured to receive each of the three scalar performance metric values, U1-U3, and to produce as an output the scalar performance metric having minimum magnitude. The first scalar performance metric, U1, and the output of the MIN block 830 are supplied as two inputs of an equality block 832, such that the output of the equality block 832 is true only if U1 is the one of the three scalar performance metric values, U1-U3, having minimum magnitude. The output of the equality block 832 is supplied to a control input of a true/false block 834 having a true input receiving the numeral 1 and a false input receiving the output of another true/false block 836 having a true input receiving the numeral 2 and a false input receiving the numeral 3. The control input of the true/false block 836 receives the output of another equality block 838 having a first input receiving the output of the MIN block 830 and a second input receiving the second scalar performance metric, U2. Thus, the output of the equality block 838 is true only if U2 is the one of the three scalar performance metric values, U1-U3, having minimum magnitude. If so, the true/false block produces the numeral 2 as an output, and otherwise produces the numeral 3 as an output. The true/false block 834 likewise produces the numeral 1 as an output of the output of the equality block 832 is true, and otherwise produces as an output the numeral 2 or 3, depending on the output of the true/false block 836. The output of the true/false block 834 is thus a numeral, e.g., 1, 2 or 3, that corresponds to the one of the scalar performance metric values, U1-U3, having minimum magnitude.

The output of the true/false block 834 is supplied to a control input of a relay 840 having first, second and third data inputs receiving corresponding first, second and third output vectors, X1, X2 and X3 respectively. The output of the relay 840, which is the "best" output vector, BX, is the one of the output vectors, X1-X3, that corresponds to the numeral produced at the output of the true/false block 834. Thus, for example, if the magnitude of the scalar performance metric U2 is the minimum of the magnitudes of U1-U3, the best X vector, BX, produced by the relay 840 will be X2.

It will be understood that while the objective optimization logic block 210 and the Best X logic block 812 are illustrated in FIGS. 26 and 28 and described as being configured to process three U values and X vectors, the objective optimization logic block 210 and the Best X logic block 812 may alternatively be configured to process any number, N, of U values and X vectors to thereby choose from the "N" most recent output vectors, X1-XN, a "best" output vector, BX, as a function of the "N" most recent scalar performance metric values, U1-UN.

Figure 29:
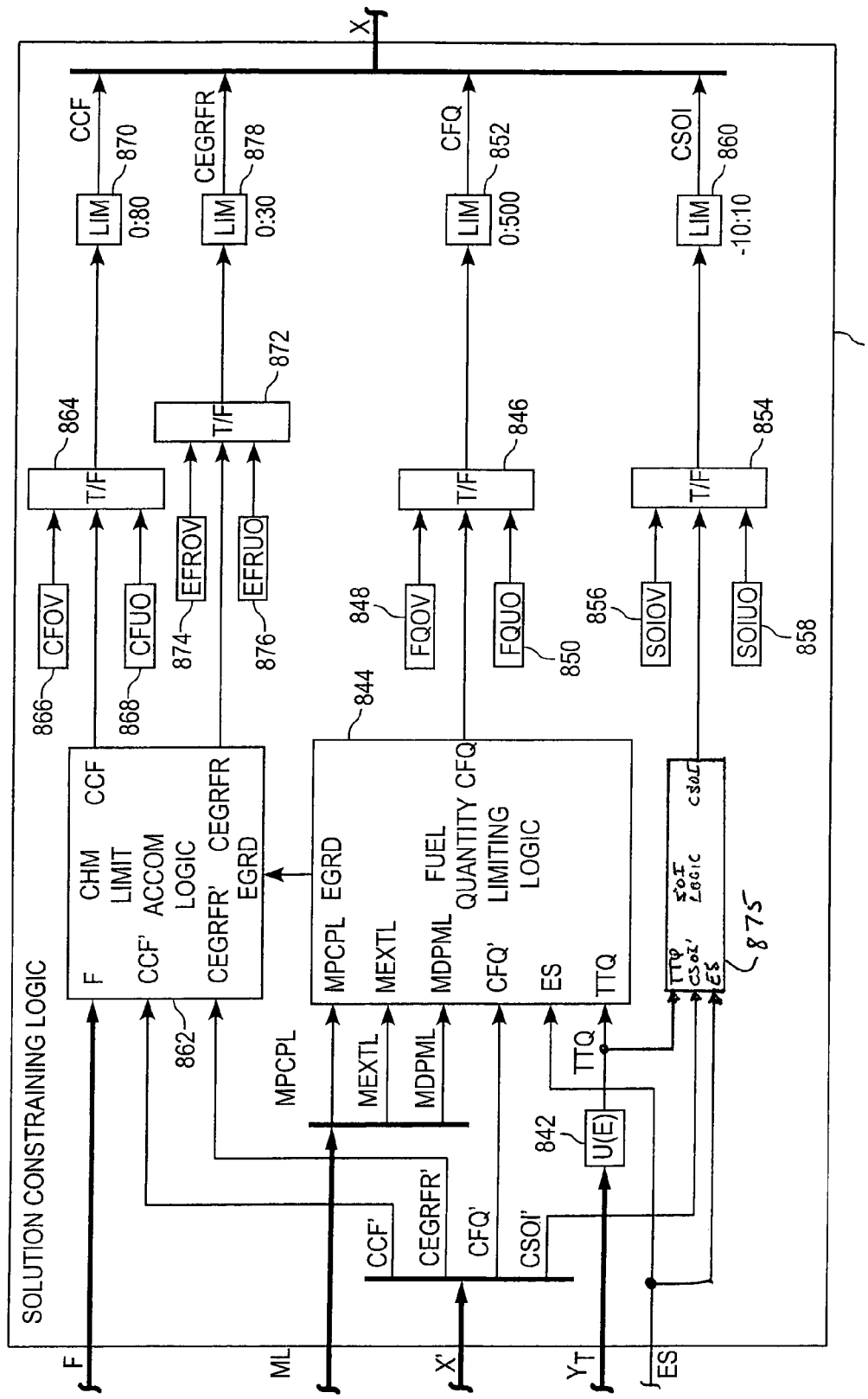
FIG. 29 is a block diagram of one illustrative embodiment of the solution constraining logic block forming part of the combustion manager block of FIG. 3.

Referring now to FIG. 29, one illustrative embodiment of the solution constraining logic 212 forming part of the combustion manager block 204 of FIG. 3 is shown. In the illustrated embodiment, the solution constraining logic block 212 includes a fuel quantity limiting logic block 844 receiving as inputs a target engine torque value, TTQ, extracted from the system performance target vector, $Y_T$, via a data extraction block 842, the engine speed signal, ES, and an unconstrained commanded fuel quantity, CFQ' forming part of the unconstrained solution vector, X', produced by the objective optimization logic block 210, and further receiving as inputs the modeled peak cylinder pressure limit value, MPCPL, the modeled exhaust temperature limit value, MEXTL, and the modeled dry particulate matter limit value, MDPML, all forming part of the model limit vector, ML, produced by the system models block 206. The fuel quantity limiting logic block 844 is operable, as will be described in greater detail hereinafter with respect to FIGS. 30 and 31, to process the foregoing input signals and produce as outputs a commanded fuel quantity value CFQ, and an EGR disable value, EGRD. The commanded fuel quantity value, CFQ, is provided by the fuel quantity limiting logic block 844 to a false input of a true/false block 846 having a true input receiving a fuel quantity override value, FQOV, from block 848 and a control input receiving a fuel quantity user override value, FQUO, from block 850. The true/false block 846 provides for user override of the commanded fuel quantity value, CFQ, produced by the fuel quantity limiting logic block 844, and produces as its output the fuel quantity override value, FQOV, if FQUO is true, and otherwise produces as its output the commanded fuel quantity value, CFQ. The output of true/false block 846 is provided as an input to a limiter block 852 having lower and upper limit values; e.g., 0 and 500 respectively, and the output of limiter block 850 is the commanded fuel quantity value, CFQ, forming part of the output vector, X.

The unconstrained commanded SOI value, CSOI', forming part of the unconstrained solution vector, X', produced by the objective optimization logic block 210, is provided to a false input of a true/false block 854 having a true input receiving an SOI override value, SOIOV, from block 856 and a control input receiving an SOI user override value, SOIUO, from block 858. The true/false block 854 provides for user override of the unconstrained commanded SOI value, CSOI', and produces as its output the SOI override value, SOIOV, if SOIUO is true, and otherwise produces as its output the unconstrained commanded fuel quantity value, CSOI'. The output of true/false block 854 is provided as an input to a limiter block 860 having lower and upper limit values; e.g., −10 and 10 respectively, and the output of limiter block 860 is the commanded SOI value, CSOI, forming part of the output vector, X.

The solution constraining logic block 212 further includes a charge manager, (CHM) limit accommodation logic block 862 receiving as input signals the feedback vector, F, provided by the charge manager block 216 of FIG. 3, an unconstrained commanded charge flow value, CCF', and an unconstrained commanded EGR fraction value, CEGRFR', both forming part of the unconstrained solution vector, X', produced by the objective optimization logic block 210, and the EGR disable value, EGRD, from the fuel quantity limiting logic block 844. The charge manager limit accommodation logic block 862 is operable, as will be described in greater detail hereinafter with respect to FIG. 32, to process the foregoing input signals and produce as outputs a commanded charge flow value, CCF, and a commanded EGR fraction value, CEGRFR. The commanded charge flow value, CCF, is provided by the CHM limit accommodation logic block 862 to a false input of a true/false block 864 having a true input receiving a charge flow override value, CFOV, from block 866 and a control input receiving a charge flow user override value, CFUO, from block 868. The true/false block 864 provides for user override of the commanded charge flow value, CCF, produced by the CHM limit accommodation logic block 862, and produces as its output the charge flow override value, CFOV, if CFUO is true, and otherwise produces as its output the commanded charge flow value, CCF. The output of true/false block 864 is provided as an input to a limiter block 870 having lower and upper limit values; e.g., 0 and 80 respectively, and the output of limiter block 870 is the commanded charge flow value, CFQ, forming part of the output vector, X. The commanded EGR fraction value, CEGRFR, is provided by the CHM limit accommodation logic block 862 to a false input of a true/false block 872 having a true input receiving an EGR fraction override value, EFROV, from block 874 and a control input receiving an EGR fraction user override value, EFRUO, from block 876. The true/false block 872 provides for user override of the commanded EGR fraction value, CEGRFR, produced by the CHM limit accommodation logic block 862, and produces as its output the EGR fraction override value, EFROV, if EFRUO is true, and otherwise produces as its output the commanded EGR fraction value, CEGRFR. The output of true/false block 872 is provided as an input to a limiter block 878 having lower and upper limit values; e.g., 0 and 30 respectively, and the output of limiter block 878 is the commanded EGR fraction value, CEGRFR, forming part of the output vector, X.

It will be understood that while the solution constraining logic block 212 is illustrated in FIG. 29 as including fuel quantity limit logic and CHM limit accommodation logic, block 212 may alternatively be configured to include more or fewer parameter constraining strategies. For example, the solution constraining logic block 212 may alternatively or additionally include an SOI constraint logic block configured to constrain according to specified criteria the unconstrained commanded SOI value, CSOI', forming part of the unconstrained output vector, X'. Examples of other alternative or additional parameter constraining strategies that may be incorporated within block 212 will occur to those skilled in the art, and any such additional parameter constraining strategies included within block 212 are intended to fall within the scope of the claims appended hereto.

Figure 30:
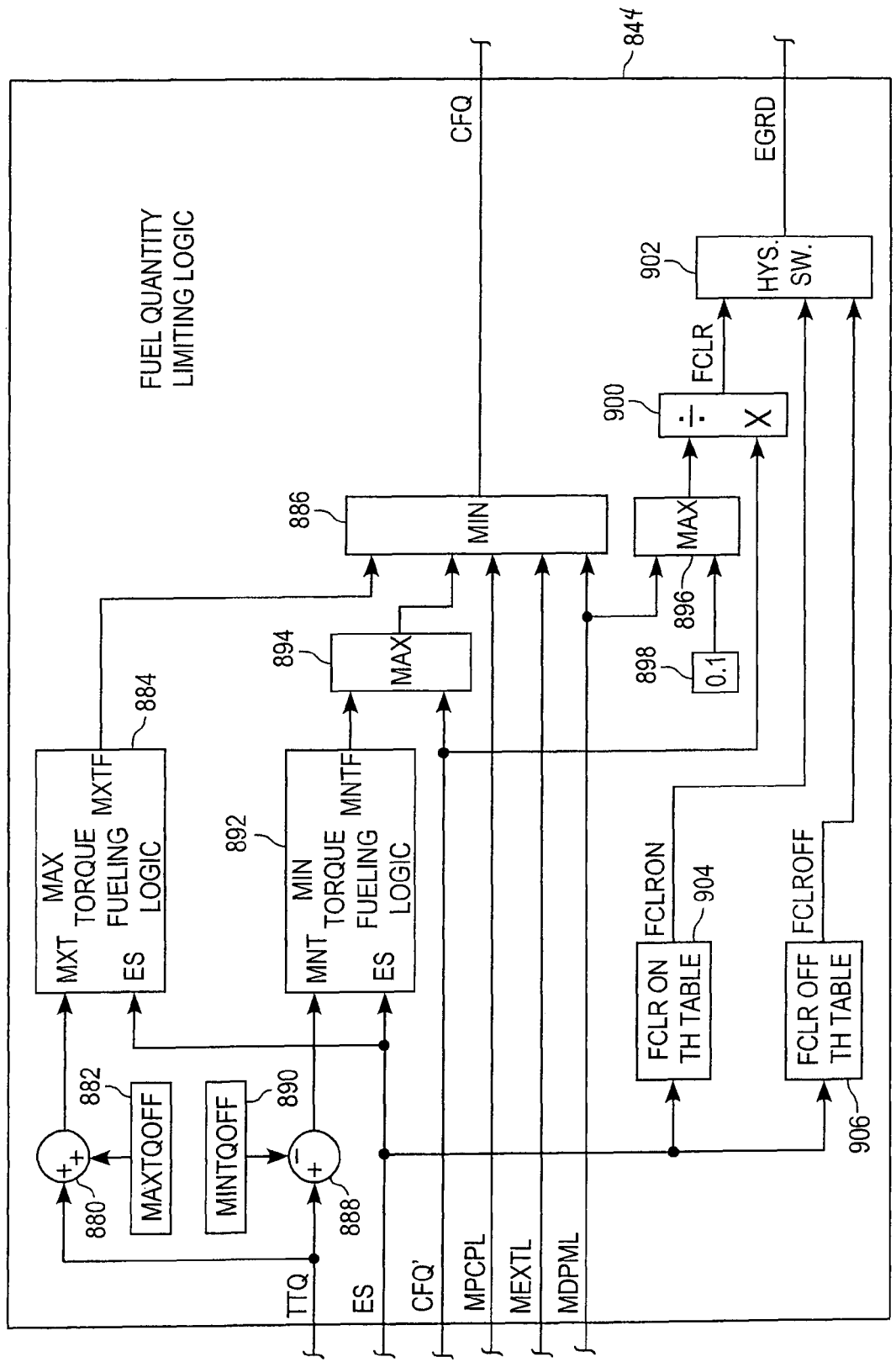
FIG. 30 is a block of diagram of one illustrative embodiment of the fuel quantity limiting logic block forming part of the solution constraining logic block of FIG. 28.

Referring now to FIG. 30, one illustrative embodiment of the fuel quantity limiting logic block 844 forming part of the solution constraining logic block 212 of FIG. 28 is shown. In the illustrated embodiment, block 844 includes a summation node 880 having a first addition input receiving the target engine torque value, TTQ, and a second addition input receiving a maximum torque offset value, MAXTQOFF, stored in memory block 882. The output of summation node 880 represents the sum of TTQ and MAXTQOFF, and is supplied to a maximum torque input, MXT, of a maximum torque fueling logic block 884. The engine speed signal, ES, is supplied as a second input to block 884, and block 884 is operable, as will be described in greater detail hereinafter with respect to FIG. 31, to process the foregoing inputs and provide as an output a maximum torque fueling value, MXTF, which is supplied to a first input of a MIN block 886.

Another summation node 888 has an addition input receiving the target engine torque value, TTQ, and a subtraction input receiving a minimum torque offset value, MINTQOFF, stored in memory block 890. The output of summation node 888 represents a difference between TTQ and MINTQOFF, and is supplied to a minimum torque input, MNT, of a minimum torque fueling logic block 892, having an engine speed input, ES, receiving the engine speed signal, ES. The minimum torque fueling logic block 892 is operable, as will also be described hereinafter with respect to FIG. 31, to process the foregoing input signal and value and produce as an output a minimum torque fuel value, MNTF, which is supplied to a first input of a MAX block 894 having a second input receiving the unconstrained commanded fuel quantity value, CFQ', forming part of the unconstrained solution vector, X', produced by the objective optimization logic block 210. The output of MAX block 894 is supplied as a second input to MIN block 886. Third, fourth and fifth inputs of MIN block 886 receive the modeled peak cylinder pressure limit value, MPCPL, the modeled exhaust temperature limit value, MEXTL, and the modeled dry particulate matter limit value, MDPML, respectively, all forming part of the model limit vector, ML, produced by the system models block 206. MIN block 886 is operable to produce as the commanded fuel quantity value, CFQ, the minimum of MXTF, MPCPL, MEXTL, MDPML, and the maximum of MNTF and CFQ'.

The modeled dry particulate matter limit value, MDPML, is further supplied as a first input to a MAX block 896 having a second input receiving a constant, e.g., 0.1, stored in memory block 898. The output of MAX block 896 is supplied to a division input of an arithmetic block 900, and blocks 896 and 898 accordingly provide divide-by-divide zero protection for block 900. A multiplication input of arithmetic block 900 receives the unconstrained commanded fuel quantity value, CFQ', forming part of the unconstrained solution vector, X', produced by the objective optimization logic block 210. The ratio of CFQ' and MDPML defines a flow control parameter, FCLR, which is provided as an input to a hysteresis switch block 902. A "true" switch point of switch block 902 is provided by a FCLRON output of a FCLR "on" threshold table 904 receiving as an input the engine speed signal, ES. Table 904 is populated with switch point values each as a function of engine speed, ES. A "false" input of hysteresis switch block 902 is provided by a FCLROFF output of a FCLR "off" threshold table 906, also receiving as an input the engine speed signal, ES. Table 906 is likewise populated with FCLROFF switch point threshold values each as a function of engine speed, ES. The output of hysteresis switch 902 is the EGR disable value, EGRD, and EGRD is "true" or "1" as long as the FCLR output of arithmetic block 900 is greater than the low switch point, FCLROFF, and is "false" or "0" as long as the FCLR output of arithmetic block 900 is below the upper switch point FCLRON.

Figure 31:
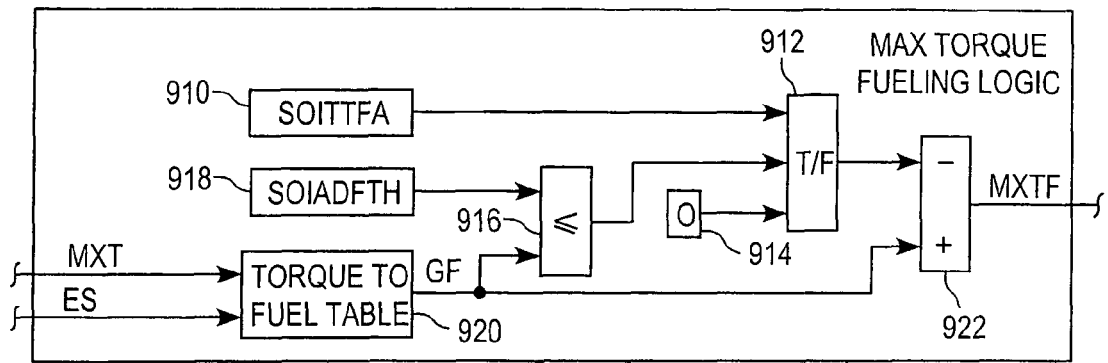
FIG. 31 is a block diagram of one illustrative embodiment of the maximum torque fueling logic block forming part of the fuel quantity limiting logic block of FIG. 30.

Referring now to FIG. 31, one illustrative embodiment of the maximum torque fueling logic block 884 forming part of the fuel quantity limiting logic block 844 of FIG. 30 is shown. In the illustrated embodiment, block 884 includes a true/false block 912 having a "true" input receiving a start-of-injection, torque-to-fuel adjust value, SOITTFA, stored in memory block 910. A "false" input of true/false block 912 receives a constant value; e.g., 0, stored in memory block 914. A control input of true/false block 912 is provided by the output of an arithmetic output block 916 having a first input receiving a start-of-injection adjusted fuel threshold value, SOIADFTH, stored in memory block 918, and a second input receiving a gross fuel value, GF, produced by a torque to fuel table 920. Table 920 receives as inputs the maximum torque value, MXT, produced by summation node 880 as a sum of the target engine torque value, TTQ, and the maximum torque offset value, MAXTQOFF, stored in memory block 882 (see FIG. 30), and the engine speed signal, ES. Table 920 is populated with gross fueling values, GF, each as functions of MXT and ES. The arithmetic operator of block 916 is a "less than-or-equal to" operator, such that as long as SOIADFTH is less than or equal to the gross fueling value, GF, produced by table 920, the output of true/false block 912 is the SOI torque-to-fuel adjustment value, SOITTFA, stored within memory block 910, and is otherwise zero.

The output of true/false block 912 is supplied to a subtraction input of an arithmetic block 922 having an addition input receiving the gross fueling value, GF, produced by the torque-to-fuel table 920. The output of arithmetic block 922 is the maximum torque fuel value, MXTF, produced by block 884, and is a difference between the gross fueling value, GF, produced by table 920 and the output of true/false block 912. The minimum torque fueling logic block 892 of FIG. 30 may be constructed similarly to block 884 illustrated in FIG. 1, with the exception that the torque-to-fuel table 920 receives as inputs the engine speed signal, ES, and the minimum torque value, MMT, produced by summation node 888 as a difference between the target engine torque value, TTQ, and the minimum torque offset value, MINTQOFF, stored in memory location 890 (see FIG. 30).

Figure 32:
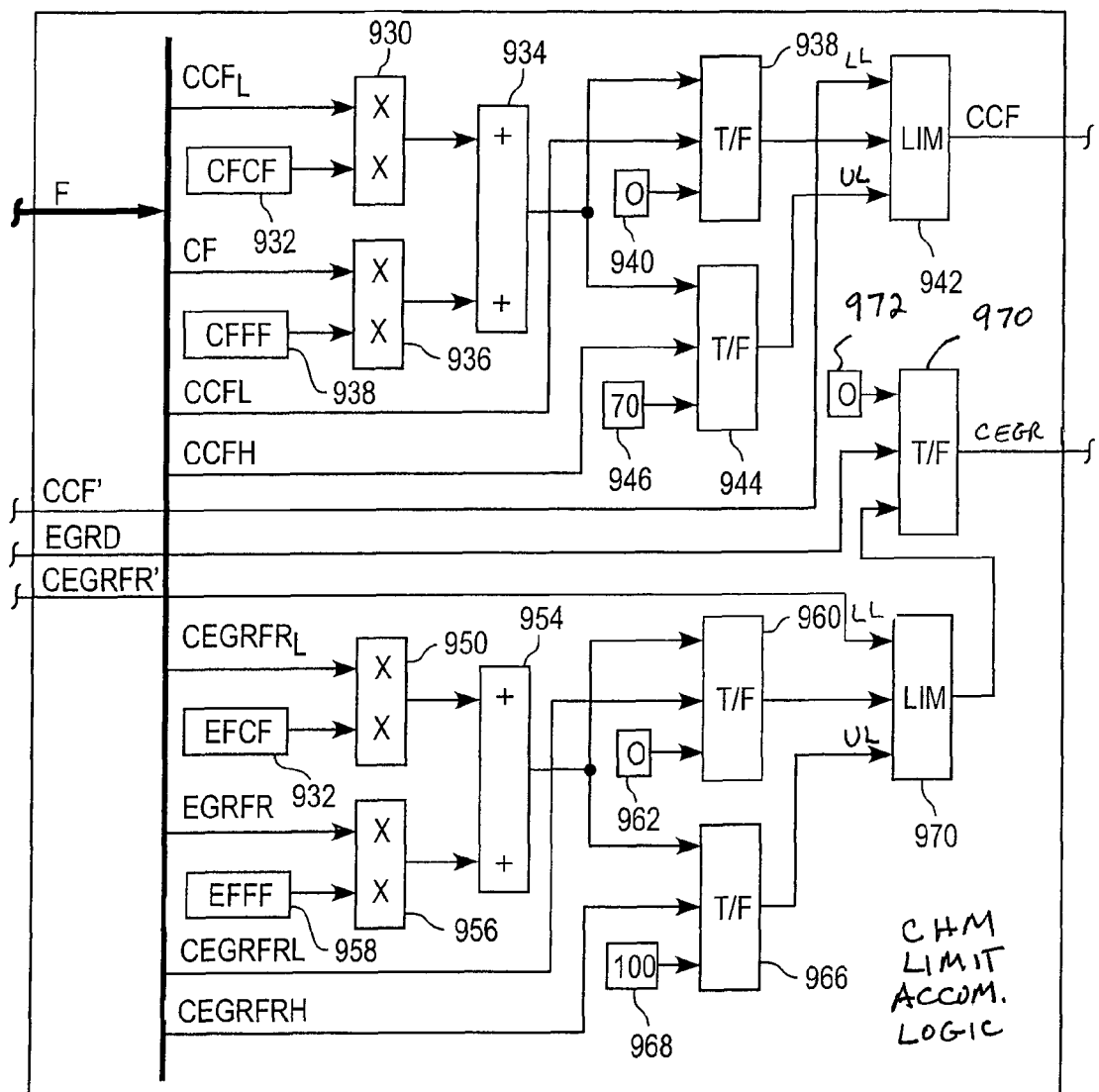
FIG. 32 is a block diagram of one illustrative embodiment of the CHM limit accommodation logic block forming part of the solution constraining logic block of FIG. 28.

Referring now to FIG. 32, one illustrative embodiment of the charge manager limit accommodation logic block 862 forming part of the solution constraining logic block 212 of FIG. 29 is shown. In the illustrated embodiment, block 862 includes a multiplication block 930 having a first multiplication input receiving a commanded charge flow limit value, $CCF_L$, forming part of the feedback vector, F, produced by the charge manager block 216 of FIG. 3, and a second multiplication input receiving a charge flow command fraction value, CFCF, stored in memory block 932. The output of multiplication block 930 is supplied to a first addition input of a summation block 934 having a second addition input receiving the output of another multiplication block 936. A first multiplication input of block 936 receives the charge flow value, CF, forming part of the feedback vector, F, supplied by the charge manager block 216 of FIG. 3 (or alternatively supplied by the system models block 206), and a second multiplication input receiving a charge flow feedback fraction value, CFFF, stored in memory block 938. The output of summation block 934 is supplied to "true" inputs of true/false blocks 938 and 944, and represents a weighted sum of the actual charge flow value, CF, and the commanded charge flow limit value, $CFF_L$. A "false" input of true/false block 938 receives a constant value, e.g., 0, stored in memory block 940, and the "false" input of true/false block 944 receives another constant value, e.g., 70, stored in memory block 946. The control input of true/false block 938 is a commanded charge flow low value, CCFL, and the control input to true/false block 944 is a commanded charge flow high value, CCFH, each forming part of the feedback vector, F, produced by the charge manager block 216. The output of true/false block 938 is supplied as a lower limit, LL, of a limiter block 942, and the output of true/false block 944 is supplied as an upper limit, UL, of limiter block 942. The unconstrained commanded charge flow value, CCF', forming part of the unconstrained solution vector, X', produced by the objective optimization logic block 210 is supplied to another input of limiter block 942, and limiter block 942 is operable to limit CCF' to an upper limit of either UL and the weighted sum of CF and $CCF_L$, depending upon the logic state of CCFH, and to a lower limit of LL or the weighted sum of CF or $CCF_L$, depending upon the logic status of CCFL. In any case, the output of limiter block 942 is the commanded charge flow value, CCF, produced by block 862.

Block 862 further includes a multiplication block 950 having a first multiplication input receiving a commanded EGR fraction limit value, $CEGRFR_L$, forming part of the feedback vector, F, produced by the charge manager block 216 of FIG. 3, and a second multiplication input receiving an EGR fraction command fraction value, EFCF, stored in memory block 952. The output of multiplication block 950 is supplied to a first addition input of a summation block 954 having a second addition input receiving the output of another multiplication block 956. A first multiplication input of block 956 receives the EGR fraction value, EGRFR, forming part of the feedback vector, F, supplied by the charge manager block 216 of FIG. 3 (or alternatively supplied by the system models block 206), and a second multiplication input receiving an EGR fraction feedback fraction value, EFFF, stored in memory block 958. The output of summation block 954 is supplied to "true" inputs of true/false blocks 960 and 966, and represents a weighted sum of the actual EGR fraction value, EGRFR, and the commanded EGR fraction limit value, $CEGRFR_L$. A "false" input of true/false block 960 receives a constant value, e.g., 0, stored in memory block 962, and the "false" input of true/false block 966 receives another constant value, e.g., 100, stored in memory block 968. The control input of true/false block 960 is a commanded EGR fraction low value, CEGRFRL, and the control input to true/false block 966 is a commanded EGR fraction high value, EGRFRH, each forming part of the feedback vector, F, produced by the charge manager block 216. The output of true/false block 960 is supplied as a lower limit, LL, of a limiter block 964, and the output of true/false block 966 is supplied as an upper limit, UL, of limiter block 964. The unconstrained commanded EGR fraction value, CEGRFR', forming part of the unconstrained solution vector, X', produced by the objective optimization logic block 210 is supplied to another input of limiter block 964, and limiter block 964 is operable to limit CEGRFR' to an upper limit of either UL and the weighted sum of EGRFR and $CEGRFR_L$, depending upon the logic state of CEGRFRH, and to a lower limit of LL or the weighted sum of EGRFR or $CEGRFR_L$, depending upon the logic status of CEGRFRL. In any case, the output of limiter block 964 is provided to a false input of another true/false block 970 having a true input receiving a zero value from block 972, and having a control input receiving the EGR disable signal produced by the fuel quantity limiting logic block 844 of FIG. 29. The output of the true/false block 970 is the commanded EGR fraction value, CEGRFR, produced by block 862. As long as the EGR disabled signal, EGRD, is inactive, or false, the commanded EGR fraction value, CEGRFR, produced by block 862 will be the commanded EGR fraction value produced by the limiter block 964. If, on the other hand, the EGR disabled signal, EGRD, is active, or true, the commanded EGR fraction value, CEGRFR, will be disabled or zero.

Figure 33:
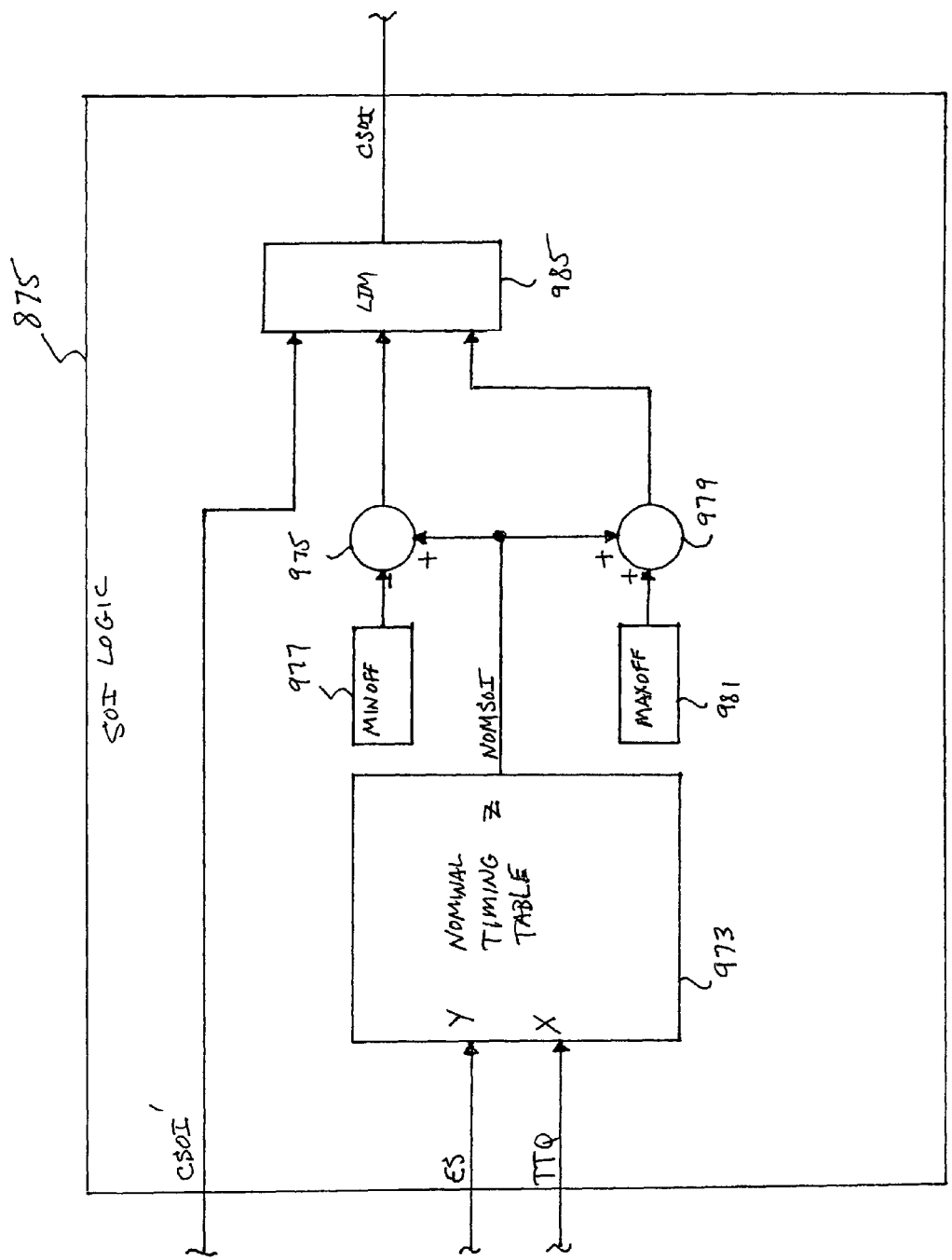
FIG. 33 is a block diagram of one illustrative embodiment of the SOI logic forming part of the solution constraining logic block of FIG. 28.

Referring now to FIG. 33, one illustrative embodiment of the SOI logic block 875, forming part of the solution constraining logic block 212 of FIG. 29, is shown. In the illustrated embodiment, block 875 includes a 3-dimensional nominal timing table 973 receiving as inputs the engine speed signal and the target engine torque value, TTQ, and producing as an output a nominal start-of-injection (SOI) value NOMSOI that is determined by the table 973 as a function of engine speed and target engine torque. The nominal start-of-injection value, NOMSOI, is supplied to additive inputs of a pair of summation nodes 975 and 979. A subtractive input of the summation node 975 receives a constant minimum SOI offset value, MINOFF that is stored in memory block 977. The output of the summation node 975 is thus the difference between the nominal start-of-injection value, NOMSOI, and the minimum SOI offset value, MINOFF, and is supplied to a lower limit input of a limiter 985. Another additive input of the summation node 979 receives a constant maximum SOI offset value, MAXOFF that is stored in memory block 981. The output of the summation node 979 is thus the sum of the nominal start-of-injection value, NOMSOI, and the maximum SOI offset value, MAXOFF, and is supplied to an upper limit input of the limiter 985. A signal input of the limiter 985 receives the unconstrained commanded SOI value CSOI'. The output of the limiter 985 is the commanded start-of-injection value, CSOI. In operation, the SOI logic block 875 produces the commanded start-of-injection value, CSOI, as the unconstrained SOI value, CSOI' limited to a lower limit of NOMSOI−MINOFF and to an upper limit of NOMSOI+MAXOFF.

Figure 34:
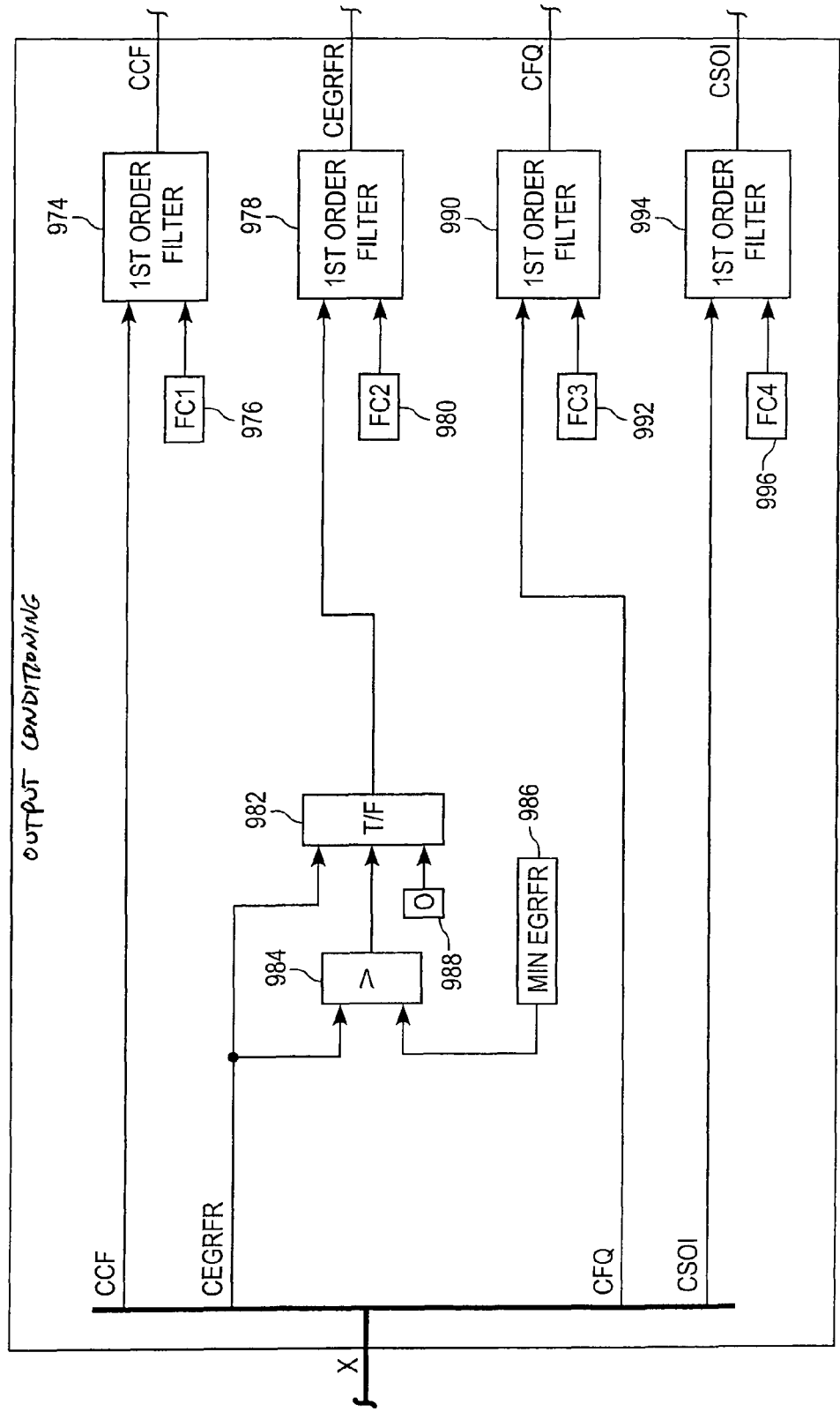
FIG. 34 is a block diagram of one illustrative embodiment of the output conditioning block forming part of the combustion manager block of FIG. 3.

Referring now to FIG. 34, one illustrative embodiment of the output conditioning logic block 214 forming part of the combustion manager block 204 of FIG. 3 is shown. In the illustrated embodiment, block 214 includes a first order filter 974 receiving as an input the commanded charge flow value, CCF, forming part of the output vector, X, and receiving a filter constant value, FC1, stored in memory block 976. The output of filter block 974 is the commanded charge flow value, CCF, produced by the combustion manager block 204, and is a filtered representation of the commanded charge flow value, CCF, forming part of the output vector, X.

Block 214 further includes a second first order filter block 978 receiving as an input the output of a true/false block 982, and receiving a filter constant value, FC2, stored in memory block 980. The "true" input of true/false block 982 is the commanded EGR fraction value, CEGRFR, forming part of the output vector, X, and the "false" input of true/false block 982 is a constant, e.g., 0, stored in memory block 988. The control input of true/false block 982 is the output of an arithmetic operator block 984 having a first input receiving the commanded EGR fraction value, CEGRFR, forming part of the output vector, X, and having a second input receiving a minimum EGR fraction value, MINEGRFR, stored in memory block 986. The arithmetic operator of block 984 is a "greater than" operator such that the output of true/false block 982 is the commanded EGR fraction value, CEGRFR, forming part of the output vector, X, as long as CEGRFR is greater than the minimum EGR fraction value, MINEGRFR, and is otherwise zero. If the output of block 984 is "false", the output of true/false block 982 is zero, as is the CEGRFR output of filter block 978 and of block 214, thereby commanding zero EGR flow. If, on the other hand, the output of block 982 is "true", the output of true/false block 982 is the commanded EGR fraction value, CEGRFR, forming part of the output vector, X, and the output of filter block 978 is the commanded EGR fraction value, CEGRFR, produced by the combustion manager block 204.

Block 214 includes a third first order filter 990 receiving as an input the commanded fuel quantity value, CFQ, forming part of the output vector, X, and receiving a filter constant value, FC3, stored in memory block 992. The output of filter block 990 is the commanded fuel quantity value, CFQ, produced by the combustion manager block 204, and is a filtered representation of the commanded fuel quantity value, CFQ, forming part of the output vector, X. Block 214 further includes a fourth first order filter 994 receiving as an input the commanded start-of-injection value, CSOI, forming part of the output vector, X, and receiving a filter constant value, FC4, stored in memory block 996. The output of filter block 994 is the commanded start-of-injection value, CSOI, produced by the combustion manager block 204, and is a filtered representation of the commanded start-of-injection value, CSOI, forming part of the output vector, X.

The control framework described herein uses a model-based approach, wherein the model outputs are based on sensor data. The control framework thus provides accuracy over a wide range of operating conditions, including off nominal operating conditions. The solution produced by such a framework is accordingly always optimized for current operating conditions, and is robust under all operating conditions.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A control framework generating control parameters for controlling operation of a physical system, the control framework comprising:

one or more embedded models each producing a model output corresponding to a different operating parameter of the physical system as a function of either of one or more operating values corresponding to operating conditions of the physical system and one or more of a number of solution parameters, objective logic producing a scalar performance metric as a function of the one or more model outputs, of one or more weight values and of one or more system performance target values, wherein the one or more model outputs defines a vector, Y, the one or more system performance target values defines a vector, $Y_T$, and the one or more weight values defines a vector, W, and wherein the objective logic is configured to determine a difference vector as a difference between the vectors Y and $Y_T$, and to determine the scalar performance metric as a vector inner product of the vector W and a function of the difference vector, objective optimization logic producing a number of unconstrained solution parameters in a manner that minimizes the scalar performance metric, and solution constraining logic determining the number of solution parameters from the number of unconstrained solution parameters in a manner that limits an operating range of at least one of the unconstrained control parameters, wherein the control parameters correspond to one of the number of unconstrained control parameters and the number of solution parameters, and wherein the solution constraining logic is further configured to produce at least one of the number of solution parameters as a function of at least one of the one or more system performance target values, and wherein the physical system is an internal combustion engine including an air handling system.

2. A control framework generating control parameters for controlling operation of a physical system, the control framework comprising:

one or more embedded models each producing a model output corresponding to a different operating parameter of the physical system as a function of either of one or more operating values corresponding to operating conditions of the physical system and one or more of a number of solution parameters, objective logic producing a scalar performance metric as a function of the one or more model outputs, of one or more weight values and of one or more system performance target values, wherein the one or more model outputs defines a vector, Y, the one or more system performance target values defines a vector, $Y_T$, and the one or more weight values defines a vector, W, and wherein the objective logic is configured to determine a difference vector as a difference between the vectors Y and $Y_T$, and to determine the scalar performance metric as a vector inner product of the vector W and a function of the difference vector, objective optimization logic producing a number of unconstrained solution parameters in a manner that minimizes the scalar performance metric, and solution constraining logic determining the number of solution parameters from the number of unconstrained solution parameters in a manner that limits an operating range of at least one of the unconstrained control parameters, wherein the control parameters correspond to one of the number of unconstrained control parameters and the number of solution parameters, and wherein the objective optimization logic includes solution selection logic responsive to a plurality of recent iterations of the scalar performance metric and to a corresponding plurality of recent iterations of the number of unconstrained solutions parameters to determine the control parameters as the one of the plurality of recent iterations of the number of unconstrained solution parameters having a corresponding one of the plurality of recent iterations of the scalar performance metric having a minimum magnitude with respect to remaining ones of the plurality of recent iterations of the scalar performance metric, and wherein the physical system is an internal combustion engine including an air handling system.

3. The control framework of claim 1 wherein the objective logic is configured to determine the scalar performance metric according to the relationship $U=W \cdot (Y-Y_T)$, where U is the scalar performance metric.

4. The control framework of claim 1 wherein the objective logic is configured to determine the scalar performance metric according to the relationship $U=W \cdot (Y-Y_T)^2$, where U is the scalar performance metric.

5. The control framework of claim 1 wherein the objective logic is configured to determine the scalar performance metric according to the relationship $U=W \cdot |Y-Y_T|$, where U is the scalar performance metric.

6. The control framework of claim 1 wherein the objective logic is configured to determine the scalar performance metric according to the relationship $U=W \cdot |(Y-Y_T)/Y_T|$, where U is the scalar performance metric.

7. The control framework of claim 1 wherein the number of solution parameters define a vector, X, the number of unconstrained solution parameters defines a vector, X', and the scalar performance metric is designated U;

and wherein the objective optimization logic is configured to produce X' as a function of U and X and a specified step size according to a direct search optimization technique.

8. The control framework of claim 7 wherein the objective optimization logic is configured to produce X' as a function of U and X and a specified step size according to a random walk optimization algorithm.

9. The control framework of claim 7 wherein the objective optimization logic is configured to produce X' as a function of U and X and a specified step size according to a random walk optimization algorithm with step length adjustment.

10. The control framework of claim 7 wherein the objective optimization logic is configured to produce X' as a function of U and X and a specified step size according to a random walk optimization algorithm with direction exploitation.

11. The control framework of claim 7 wherein the objective optimization logic is configured to produce X' as a function of U and X and a specified step size according to a random walk optimization algorithm with direction exploitation and step length adjustment.

12. The control framework of claim 7 wherein the objective optimization logic is configured to produce X' as a function of U and X and a specified step size according to a variant of a random walk optimization algorithm.

13. The control framework of claim 7 wherein the objective optimization logic is configured to produce X' as a function of U and X and a specified step size according to a univariate optimization algorithm.

14. The control framework of claim 2 wherein the control framework is configured to produce a commanded fuel quantity value as one of the control parameters and to produce a commanded start-of-injection value as another one of the control parameters.

15. The control framework of claim 14 further including a fuel system responsive to fueling commands to supply fuel to the engine;

and wherein the control computer includes fueling logic responsive to the commanded fuel quantity value and the commanded start-of-injection value to produce the fueling commands.

16. The control framework of claim 2 wherein the control framework is configured to produce a commanded charge flow value as one of the control parameters and to produce a commanded exhaust gas recirculation (EGR) fraction value as another one of the control parameters.

17. The control framework of claim 16 wherein the air handling system includes an exhaust gas recirculation (EGR) conduit fluidly coupled at one end to an intake manifold of the engine and at an opposite end to an exhaust manifold of the engine, and an EGR valve responsive to an EGR control signal to control the flow of engine exhaust gas through the EGR conduit;

and wherein the control computer includes charge manager logic responsive to the commanded charge flow value and the commanded EGR fraction value to produce the EGR control signal.

18. The control framework of claim 16 wherein the air handling system includes a turbocharger having a variable geometry turbine (VGT) fluidly coupled to an exhaust manifold of the engine, the VGT responsive to a VGT control signal to control the swallowing capacity of the turbine;

and wherein the control computer includes charge manager logic responsive to the commanded charge flow value and the commanded EGR fraction value to produce the VGT control signal.

19. The control framework of claim 16 wherein the air handling system includes an exhaust throttle disposed in-line with an exhaust conduit fluidly coupling an exhaust manifold of the engine to ambient, the exhaust throttle responsive to an exhaust throttle control signal to control engine exhaust gas flow through the exhaust conduit;

and wherein the control computer includes charge manager logic responsive to the commanded charge flow value and the commanded EGR fraction value to produce the VGT control signal.

20. The control framework of claim 2 wherein the number of embedded models includes an engine output torque model producing as a model output an estimate of engine output torque as a function of one or more engine operating parameters.

21. The control framework of claim 2 wherein the number of embedded models includes a peak cylinder pressure model producing as a model output an estimate of peak cylinder pressure as a function of one or more engine operating parameters.

22. The control framework of claim 2 wherein the number of embedded models includes an engine exhaust gas temperature model producing as a model output an estimate of engine exhaust gas temperature as a function of one or more engine operating parameters.

23. The control framework of claim 2 wherein the number of embedded models includes a NOx model producing as a model output an estimate of NOx produced by the engine as a function of one or more engine operating parameters.

24. The control framework of claim 2 wherein the number of embedded models includes a dry particulate matter model producing as a model output an estimate of dry particulate matter produced by the engine as a function of one or more engine operating parameters.

25. The control framework of claim 2 wherein the number of embedded models includes a plurality of fuel limiting models each producing as an output a different fuel flow limit value for limiting engine fueling.

26. The control framework of claim 25 wherein the plurality of fuel limiting models include a peak cylinder pressure (PCP) fuel limit model producing as a model output a PCP-limited fuel flow value as a function of a target PCP limit value included as one of the one or more system performance target values, and as a function of one or more engine operating values.

27. The control framework of claim 25 wherein the plurality of fuel limiting models include an exhaust temperature fuel limit model producing as a model output an exhaust temperature-limited fuel flow value as a function of a target exhaust gas temperature limit value included as one of the one or more system performance target values, and as a function of one or more engine operating parameters.

28. The control framework of claim 25 wherein the plurality of fuel limiting models include a dry particulate matter (DPM) fuel limit model producing as a model output a DPM-limited fuel flow value as a function of a target DPM limit value included as one of the one or more system performance target values, and as a function of one or more engine operating parameters.

29. The control framework of claim 2 wherein the objective logic is configured to determine the scalar performance metric according to the relationship $U = W \cdot |100*(Y_T-Y)/Y_T|$, where U is the scalar performance metric.

30. The control framework of claim 2 wherein the number of solution parameters define a vector, X, the number of unconstrained solution parameters define a vector, X', and the scalar performance metric is designated U;

and wherein the objective optimization logic is configured to produce X' as a function of U and X and a specified step size.

31. The control framework of claim 30 wherein the objective optimization logic is configured to produce X' as a function of U and X and a specified step size according to a random walk optimization algorithm with direction exploitation and step length adjustment.

32. The control framework of claim 2 wherein the solution constraining logic includes a number of constraint functions each producing specified ones of the number of solution parameters by limiting the specified ones of the corresponding number of unconstrained solution parameters to definable operating ranges.

33. The control framework of claim 32 wherein one of the control parameters is a commanded fuel quantity value;

and wherein the number of constraint functions includes fuel quantity limiting logic limiting the corresponding unconstrained commanded fuel quantity value to a minimum of a maximum torque fueling value, the greater of a minimum torque fueling value and the unconstrained commanded fuel quantity value, a peak cylinder pressure fuel limit value produced by one of the embedded models, an engine exhaust gas temperature fuel limit value produced by another one of the embedded models and a dry particulate matter fuel limit value produced by yet another one of the embedded models.

34. The control framework of claim 33 wherein the fuel quantity limiting logic is configured to determine the maximum and minimum torque fueling values each as a function of a target engine output torque value forming one of the system performance target values and engine speed.

35. The control framework of claim 32 wherein one of the control parameters is a commanded charge flow value and another one of the control parameters is a commanded EGR fraction value;

and wherein the control framework further includes charge management logic responsive to the commanded charge flow value and the commanded EGR fraction value to control one or more actuators associated with the air handling system of the engine;

and wherein the number of constraint functions includes limit accommodation logic limiting the corresponding unconstrained commanded charge flow and commanded EGR fraction values as a function of information fed back to the limit accommodation logic from the charge management logic.

36. The control framework of claim 35 wherein the limit accommodation logic is configured to produce the commanded charge flow value by limiting the corresponding unconstrained commanded charge flow value as a function of charge flow information fed back to the limit accommodation logic from the charge management logic.

37. The control framework of claim 35 wherein the limit accommodation logic is configured to produce the commanded EGR fraction value by limiting the corresponding unconstrained commanded EGR fraction value as a function of EGR fraction information fed back to the limit accommodation logic from the charge management logic.

38. The control framework of claim 33 wherein the fuel quantity limiting logic is further configured to determine an EGR disable value as a function of the unconstrained commanded fuel quantity value, the dry particulate matter fuel limit value and engine speed.

39. The control framework of claim 38 wherein another one of the control parameters is a commanded EGR fraction value;

and wherein the control framework further includes charge management logic responsive to the commanded EGR fraction value to control one or more actuators associated with the air handling system of the engine;

and wherein the control framework further includes limit accommodation logic configured to produce the commanded EGR fraction value by limiting a corresponding unconstrained commanded EGR fraction value as a function of EGR fraction information fed back to the limit accommodation logic from the charge management logic;

and wherein the limit accommodation logic is configured to produce a zero commanded EGR fraction value if the EGR disable value is true, and to otherwise produce the commanded EGR fraction value as long as the commanded EGR fraction value is greater than a minimum EGR fraction value.

40. A method of generating control parameters for controlling operation of a physical system, the method comprising:

maintaining one or more embedded models each producing a model output corresponding to a different operating parameter of the physical system as a function of either of one or more operating values corresponding to operating conditions of the physical system and one or more of a number of solution parameters, producing a scalar performance metric as a function of the one or more model outputs, of one or more weight values and of one or more system performance target values, wherein the one or more model outputs defines a vector, Y, the one or more system performance target values defines a vector, $Y_T$, and the one or more weight values defines a vector, W, and wherein producing a scalar performance metric comprises determining a difference vector as a difference between the vectors Y and $Y_T$, and computing the scalar performance metric as a vector inner product of the vector W and a function of the difference vector, generating a number of unconstrained solution parameters in a manner that minimizes the scalar performance metric, determining from the number of unconstrained solution parameters the number of solution parameters in a manner that limits an operating range of at least one of the number of unconstrained solution parameters, and selecting as the control parameters one of the number of solution parameters and the number of unconstrained solution parameters, wherein the step of determining the number of solution parameters includes determining at least one of the number of solution parameters as a function of at least one of the one or more system performance target values, and wherein the physical system is an internal combustion engine including an air handling system.

41. The method of claim 40 wherein the step of producing a scalar performance metric includes computing the scalar performance metric according to the relationship $U = W \cdot (Y - Y_T)$, where U is the scalar performance metric.

42. The method of claim 40 wherein the step of producing a scalar performance metric includes computing the scalar performance metric according to the relationship $U = W \cdot (Y - Y_T)^2$, where U is the scalar performance metric.

43. The method of claim 40 wherein the step of producing a scalar performance metric includes computing the scalar performance metric according to the relationship $U = W \cdot |Y - Y_T|$, where U is the scalar performance metric.

44. The method of claim 40 wherein the step of producing a scalar performance metric includes computing the scalar performance metric according to the relationship $U = W \cdot |(Y - Y_T)/Y_T|$, where U is the scalar performance metric.

45. The method of claim 40 wherein the number of solution parameters define a vector, X, the number of unconstrained solution parameters define a vector, X', and the scalar performance metric is designated U; and wherein the step of generating a number of unconstrained solution parameters includes producing X' as a function of U and X and a specified step size according to a direct search optimization technique.

46. The method of claim 45 wherein the step of generating a number of unconstrained solution parameters includes producing X' as a function of U and X and a specified step size according to a random walk optimization algorithm.

47. The method of claim 45 wherein the step of generating a number of unconstrained solution parameters includes producing X' as a function of U and X and a specified step size according to a random walk optimization algorithm with step length adjustment.

48. The method of claim 45 wherein the step of generating a number of unconstrained solution parameters includes producing X' as a function of U and X and a specified step size according to a random walk optimization algorithm with direction exploitation.

49. The method of claim 45 wherein the step of generating a number of unconstrained solution parameters includes producing X' as a function of U and X and a specified step size according to a random walk optimization algorithm with direction exploitation and step length adjustment.

50. The method of claim 45 wherein the step of generating a number of unconstrained solution parameters includes producing X' as a function of U and X and a specified step size according to a variant of a random walk optimization algorithm.

51. The method of claim 45 wherein the step of generating a number of unconstrained solution parameters includes producing X' as a function of U and X and a specified step size according to a univariate optimization algorithm.

* * * * *